United States Patent
Yamaoka et al.

(10) Patent No.: US 8,254,713 B2
(45) Date of Patent: Aug. 28, 2012

(54) IMAGE PROCESSING APPARATUS, IMAGE PROCESSING METHOD, PROGRAM THEREFOR, AND RECORDING MEDIUM IN WHICH THE PROGRAM IS RECORDED

(75) Inventors: Shigemitsu Yamaoka, Tokyo (JP); Ryo Kamiya, Kanagawa (JP)

(73) Assignee: Sony Corporation, Tokyo (JP)

( * ) Notice: Subject to any disclaimer, the term of this patent is extended or adjusted under 35 U.S.C. 154(b) by 1065 days.

(21) Appl. No.: 12/084,349

(22) PCT Filed: Nov. 10, 2006

(86) PCT No.: PCT/JP2006/322498
§ 371 (c)(1),
(2), (4) Date: Apr. 29, 2008

(87) PCT Pub. No.: WO2007/055335
PCT Pub. Date: May 18, 2007

(65) Prior Publication Data
US 2009/0041378 A1    Feb. 12, 2009

(30) Foreign Application Priority Data

Nov. 11, 2005  (JP) ................................ 2005-327749
Jun. 27, 2006  (JP) ................................ 2006-176915

(51) Int. Cl.
*G06K 9/40* (2006.01)
(52) U.S. Cl. ...................................................... 382/255
(58) Field of Classification Search .................. 345/647; 348/36; 353/69, 70; 359/206.1, 662, 724, 359/725; 382/255, 275
See application file for complete search history.

(56) References Cited

U.S. PATENT DOCUMENTS
5,870,135 A    2/1999  Glatt et al.

2003/0103063 A1*  6/2003  Mojaver et al. ............... 345/647
2004/0027451 A1*  2/2004  Baker ............................. 348/46

FOREIGN PATENT DOCUMENTS

| EP | 1 515 548 | 3/2005 |
|----|-----------|--------|
| JP | 2000-132673 | 5/2000 |
| JP | 2000-324386 | 11/2000 |
| JP | 2005-063141 | 3/2005 |
| JP | 2005-086279 | 3/2005 |
| WO | WO 99/51027 | 10/1999 |

* cited by examiner

*Primary Examiner* — Gregory F Cunningham
(74) *Attorney, Agent, or Firm* — Robert J. Depke; Rockey, Depke & Lyons, LLC

(57) ABSTRACT

In an image processing apparatus that processes image data containing a distortion of an image pickup optical section, which is obtained by picking up an optical image from a subject through the image pickup optical section giving the distortion, a region selection mode setting section (13b) selectively sets a first region selection mode in which, from a field of view represented by the image data, a selected region is selected which indicates a partial region of the field of view by using an orthogonal coordinate system and a second region selection mode in which, from the field of view represented by the image data, the selected region is selected which indicates the partial region of the field of view by using a polar coordinate system. A distortion correction section (13a) corrects the distortion contained in the image data that corresponds to the selected region selected the first or second region selection mode selected in the region selection mode setting section (13b). A data output section (13d) outputs distortion-corrected data.

16 Claims, 42 Drawing Sheets

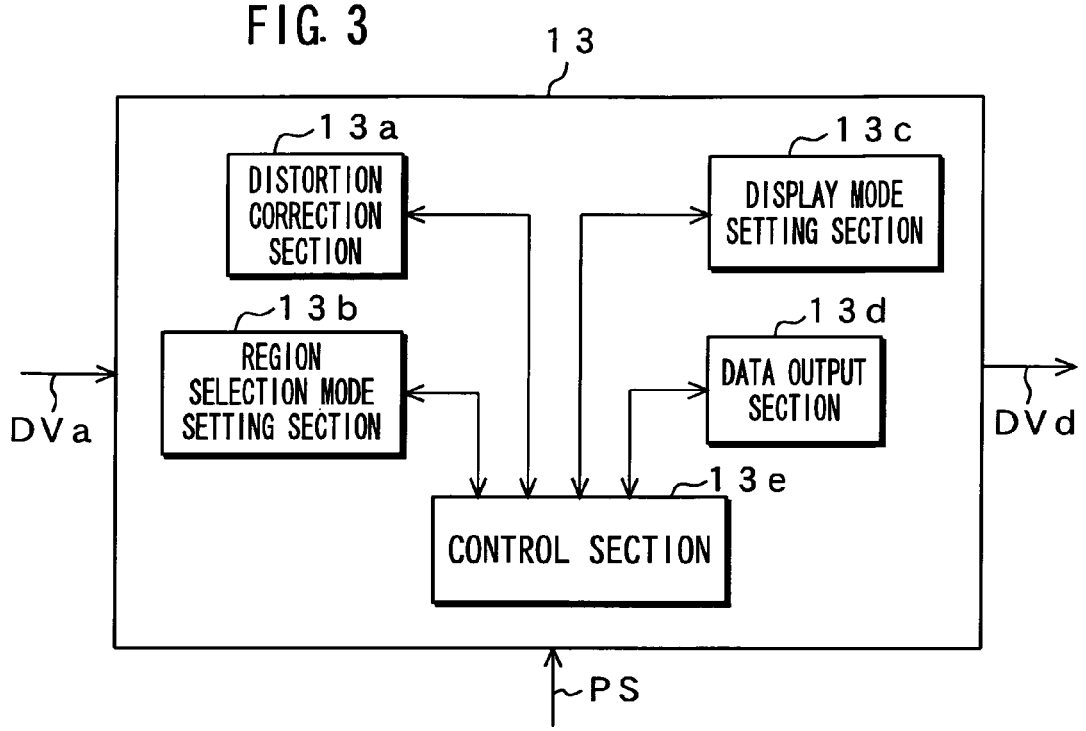
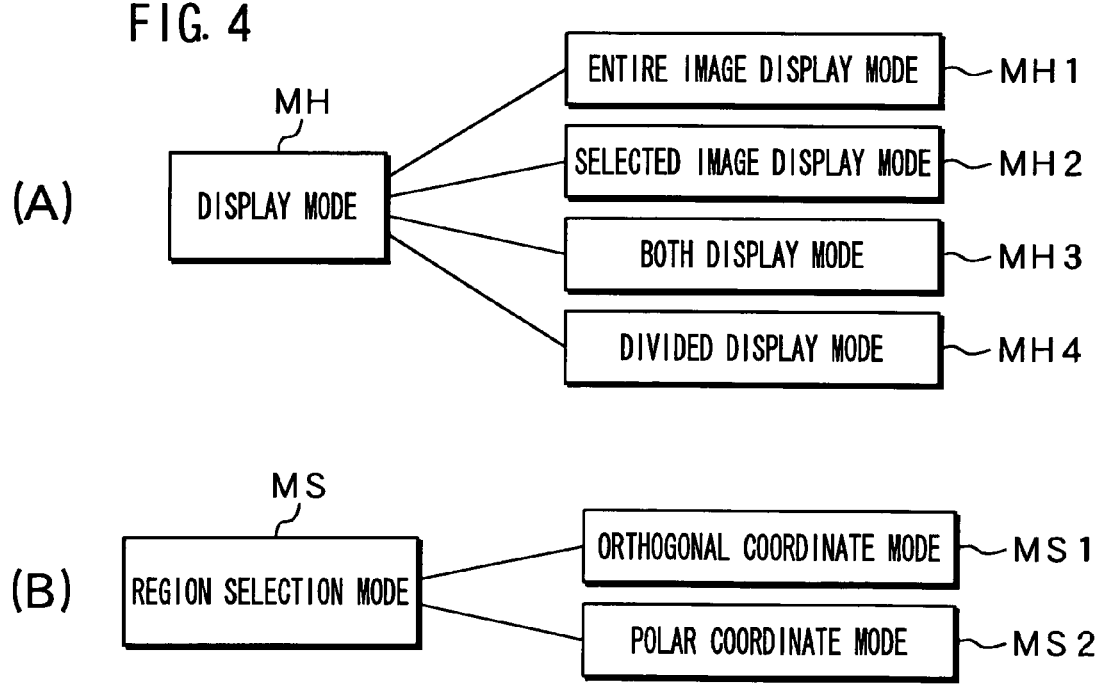

FIG. 9
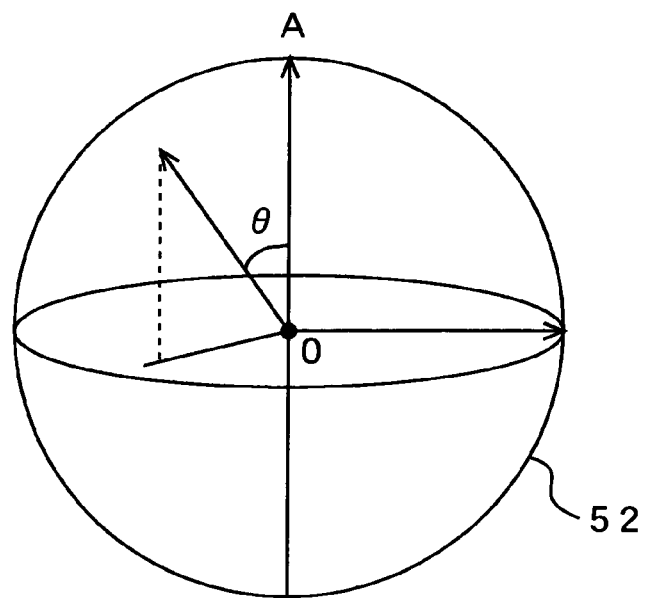
FIG. 10
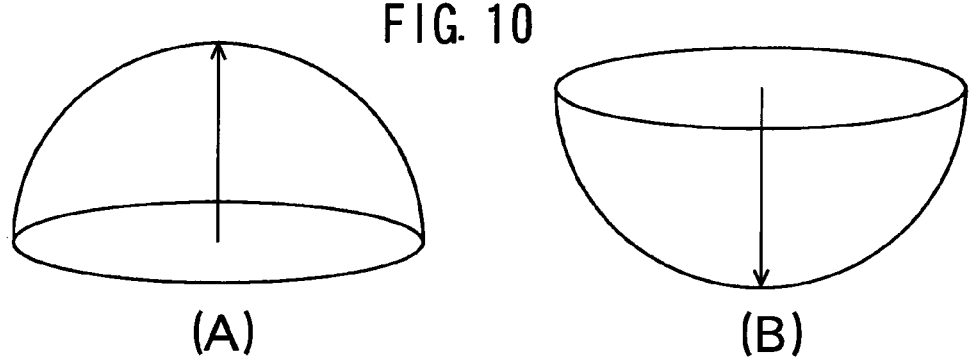
(A) (B)
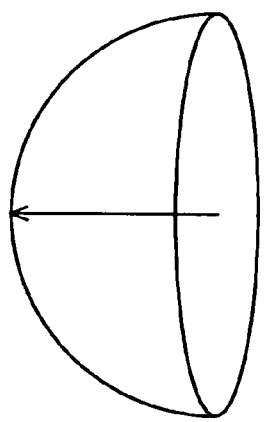
(C)

FIG. 11
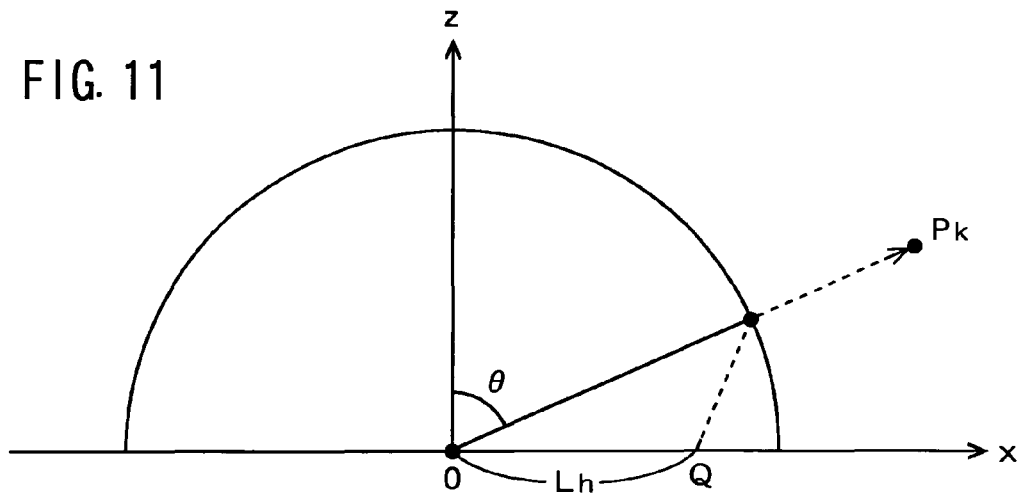
(A)
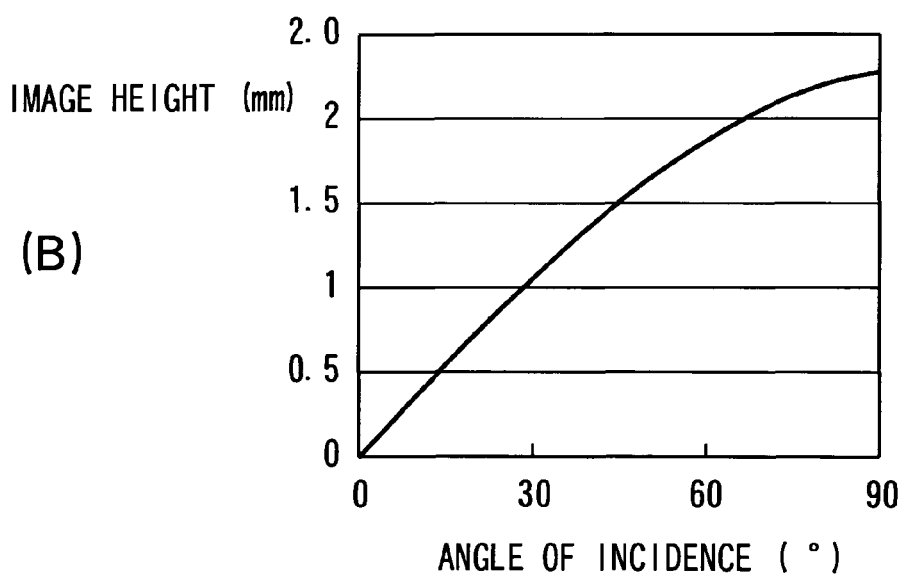
(B)
ANGLE OF INCIDENCE (°)

FIG. 15
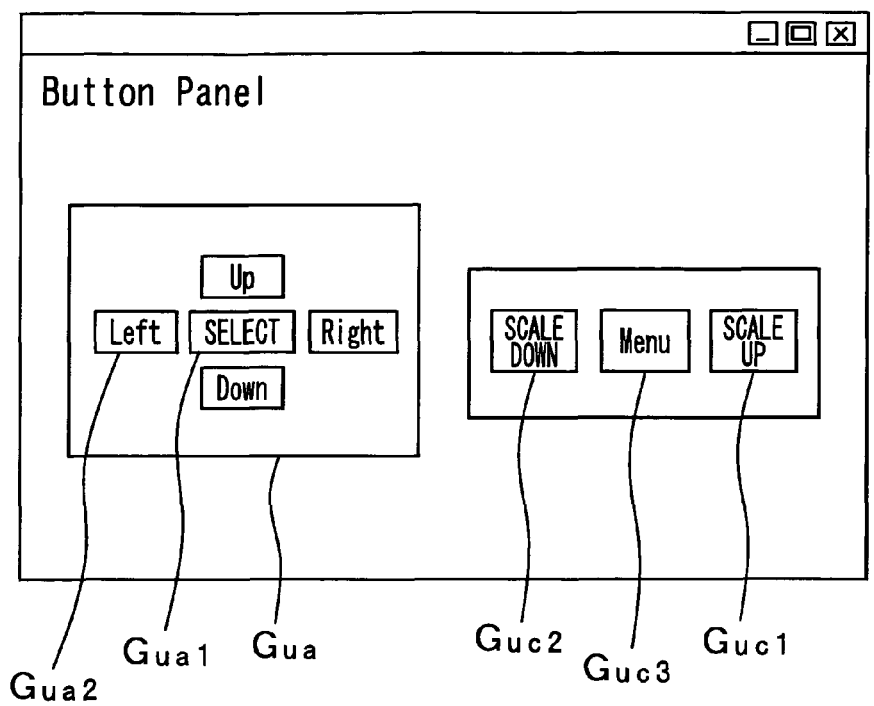
(A)
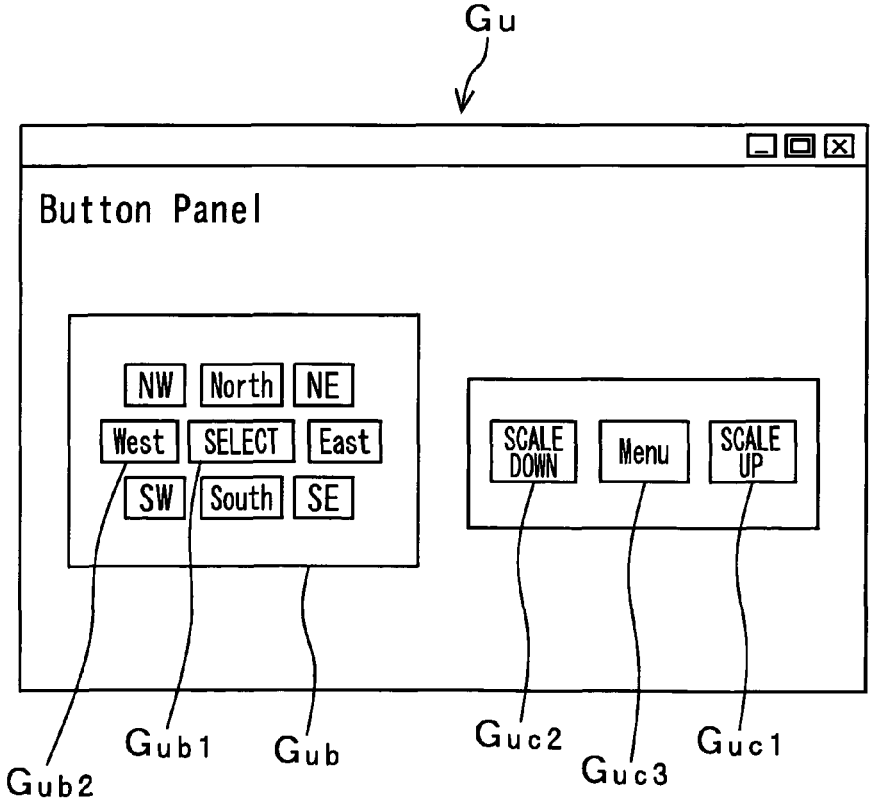
(B)

FIG. 16
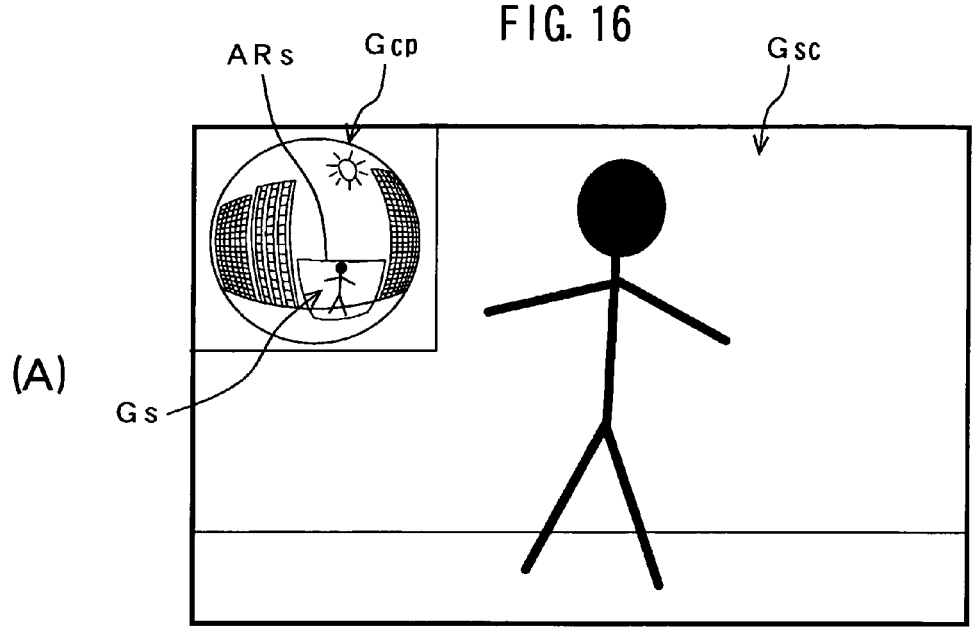
(A)
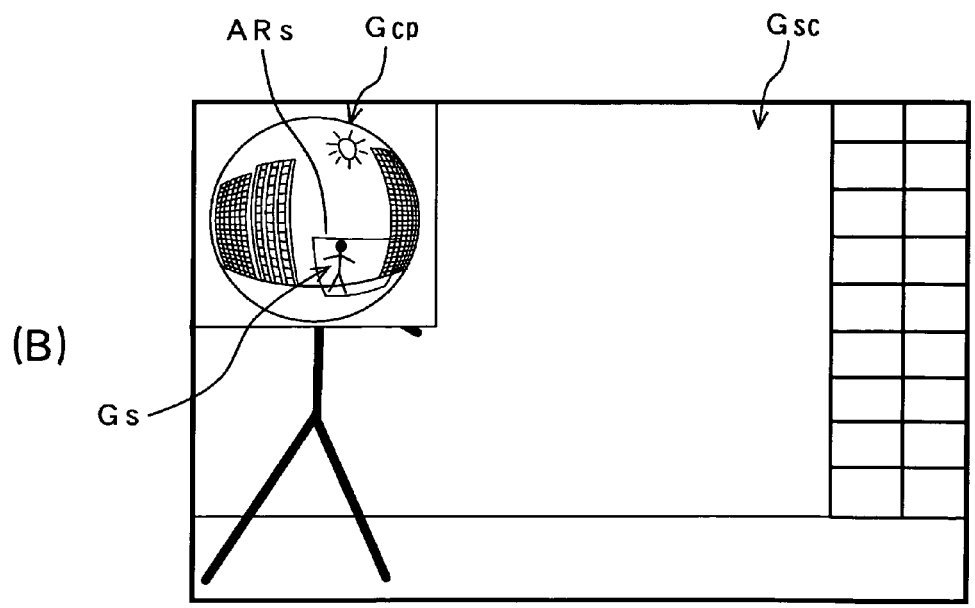
(B)

FIG. 18
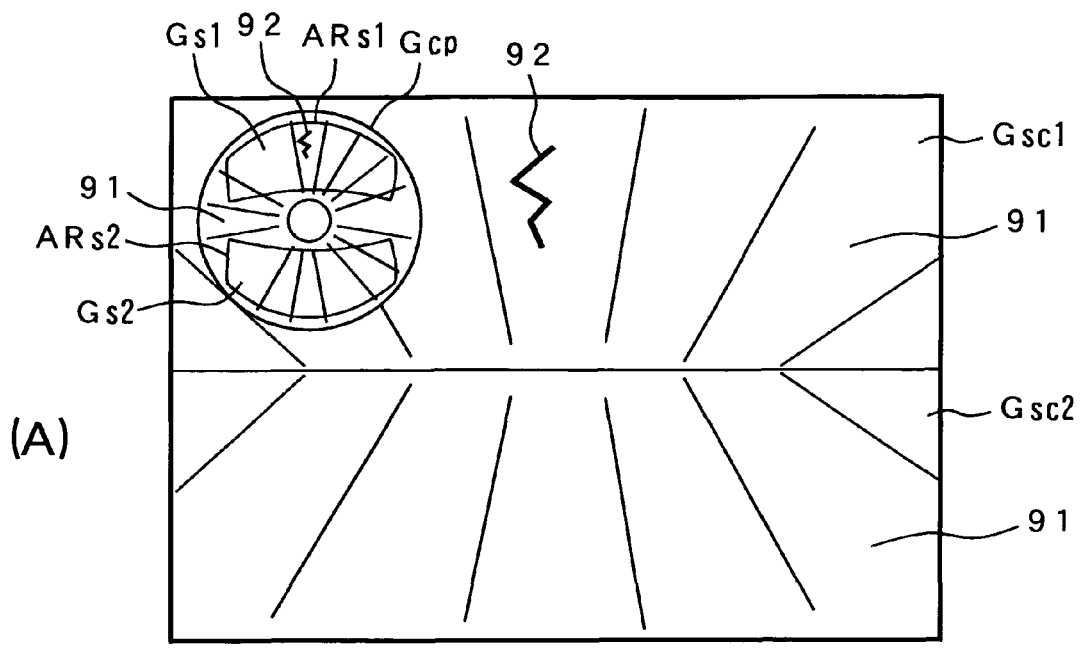
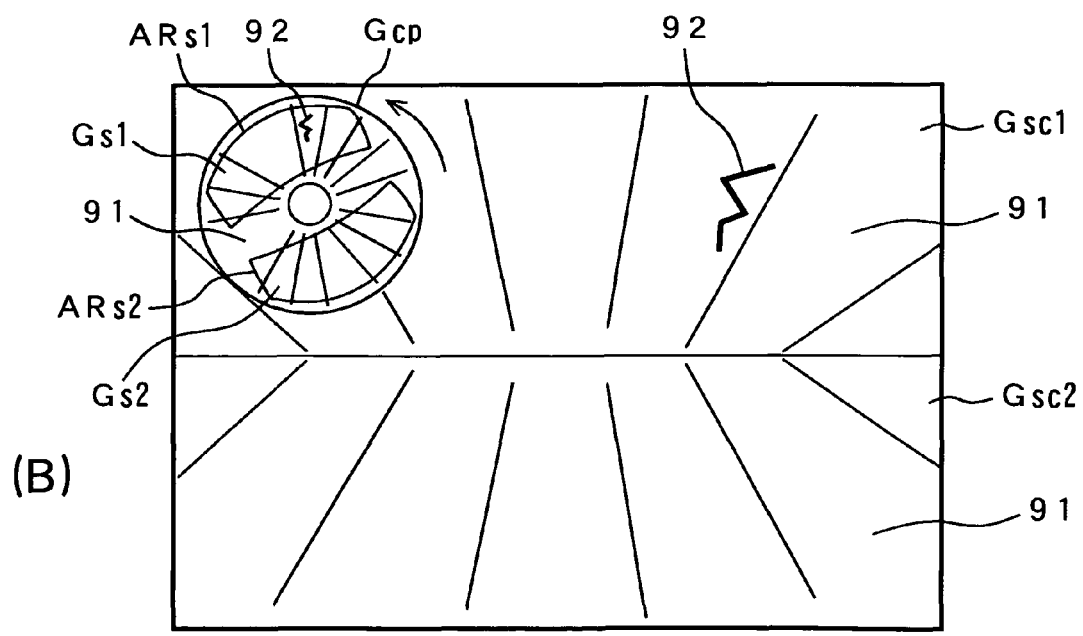

FIG. 22
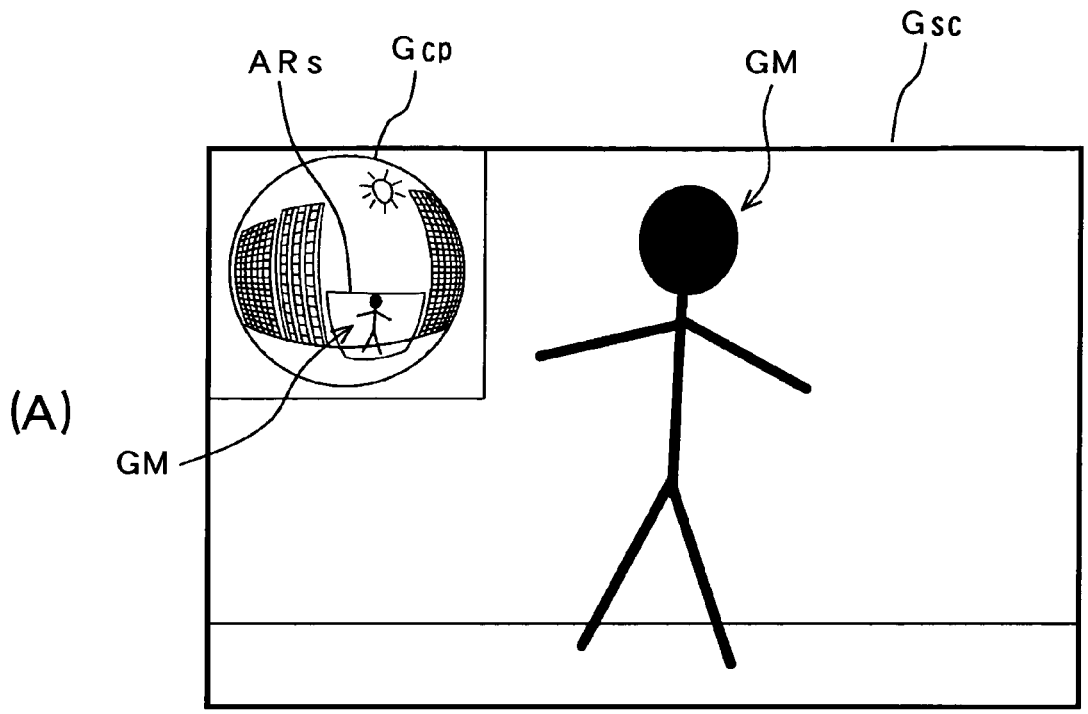
(A)
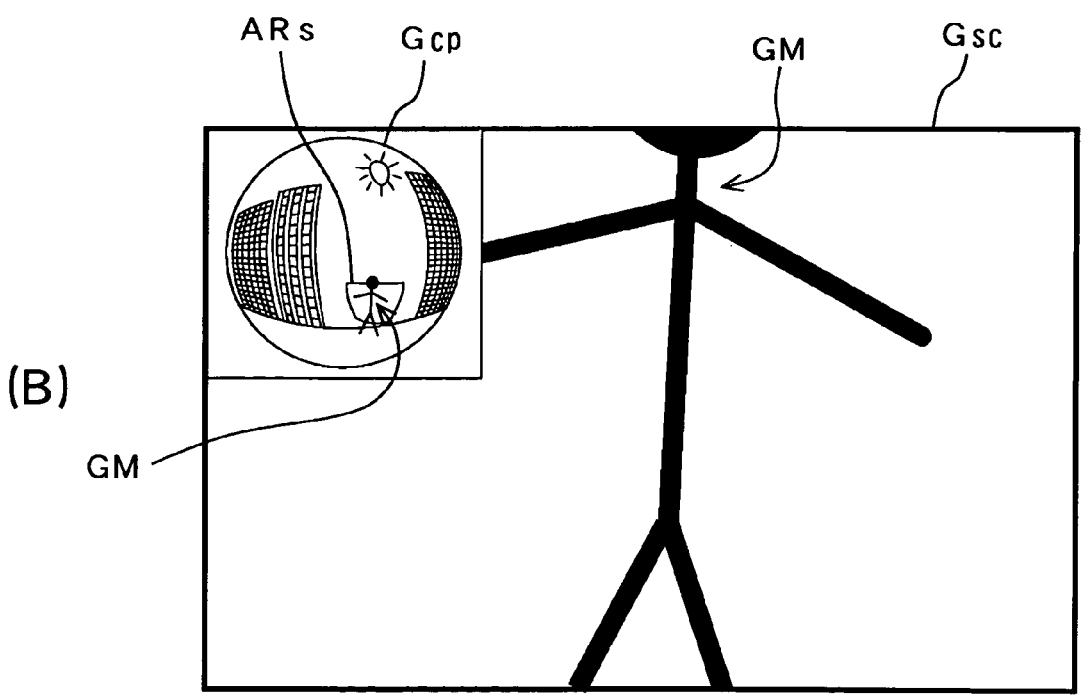
(B)

FIG. 33
(C)
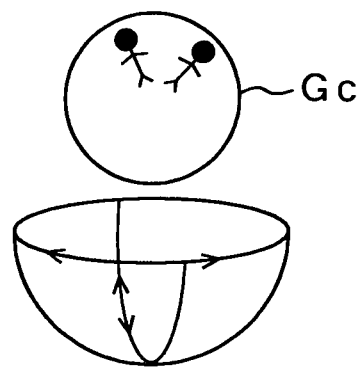
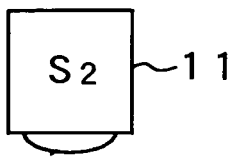
(B)
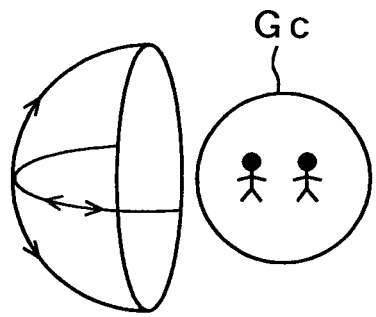
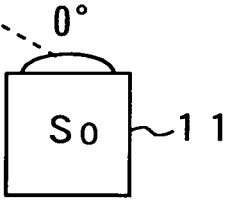
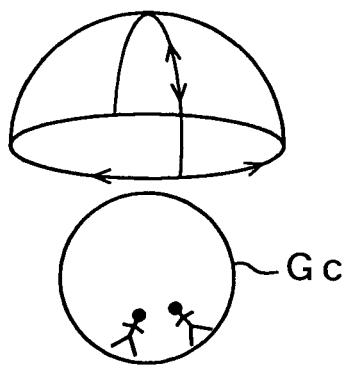
(A)

FIG. 34
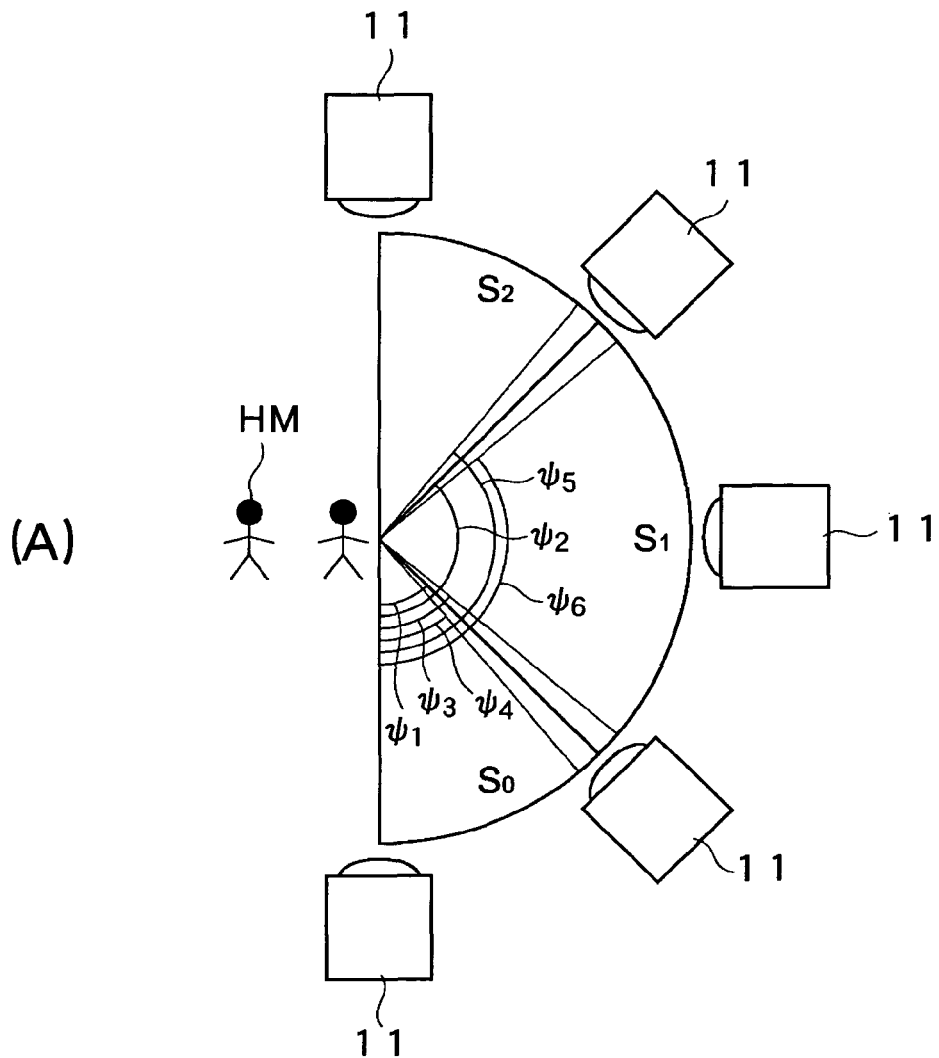
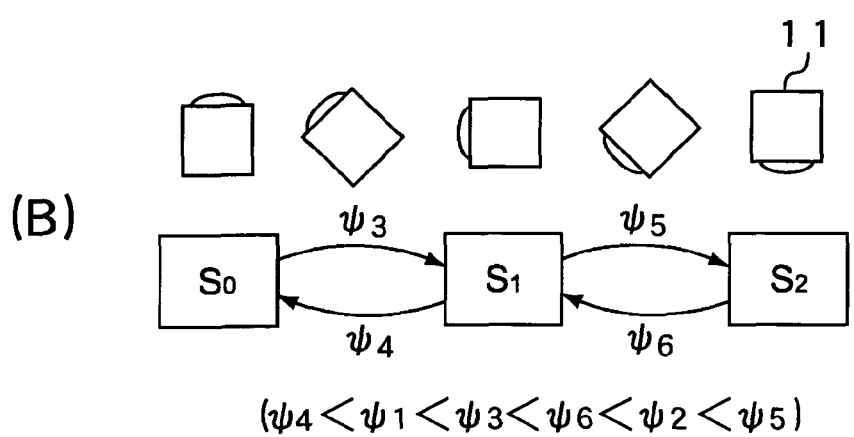
$(\psi_4 < \psi_1 < \psi_3 < \psi_6 < \psi_2 < \psi_5)$ FIG. 36
(A) 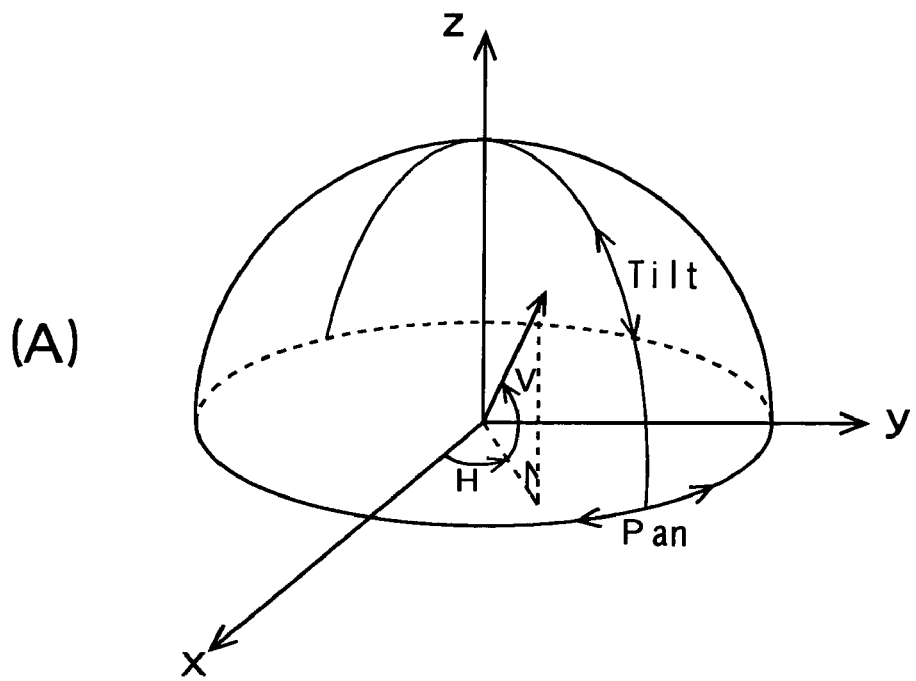
(B) 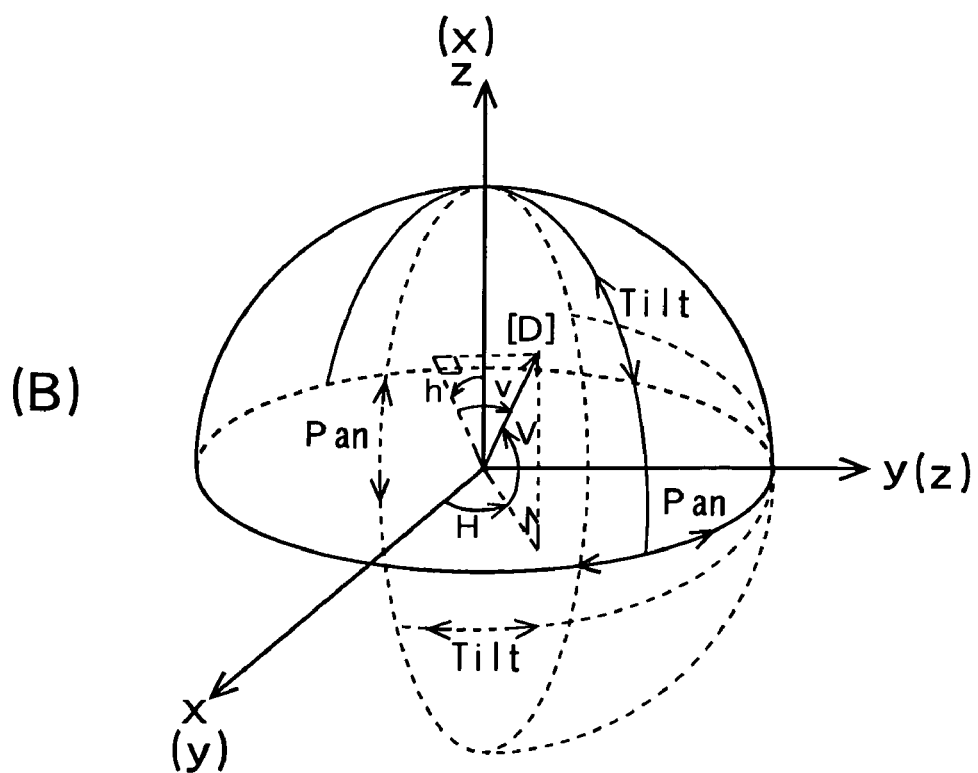

FIG. 37

$$[d] = \begin{pmatrix} \cos(H) & -\sin(H) & 0 \\ \sin(H) & \cos(H) & 0 \\ 0 & 0 & 1 \end{pmatrix} \begin{pmatrix} \cos(V) & 0 & \sin(V) \\ 0 & 1 & 0 \\ -\sin(V) & 0 & \cos(V) \end{pmatrix} \begin{pmatrix} 1 \\ 0 \\ 0 \end{pmatrix}$$

$$= \begin{pmatrix} \cos(h) & 0 & \sin(h) \\ 0 & 1 & 0 \\ -\sin(h) & 0 & \cos(h) \end{pmatrix} \begin{pmatrix} 1 & 0 & 0 \\ 0 & \cos(v) & -\sin(v) \\ 0 & \sin(v) & \cos(v) \end{pmatrix} \begin{pmatrix} 0 \\ 0 \\ 1 \end{pmatrix}$$

$$\begin{pmatrix} \sin(h)\cos(v) \\ -\sin(v) \\ \cos(h)\cos(v) \end{pmatrix} = \begin{pmatrix} \cos(H)\cos(V) \\ \sin(H)\cos(V) \\ -\sin(V) \end{pmatrix} \quad \text{T0}$$

ORTHOGONAL COORDINATE MODE $\sin(v) = -\cos(H)\cos(V)$ $\cos(v) = (1-\sin(v)^2)^{1/2}$ $\sin(h) = \cos(H)\cos(V)/\cos(v)$ $\cos(h) = -\sin(V)/\cos(v)$

POLAR COORDINATE MODE $h = H, \quad v = V$

FIG. 38

(A)
$$[a] = \begin{pmatrix} a_{00} & a_{01} & a_{02} & a_{03} & \cdots & a_{0n} & \cdots & a_{0N} \\ a_{10} & a_{11} & a_{12} & a_{13} & \cdots & a_{1n} & \cdots & a_{1N} \\ a_{20} & a_{21} & a_{22} & a_{23} & \cdots & a_{2n} & \cdots & a_{2N} \\ \vdots & \vdots & \vdots & \vdots & & \vdots & & \vdots \\ a_{m0} & a_{m1} & a_{m2} & a_{m3} & \cdots & a_{mn} & \cdots & a_{mN} \\ a_{M0} & a_{M1} & a_{M2} & a_{M3} & \cdots & a_{Mn} & \cdots & a_{MN} \end{pmatrix}$$

with spacing $r$ between columns and $q$ between rows.

(B)
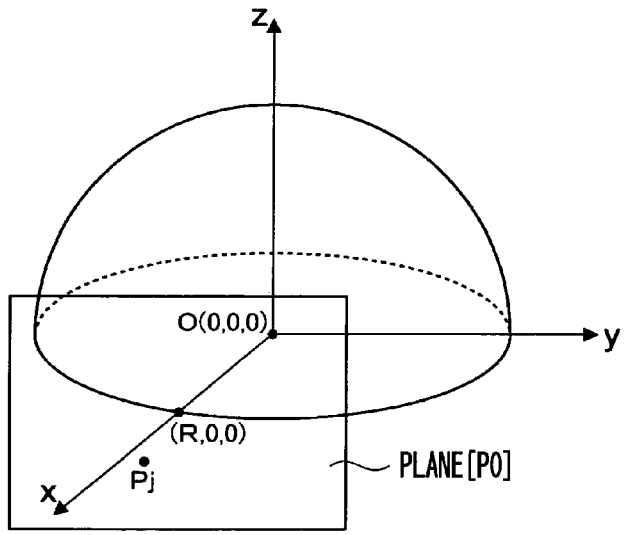

(C)
$$[A] = \begin{pmatrix} 0 & r & 2r & 3r & \cdots & Nr & 0 & r & 2r & \cdots & Nr & 0 & r & \cdots & 0 & r & 2r & \cdots & Nr \\ 0 & 0 & 0 & 0 & \cdots & 0 & q & q & q & \cdots & q & 2q & 2q & \cdots & Mq & Mq & Mq & \cdots & Mq \\ 1 & 1 & 1 & 1 & \cdots & 1 & 1 & 1 & 1 & \cdots & 1 & 1 & 1 & \cdots & 1 & 1 & 1 & \cdots & 1 \end{pmatrix}$$

$$[K] = \begin{pmatrix} 0 & 0 & R \\ -1 & 0 & Nr/2 \\ 0 & -1 & Mq/2 \end{pmatrix}$$

(A) PARAMETER
PAN (ANGLE H)
TILT (ANGLE V)
SCALE OF ENLARGEMENT (ZOOM RATIO)
MODE (ORTHOGONAL COORDINATE / POLAR COORDINATE (FLAG))

(B) 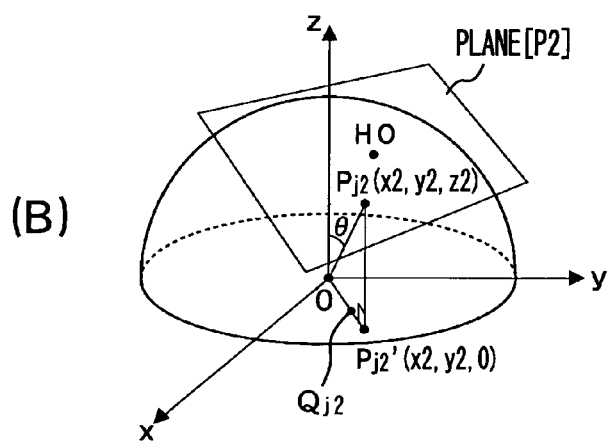

(C)
$$[P0] = \begin{pmatrix} R, & R, & R \cdots \\ X0, & X1, & X2 \cdots \\ Y0, & Y1, & Y2 \cdots \end{pmatrix}$$

$$[P2] = \begin{pmatrix} x0, & x1, & x2 \cdots \\ y0, & y1, & y2 \cdots \\ z0, & z1, & z2 \cdots \end{pmatrix}$$

$$[X] = \begin{pmatrix} 1 & 0 & 0 \\ 0 & \cos(-h) & -\sin(-h) \\ 0 & \sin(-h) & \cos(-h) \end{pmatrix}$$

$$[Y] = \begin{pmatrix} \cos(v) & 0 & -\sin(v) \\ 0 & 1 & 0 \\ \sin(v) & 0 & \cos(v) \end{pmatrix}$$

$$[Z] = \begin{pmatrix} \cos(h) & -\sin(h) & 0 \\ \sin(h) & \cos(h) & 0 \\ 0 & 0 & 1 \end{pmatrix}$$

$$[M] = \begin{pmatrix} 1 & 0 & 0 \\ 0 & Zoom & 0 \\ 0 & 0 & Zoom \end{pmatrix}$$

WHEREIN,
$-\sin(h) = \sin(-h)$
$\cos(h) = \cos(-h)$ (D)
ORTHOGONAL COORDINATE MODE  $[P2] = [Z][Y][X][M][P0]$

POLAR COORDINATE MODE  $[P2] = [Z][Y][M][P0]$

FIG. 43
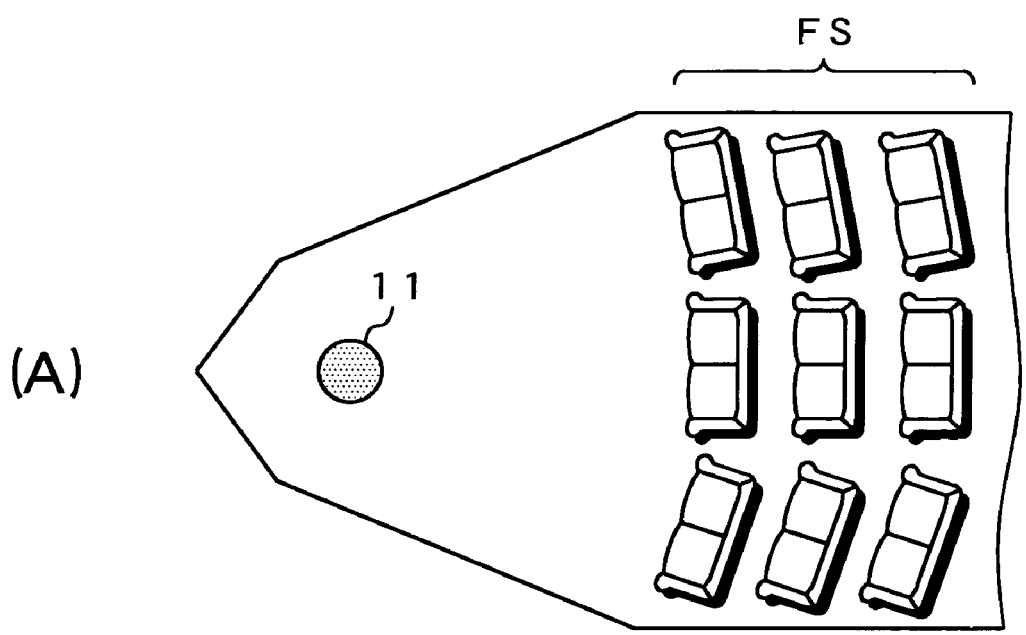
(A)
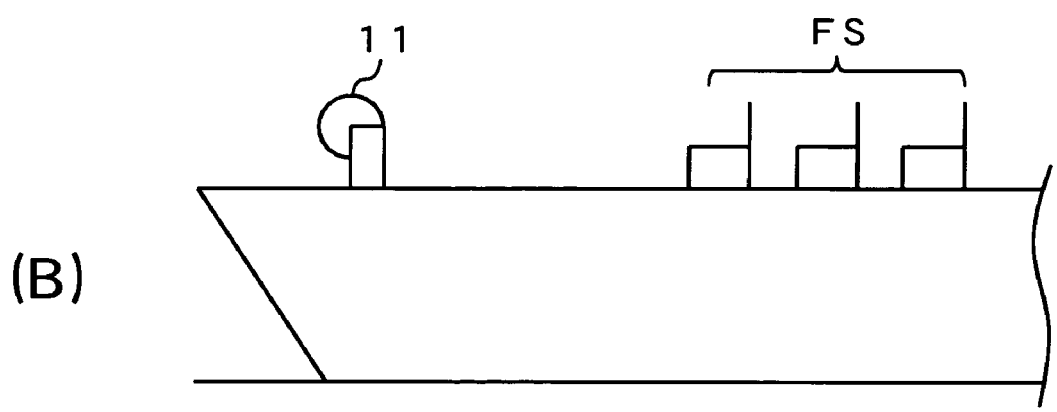
(B)

FIG. 44
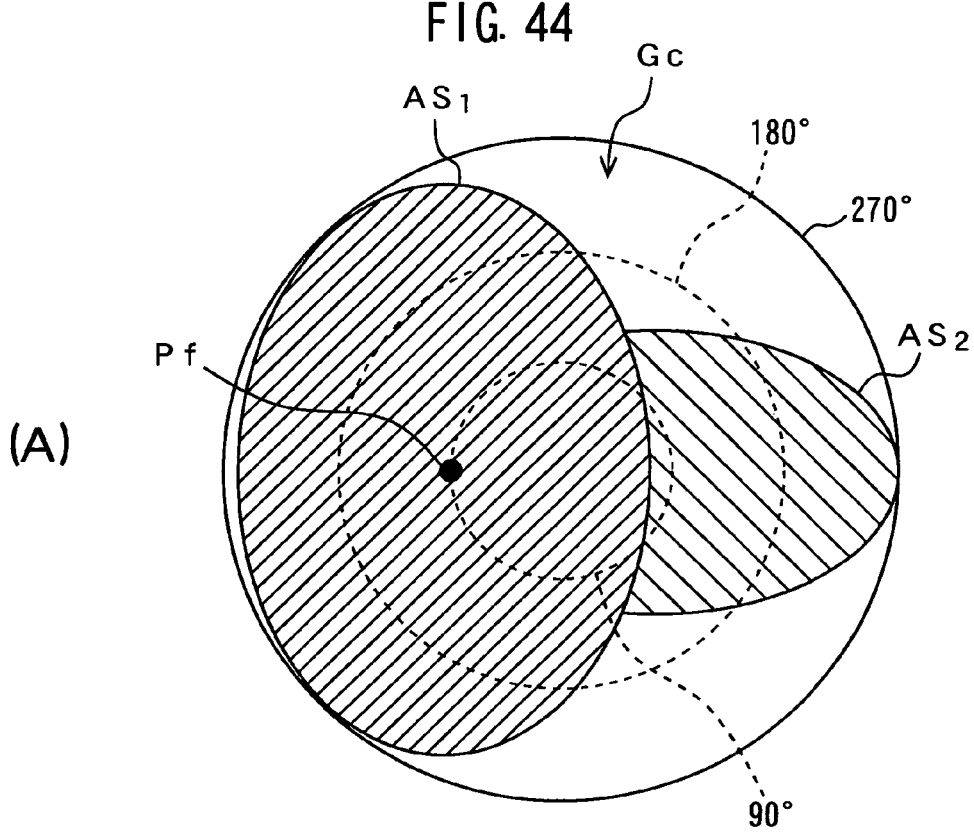
(A)
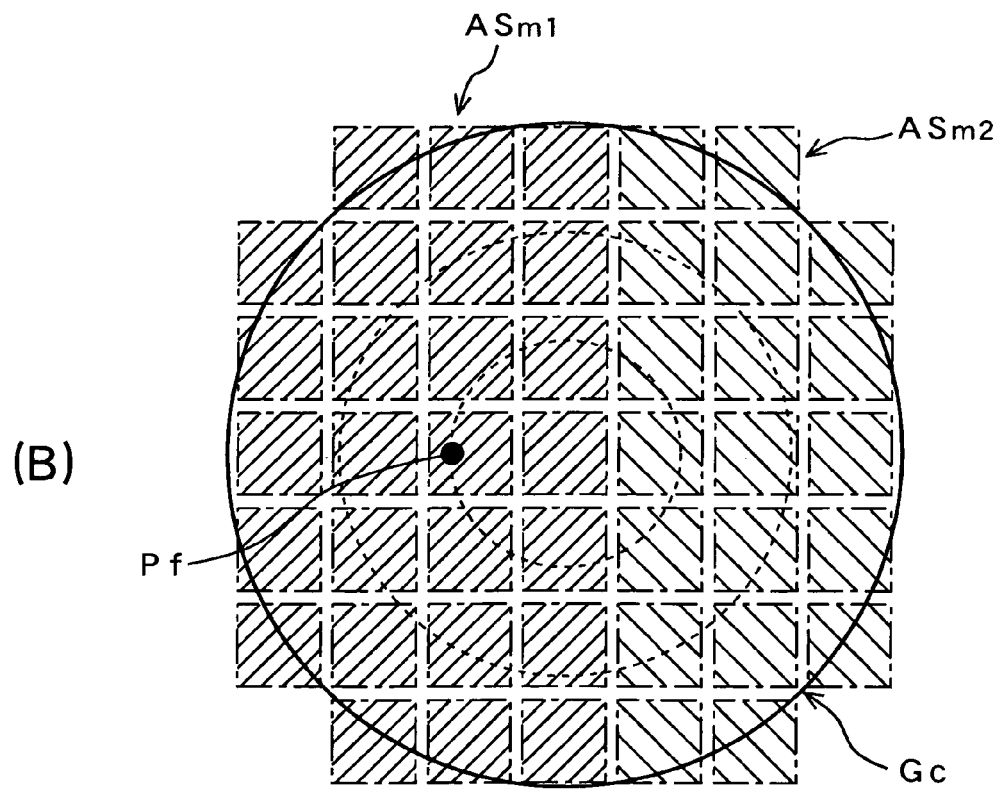
(B)

FIG. 45
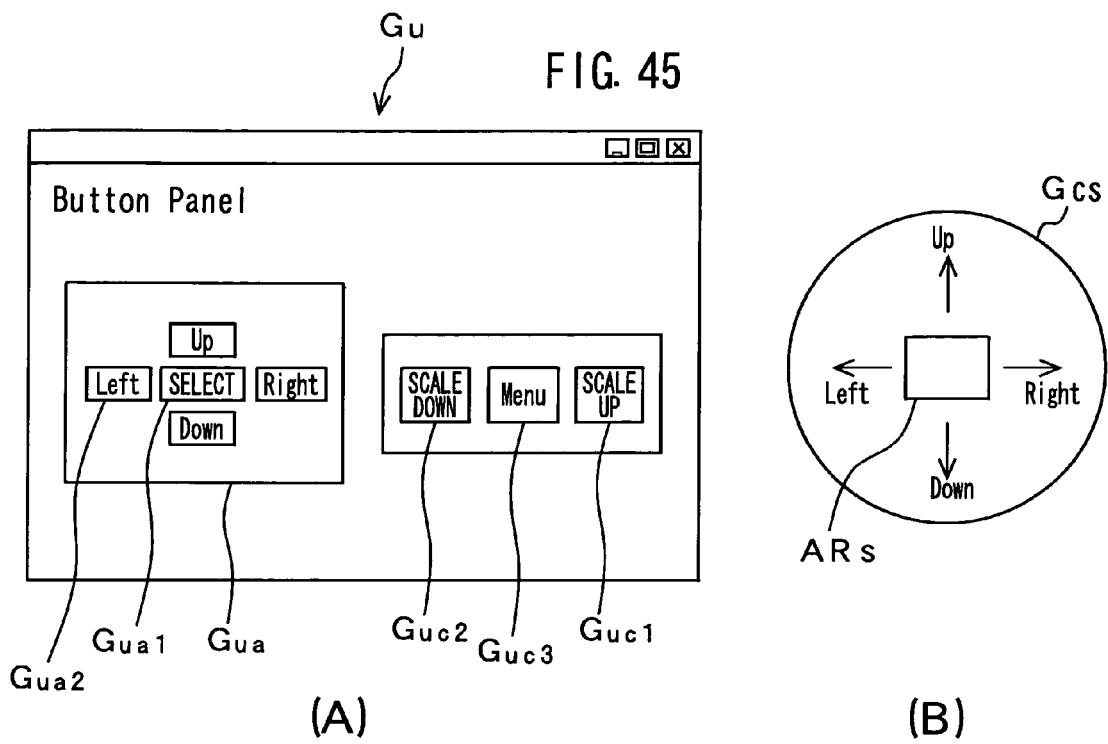
(A) (B)
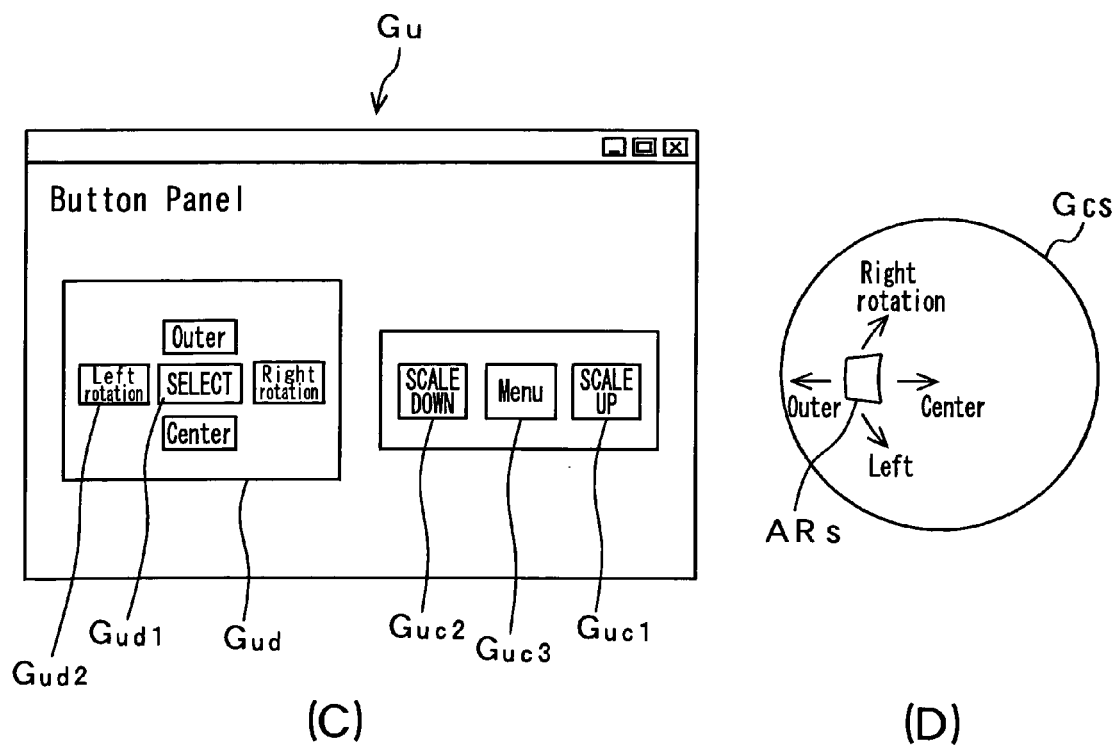
(C) (D)

FIG. 53
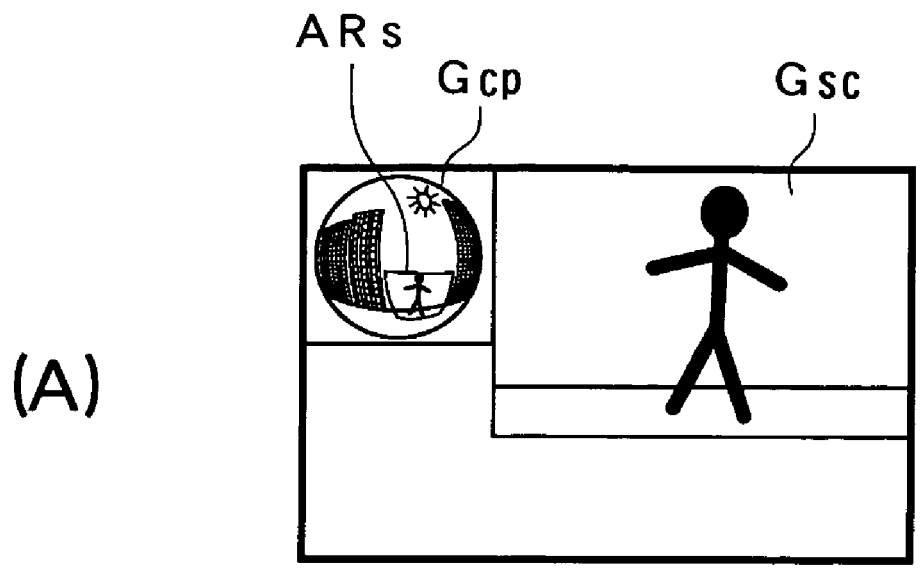
(A)
PREDETERMINED LAPSE OF TIME ELAPSES
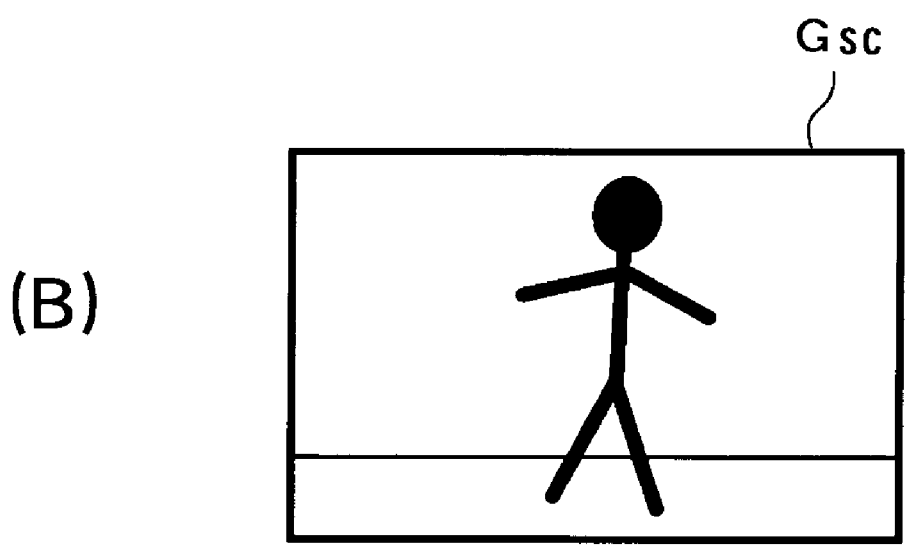
(B)

IMAGE PROCESSING APPARATUS, IMAGE PROCESSING METHOD, PROGRAM THEREFOR, AND RECORDING MEDIUM IN WHICH THE PROGRAM IS RECORDED

This application is a 371 U.S. National Stage filing of PCT/JP2006/322498, filed Nov. 10, 2006, which claims priority to Japanese Patent Application Number JP2005-327749 filed Nov. 11, 2005 and Japanese Patent Application Number JP2006-176915 filed Jun. 27, 2006, all of which are incorporated herein by reference.

TECHNICAL FIELD

The present invention relates to an image processing apparatus, an image processing method, a program therefor, and a recording medium, which performs processing on a picked-up wide-field image.

BACKGROUND ART

Conventionally, a technology has been proposed by which a user specifies a necessary region in an image picked up by using, for example, a fish-eye lens, a distortion aberration of the fish-eye lens image data of the specified region is corrected, and a corrected image is displayed on a monitor. The picked-up image may be a moving image as well as a still image (see, for example, Japanese Patent Application Publication No. 2000-324386 (see FIG. 1 and in paragraph [0009] in the description)).

With an apparatus described in this Japanese Patent Application Publication No. 2000-324386, it is expected that a higher degree of convenience is given if a user devices a better method for specifying a region in an image picked-up with a camera. Such a system that uses the camera is expected to be used in wide applications in the future and so may have an important task to provide the user with an interface easier to use.

DISCLOSURE OF INVENTION

An image processing apparatus according to the present invention is an image processing apparatus that processes image data containing a distortion of an image pickup optical section, which is obtained by picking up an optical image from a subject through the image pickup optical section giving the distortion, the image processing apparatus comprising a region selection mode setting section that selectively sets a first region selection mode in which, from a field of view represented by the image data, a selected region is selected which indicates a partial region of the field of view by using an orthogonal coordinate system and a second region selection mode in which, from the field of view represented by the image data, the selected region is selected which indicates the partial region of the field of view by using a polar coordinate system, and a data output section that outputs distortion-corrected data obtained by correcting the distortion in the image data that corresponds to the selected region selected in the first or second region selection mode which is set by the region selection mode setting section.

The present invention is provided with, as the region selection modes, the first region selection mode and the second region selection mode, in one of which modes the setting or switching of a selected region is performed. This will realize an image processing apparatus which is convenient and easy to use by the user. The region selection mode may be set to, for example, user's favorite region selection mode or any one based on a picked-up location, environment, purpose, etc. Alternatively, it may be set to a predefined region selection mode. By thus setting a region selection mode selectively, the setting or switching of the selected region is performed in the set region selection mode. It should be noted that the image of a subject mainly means a moving image but may include a still image.

In the present invention, if the first region selection mode is selected, a selected region is switched using an orthogonal coordinate system and so, it is effective in particular in the case of, for example, a field of view ordinarily watched by a human being, that is, in the case of picking up an image such as a landscape having up and down, right and left. That is, by selecting the first region selection mode in such a case, it is possible to perform a highly intuitive operation by the human being. On the other hand, if the second region selection mode is selected, a selected region is switched using a polar coordinate system and so, it is effective in particular in the case of picking up an image having such a field of view as to, for example, watch upward or downward from a horizontal plane. That is, by selecting the second region selection mode in such a case, it is possible to perform a highly intuitive operation by the human being.

In the present invention, image data to be used in an image processing apparatus may be image data output from an image pickup section including an image pickup optical section and an image pickup element that generates image data of the image of a subject, which is made incident through this image pickup optical section, or image data read from a storage device that stores image data of the image of a subject, which is made incident through the image pickup optical section. Those image pickup section and storage device may be mounted integrally with the image processing apparatus or separately from it. Further, only either one of these image pickup section and storage device may be used in constitution.

If the image pickup section is used, it is possible, for example, to provide distortion-free display of an image of a selected region that indicates a partial region of a field of view from the wide-field image of a subject obtained in a real time. On the other hand, if the storage device is used, it is possible, for example, to provide distortion-free display of an image of a selected region from a wide-field image of a subject that has already picked up. Further, if the image pickup section and the storage apparatus are used, conveniently it is possible to visually recognize a real-time image and a past image at a time.

In the present invention, the image processing apparatus may be equipped with a direction detection sensor that detects a direction in which an optical image is made incident upon the image pickup optical section, to set the first or second region selection mode based on a sensor signal from this direction detection sensor. Further, the region selection mode may be set in accordance with an angle with respect to a vertical direction that is determined on the basis of the sensor signal from the direction detection sensor. Thus, the region selection mode can be switched in accordance with an image pickup direction of the image pickup optical section, so that, for example, an appropriate region selection mode can be selected in accordance with any one of downward, upward, and horizontal picking up directions of the image of a subject, thereby improving user-friendliness. For example, supposing that the angle is 0 degree in a case where an optical image is made incident upon the image pickup optical section in the vertical direction, it is switched to the second region selection mode if the detected angle is less than 45 degrees or not smaller than 135 degrees and to the first region selection mode if it is not less than 45 degrees and less than 135 degrees.

Further, it may be switched from the first region setting mode to the second region setting mode according to whether or not the angle exceeds a first threshold value and from the second region selection mode to the first region selection mode according to whether or not the angle exceeds a second threshold value that is different from the first threshold value. By thus forming a hysteresis by differentiating from each other a threshold value at which the first region selection mode is switched to the second region selection mode and a threshold value at which the second region selection mode is switched to the first region selection mode, it is possible to avoid a user being disturbed by frequent switchover between the modes owing to fluctuations in tilt angle across any one of the thresholds.

In the present invention, the image processing apparatus may be equipped with a detection sensor that detects contact with an object, to switch between the first and second region selection modes according to whether or not the contact is detected.

Thus, in the case of picking up a subject while moving the image pickup optical section, the region selection modes can be switched from each other based on a distance between the image pickup optical section and the subject, so that appropriate mode switchover can be realized to accommodate the applications of the user by, for example, setting the present apparatus to the second region selection mode if no contact is detected and to the first region selection mode if the contact id detected.

Further, in the image processing apparatus, the first region selection mode or the second region selection mode is set in accordance with a state into which a selected region is set. It is thus possible to automatically switch the region selection modes from each other in accordance with the state into which the selected region is set. Furthermore, by switching display of a graphical user interface (GUI) in accordance with the region selection modes, it is easily possible to determine any of the region selection modes.

An image processing method according to the present invention is an image processing method for processing image data containing a distortion of an image pickup optical section, which is obtained by picking up an optical image from a subject through the image pickup optical section giving the distortion, the method comprising a region selection mode setting step of selectively setting a first region selection mode in which, from a field of view represented by the image data, a selected region is selected which indicates a partial region of the field of view by using an orthogonal coordinate system and a second region selection mode in which, from the field of view represented by the image data, the selected region is selected which indicates the partial region of the field of view by using a polar coordinate system, and a data output step of outputting distortion-corrected data obtained by correcting the distortion in the image data that corresponds to the selected region selected in the first or second region selection mode which is set in the region selection mode setting step. The present invention can be also applied to an invention of a program and an invention of a recording medium that records this program.

Thus, according to the present invention, it is possible to realize an image processing apparatus, an image processing method, etc. that are convenient and easy to use by the user when using the image data containing a distortion of the image pickup optical section, which is obtained by picking up an optical image from a subject through the above-mentioned image pickup optical section giving the distortion, a reproduction of an image of a partial region of a field of view represented by this image data is performed.

BRIEF DESCRIPTION OF DRAWINGS

[FIG. 3] is a block diagram showing a functional constitution of an image processing section.

[FIG. 4] are explanatory diagrams of a display mode and a region selection mode.

[FIG. 9] is an illustration showing a field of view as a sphere of a three-dimensional space.

[FIG. 10] are illustrations for showing the respective fields of view (image pickup ranges) in picking up by an image pickup section.

[FIG. 11] are explanatory diagrams of image height characteristics of a lens.

[FIG. 15] show one example of a GUI which is displayed when a user instructs changing a selected region through an input section.

[FIG. 16] are explanatory illustrations of a case where it is instructed to switch the selected region when the orthogonal coordinate mode is selected.

[FIG. 18] are illustrations showing display images which are displayed on the display section when the polar coordinate mode is selected.

[FIG. 22] are explanatory illustrations of scale up/down processing for an image displayed in a selected region.

[FIG. 33] are conceptual illustrations of a manner to switch a region selection mode MS in accordance with a direction in which an image pickup section 11 is placed in the image processing system of FIG. 32.

[FIG. 34] are explanatory illustrations of a method of setting threshold values for switching states $S_0$, $S_1$, and $S_2$ of FIG. 33.

[FIG. 36] are explanatory diagrams of a coordinate calculation method in a case where the image processing system of FIG. 32 sets the orthogonal coordinate mode and the polar coordinate mode, respectively.

[FIG. 37] is an explanatory diagram of the coordinate calculation method in a case where the image processing system of FIG. 32 sets the orthogonal coordinate mode and the polar coordinate mode, respectively.

[FIG. 38] are explanatory diagrams of the coordinate calculation method in a case where the image processing system of FIG. 32 sets the orthogonal coordinate mode and the polar coordinate mode, respectively.

[FIG. 39] are explanatory diagrams of the coordinate calculation method in a case where the image processing system of FIG. 32 sets the orthogonal coordinate mode and the polar coordinate mode, respectively.

[FIG. 43] are illustrations showing an example where the image pickup section is placed.

[FIG. 44] are explanatory illustrations of automatic switchover of the region selection mode.

[FIG. 45] are illustrations of a GUI display and an image region movement direction in a case where the region selection mode is switched automatically.

[FIG. 53] are illustrations showing another state of the display mode switchover processing.

BEST MODE FOR CARRYING OUT THE INVENTION

Embodiments of the present invention will be described below with reference to the drawings.

Figure 1:
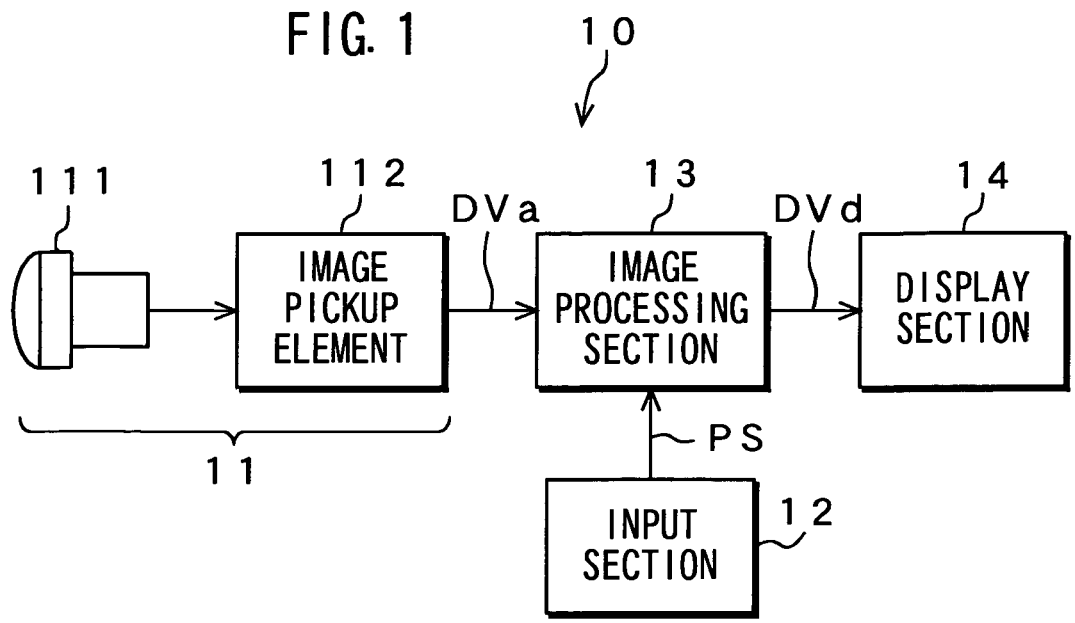
[FIG. 1] is a block diagram showing a constitution of an image processing system according to one embodiment of the present invention.

FIG. 1 is a block diagram showing the constitution of an image processing system according to one embodiment of the present invention.

The image processing system 10 is provided with an image pickup section 11, an input section 12, an image processing section 13, and a display section 14. Further, the image pickup section 11 is constituted by using an image pickup optical section 111 and an image pickup element 112.

The image pickup optical section 111 is used to focus a subject image on an imaging area of the image pickup element 112. In this case, as the image pickup optical section 111, for example, a wide-angle lens is used to focus a wide-field subject image on the imaging area of the image pickup element 112. The wide-angle lens has a field angle of, but not limited to, at least about 45 degrees. On the other hand, the image pickup optical section 111 may be constituted by using a fish-eye lens, a panoramic annular lens (PAL), which is a kind of annular lens, etc. Further, in place of using the wide-angle lens, a tube-shaped, bowl-shaped, or cone-shaped mirror may be used so that a wide-field subject image may be focused on the imaging area of the image pickup element 112 through reflection by this mirror. Further, pluralities of lenses and mirrors may be combined to spread the field of view further. For example, by two fish-eye lenses having a field angle of about 180 degrees, it is possible to obtain a subject image having an all-round view (spherical space (360 degrees)).

As the image element 112, for example, a charge coupled device (CCD), a complementary metal-oxide semiconductor (CMOS) sensor or the like is employed which converts light into an electrical signal. This image pickup element 112 generates image data DVa based on a subject image and supplies it to the image processing section 13.

Figure 2:
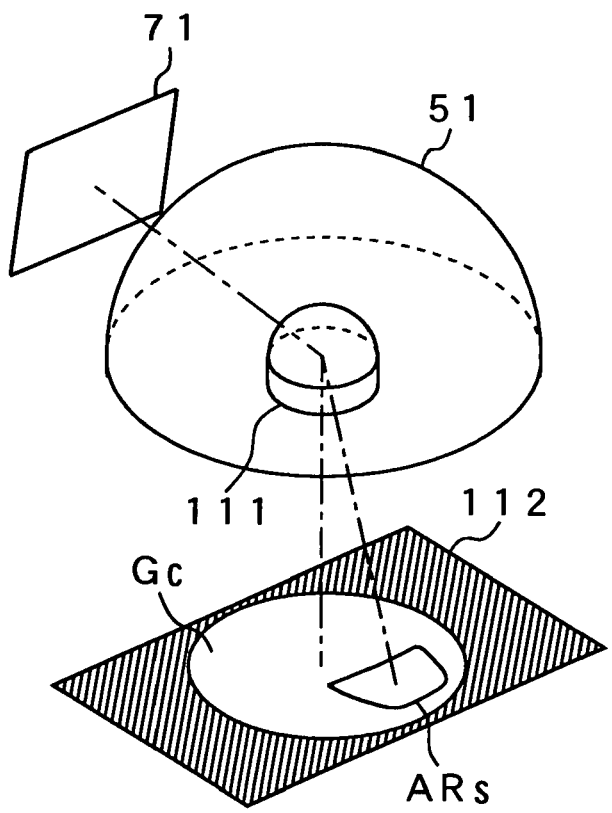
[FIG. 2] is an explanatory illustration of a relationship between a subject image formed on an image pickup element and a selected region.

FIG. 2 shows a relationship between a subject image formed on the image pickup element 112 and a selected region in a case where a fish-eye lens is employed as the image pickup optical section 111. If the image pickup optical section 111 has a field angle of, for example, about 180 degrees and its field of view can be represented by a hemispherical sphere 51 in FIG. 2, a subject image (hereinafter referred to as "wide-field image") Gc, which is formed on the image pickup element 112, will become an image containing distortion due to the image pickup optical section 111, for example, a circular image. Accordingly, when an image is displayed based on the image data DVa obtained by the image pickup element 112, the displayed image becomes one having distortion due to the image pickup optical section 111. In this case, if a selected region is provided which indicates a partial region of a field of view represented by the image data DVa, this selected region corresponds to, for example, a selected region 71 within the field angle of the image pickup optical section 111 and also corresponds to an image region ARs in the wide-field image Gc. Therefore, the image processing section 13 can perform distortion correction processing on the image of the image region ARs for correcting the distortion due to the image pickup optical section 111, to display a distortion-free image of the selected region. Accordingly, by setting such a selected region as to include a desired subject within, for example, a field angle of the image pickup optical section 111, it is possible to display a distortion-free image of the desired subject. Furthermore, by switching the position of a selected region to a new position or changing the size or shape of this region, the position or the size or shape of the image region ARs corresponding to the selected region will also be changed. It is thus possible to display the image of an arbitrary position or region within the field angle of the image pickup optical section 111 in a condition where the distortion due to the image pickup optical section 111 is corrected.

Herein, the selected region can be set by specifying an angle range etc. that indicates a position and a range of the selected region 71 in the field angle of the image pickup optical section 111. Further, the selected region can be set also by specifying a position, a range, etc. of the image region ARs which is set on the wide-field image Gc because the image region Gc corresponds to the selected region as described above.

It should be noted that in a case where a fish-eye lens is used, the smaller the selected region is and the closer it is located to the center of a field of view, the more the range of the image region ARs resembles the selected region in shape. Conversely, the larger the selected region is and the closer it is located to an edge of the field of view, the range of the image region ARs is distorted with respect to the selected region in shape.

The input section 12 is used to switch the position of a selected region, change the region size and the region shape of the selected region, and set the operation mode and the image display mode in switchover of the selected region, in response to the operations of a user. The input section 12 may be any device as far as it can be operated by the user. It may be, for example, a mouse, a keyboard, a switch device, a touch sensor, a game machine controller, a stick-like manipulator that can be gripped by the user, etc. The input section 12 generates input information PS that corresponds to the user operations and supplies it to the image processing section 13.

The image processing section 13 performs distortion correction processing by using the image data DVa supplied from the image pickup section 11, to generate an image of the selected region in which distortion due to the image pickup optical section 111 is corrected. Further, the image processing section 13 sets a display mode for the image to be displayed on the display section 14, generates image data DVd of the display image corresponding to the thus set display mode, and supplies it to the display section 14. It should be noted that the image processing section 13 uses as the display image the wide-field image, the image of the selected region in which the distortion are corrected, and the like. Further, the image processing section 13 sets a region selection mode, which is an operation mode activated when switching the position of a selected region, and switches the selected region in the thus set region selection mode based on the input information PS from the input section 12. Also, the image processing section 13 performs processing to set it to a display mode or region selection mode, which is specified beforehand at a time of an initial operation start, processing to set it to a display mode or region selection mode at a time of an operation completion and to start the operation, and the like.

The display section 14 is constituted of a liquid crystal display element, an organic EL element or the like, to display an image based on the image data DVd supplied from the image processing section 13.

In the image processing system 10 according to the present embodiment, the image pickup section 11, the input section 12, the image processing section 13, and the display section 14 may be integrated with each other or separated from each other. Further, only some of them may be integrated with each other. For example, if the input section 12 and the display section 13 are integrated with each other, it is easily possible to operate the input section 12 with confirming a display on the display section 14. Furthermore, in the image pickup section 11, the image pickup optical section 111 and the image pickup element 112 may be integrated with each other or separated from each other.

FIG. 3 is a block diagram showing a functional constitution of the image processing section 13. The image processing section 13 has a distortion correction section 13a, a region selection mode setting section 13b, a display mode setting section 13c, a data output section 13d, and a control section 13e.

The distortion correction section 13a performs distortion correction to correct distortion through the image pickup optical section 111 by using image data that corresponds to a selected region in the image data DVa, thereby generating distortion-corrected data.

The region selection mode setting section 13b sets a region selection mode, which is an operation mode when setting or switching the selected region. This region selection mode setting section 13b is provided with, as the region selection mode MS, an orthogonal coordinate mode MS1 serving as a first region selection mode and a polar coordinate mode MS2 serving as a second region selection mode, as shown in FIGS. 4, for example, and then selectively sets either one of these region selection modes. Those region selection modes will be respectively described later.

The display mode setting section 13c sets a display mode when a distortion-corrected image etc. is displayed on the display section 14. As shown in FIG. 4, for example, this display mode setting section 13c is provided with, as the display mode MH, an entire image display mode MH1, a selected image display mode MH2, a both display mode MH3, and a divided display mode MH4 and then sets any one of these display modes. Those display modes will be respectively described later.

The data output section 13d outputs the image data of a display image that corresponds to the thus set display mode. Herein, it outputs distortion-corrected data if an image in a selected region whose distortion due to the image pickup optical section 111 is corrected, is displayed as the display image. Further, if a wide-field image is displayed as the display image, it outputs image data supplied from the image pickup section 11. Furthermore, if a wide-field image and an image in a selected region whose distortion due to the image pickup optical section 111 is corrected are displayed, it generates new image data by using the distortion-corrected data and the image data supplied from the image pickup section 11 and outputs it.

The control section 13e sets or switches the selected region in accordance with the region selection mode MS which is set by the region selection mode setting section 13b.

Figure 5:
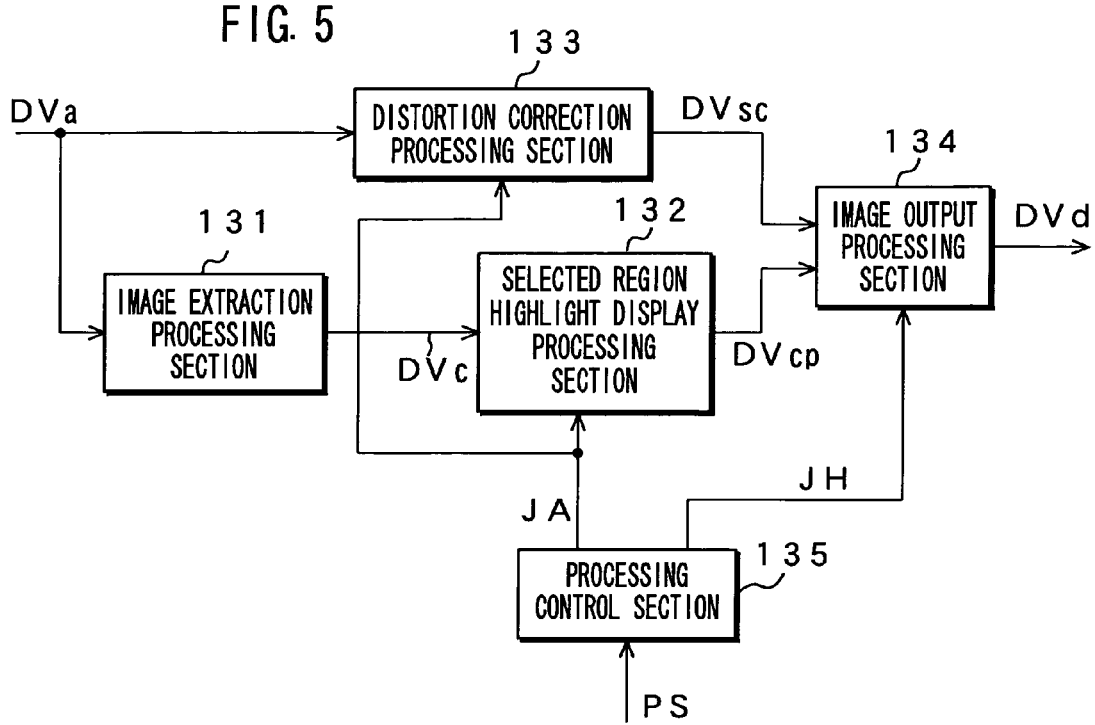
[FIG. 5] is a block diagram exemplifying a specific constitution of the image processing section.

FIG. 5 is a block diagram exemplifying a specific constitution of the image processing section 13. The image data DVa is supplied to an image extraction processing section 131 and a distortion correction processing section 133.

The image extraction processing section 131 extracts image data DVc on the wide-field image (subject image) Gc from the image data DVa and supplies it to a selected region highlight display processing section 132. Herein, as shown in FIG. 2, the wide-field image Gc indicates a partial region on the sensor surface of the image pickup element 112 and is determined by the image pickup optical section 111. Accordingly, if the region of the wide-field image Gc is fixed on the sensor surface, predetermined image data is extracted from the image data DVa and pixel data of a region of the wide-field image Gc is extracted. Further, if the image pickup optical section 111 can be replaced and the region of the wide-field image Gc changes on the sensor surface or if the region of the wide-field image Gc changes on the sensor surface because the optical characteristics of the image pickup optical section 111 can be changed, it identifies the region of the wide-field image Gc on the sensor surface beforehand and then extracts the image data of this identified region of the wide-field image Gc. The region of the wide-field image Gc is identified by, for example, filling the entirety of a view of field by the image pickup optical section 111 with a white subject, picking it up, and detecting pixel positions at which the image data DVa takes on a white level. It is thus possible to identify the region of the wide-field image Gc easily.

The selected region highlight display processing section 132 performs processing such that the user can easily distinguish between a selected region indicated by selected region setting information JA supplied from a later-described processing control section 135 and the corresponding image region ARs, in the wide-field image Gc, based on this selected region setting information JA. For example, the selected region highlight display processing section 132 conducts display control so that the image region ARs can be identified by providing boundary display that indicates a boundary between the image region ARs and the region other than this image region ARs or by changing luminance or color of the region other than the image region ARs. The image of this image region ARs is highlighted so as to be identifiable and hereinafter referred to as a highlighted image Gs. By performing such image processing, image data DVcp of an image (hereinafter referred to as "entire image Gcp") whose image region ARs is made identifiable as the highlighted image Gs in the wide-field image Gc is generated and supplied to an image output processing section 134.

The distortion correction processing section 133, which corresponds to the distortion correction section 13a shown in FIG. 3, corrects distortion due to the image pickup optical section 111 by using the image data DVa to generate corrected image data DVsc in which the distortion of the selected region indicated by the selected region setting information JA supplied from the processing control section 135 is corrected and supplies it to the image output processing section 134.

The image output processing section 134, which corresponds to the data output section 13d shown in FIG. 3, generates the image data DVd of a display image by using the image data DVcp and/or the corrected image data DVsc based on display control information JH from the processing control section 135.

The processing control section 135 corresponds to the region selection mode setting section 13b, the display mode setting section 13c, and the control section 13e. The processing control section 135 sets a region selection mode, sets or switches a selected region based on the input information PS from the input section 12 in accordance with the thus set region selection mode, generates selected region setting information JA which indicates a set selected region or a newly set selected region, and supplies it to the selected region highlight display processing section 132 and the distortion correction processing section 133. Further, the processing control section 135 sets a display mode, generates display control information JH in accordance with the thus set display mode, and supplies it to the image output processing section 134. The processing control section 135 further performs processing to contain a menu display in a display image based on the display control information JH or the like.

The image processing section 13 is constituted of, for example, hardware such as a central processing unit (CPU), a random access memory (RAM), and a read only memory (ROM), software stored in the ROM etc., firmware or the like. Further, the image processing section 13 may be constituted of a field programmable gate array (FPGA) or a digital signal processor (DSP) and the like, and also, may be provided with a video encoder, a sound encoder, an interface for acquiring the above-described input information PS, an interface for outputting the image data DVd to the above-described display section 14 or the like. Further, both of the FPGA and the DSP may be used in such a manner that they would perform their own tasks separately.

The input information PS to be supplied from the input section 12 to the image processing section 13 is information indicating the above-described setting of the display mode MH and the region selection mode MS, instructions to switch the selected region, etc. Further, the information that indicates the instructions to switch the selected region may include information to move a selected region in predetermined units in a predetermined direction, information that indicates the changed position of the selected region, etc. The input information PS may further include information to change the region size of a selected region, information to rotate the selected region, information to set a region shape of the selected region, etc.

A selected region is not limited to an embodiment in which switchover etc., are performed in accordance with a user operation. For example, such an embodiment may be thought of that a selected region would be set to a position specified beforehand as described above. In this case, information about this selected region may be stored beforehand in an ROM, external storage device, not shown, or the like. Further, in a case where a specific region in a wide-field image Gc is automatically recognized, such an embodiment may also be considered that this automatically recognized specific region would be processed as an image region ARs that corresponds to a selected region. For example, in a case where a moving subject is automatically recognized, such an embodiment may be thought of that a region including this moving subject would be processed automatically as an image region ARs. Alternatively, such an embodiment may be possible that an image region detected in a wide-field image Gc by a variety of sensors, not shown, would be processed as an image region ARs that corresponds to a selected region. In this case, the sensor may be, for example, a temperature sensor, a sound sensor, a pressure sensor, an optical sensor, a humidity sensor, a vibration sensor, a gas sensor, or any other one of the various sensors. A sensor signal generated by such a sensor is supplied to the processing control section 135, which then utilizes this sensor signal to switch a selected region or control the respective sections. For example, if a defective temperature or sound is detected, by automatically switching a selected region corresponding to a direction in which the defective temperature or sound is detected, a picked up image of the direction in which the defective temperature or sound is detected can be displayed on a screen of the display section 14 in a condition where its distortion is corrected. Further, by switching the display mode, the size or shape of a region, etc. in response to detection of a defect, it is possible to display the image in such a manner that the user can easily confirm the defect.

It should be noted that the constitution shown in FIG. 5 is just illustrative and the image processing section 13 is not limited to that of the constitution shown in FIG. 5 as far as it has such a mechanism as shown in FIG. 3. For example, the image extraction processing section 131 need not be provided if image data DVa supplied from the image pickup section 11 indicates only a wide-field image Gc. Further, the selected region highlight display processing section 132 may be placed at an output side instead of an input side of the image output processing section 134. In this case, if a wide-field image is included in an image based on the image data DVa, an image region that corresponds to a selected region in the wide-field image will be processed in such a manner that it can be easily identified by the user.

Figure 6:
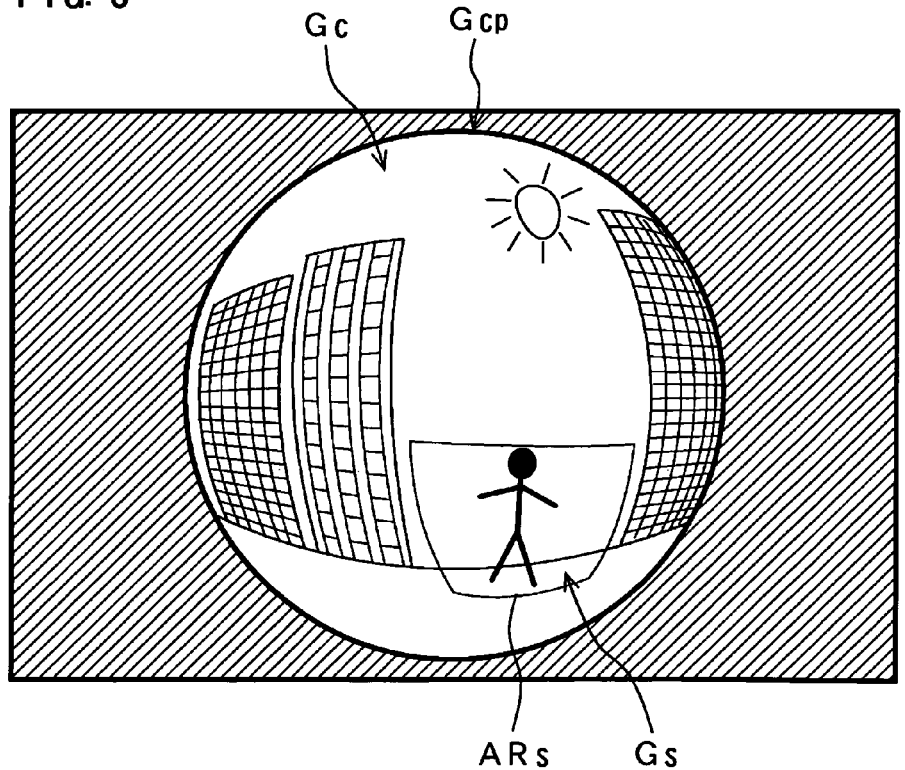
[FIG. 6] is an illustration showing an entire image.

FIG. 6 shows an entire image. If distortion correction is not performed on the image data DVa by the image processing section 13, a wide-field image Gc becomes an image containing a distortion generated through the image pickup optical section 111. Herein, if a selected region is set by the processing control section 135, the selected region highlight display processing section 132 performs image processing so that a selected region can be easily identified as described above. That is, boundary display (for example, frame display) may be provided to indicate a boundary between the image region ARs corresponding to a selected region and the region other than the image region ARs in a displayed wide-field image Gc or the luminance or color of the region other than the image region ARs is changed to provide a highlighted image Gs in which the image region ARs is highlighted. It should be noted that if a selected region is set all over a field of view, the image region ARs corresponding to the selected region indicates the entirety of the wide-field image Gc.

Figure 7:
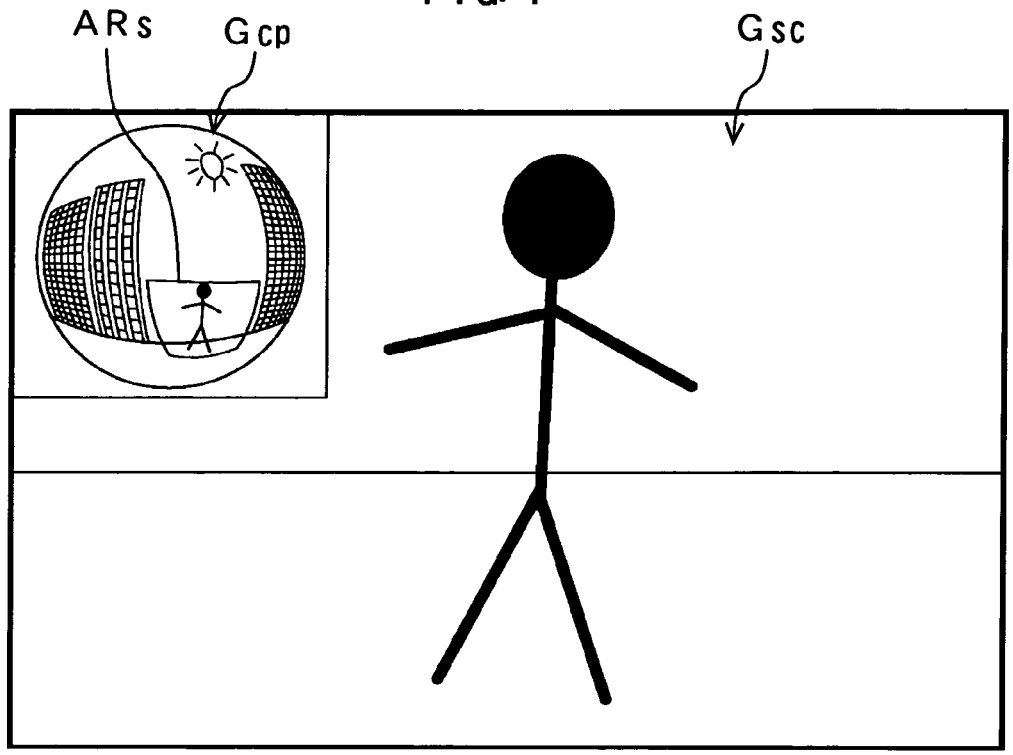
[FIG. 7] is an illustration showing one example of an image which is displayed on a display section.

Further, the processing control section 135, if having set the entire image display mode MH1 by controlling the operations of the image output processing section 134 based on the display control information JH, controls the image output processing section 134 to generate image data DVd by which only an entire image Gcp is to be displayed in which an image region ARs can be identified as a highlighted image Gs in a wide-field image Gc such as shown in FIG. 6. Further, if having set the selected image display mode MH2, the processing control section 135 controls the image output processing section 134 to generate image data DVd by which only an image (hereinafter referred to as "selected region display image") Gsc is to be displayed in which distortion generated through the image pickup optical section 111 is corrected on the image of the image region ARs. Further, if having set the both display mode MH3, the processing control section 135 controls the image output processing section 134 to generate image data DVd of a display image in which an entire image Gcp and a selected region display image Gsc are displayed simultaneously as shown in FIG. 7. Furthermore, if a plurality of selected regions are set, it controls the image output processing section 134 to generate image data DVd of a display image in which an entire image Gcp is displayed together with an image, as a selected region display image Gsc, in which distortion of highlighted images corresponding to these selected regions is corrected. Herein, when displaying the entire image Gcp and the selected region display image Gsc simultaneously as shown in FIG. 7, the image output processing section 134 can use, for example, the on screen display (OSD) technology.

Figure 8:
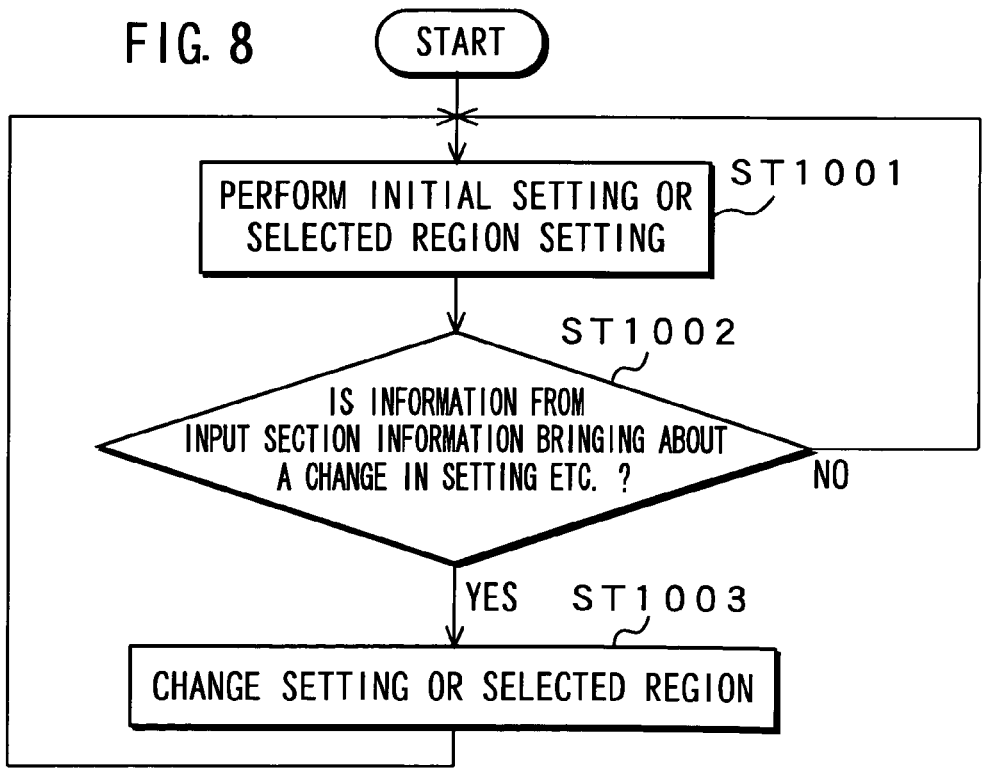
[FIG. 8] is a flowchart showing operations of a processing control section.

Next, the operations of the processing control section 135 will be described below with reference to a flowchart of FIG. 8. The processing control section 135 performs initial setting of a display mode and a region selection mode and setting of a selected region (ST1001). For example, when an initial operation starts, a preset display mode or region selection mode is set. Also, a selected region is set to a predetermined size and along a preset direction of field of view. Further, when the operation ends, information indicating the setting state of the display mode and the region selection mode and the setting state of the selected region may be stored and then this information may be used when the operation starts next so that the operation can start with being a state at the end of the previous operation.

The processing control section 135 determines whether or not the input information PS supplied from the input section 12 is information that brings about a change in setting etc. (ST1002). If the input information PS is information bringing about the change in the setting etc. (YES at ST1002), the processing control section 135 changes the setting of a display mode and a region selection mode as well as a selected region in accordance with the acquired input information PS and controls the operation of the distortion correction processing section 133 so as to perform distortion correction processing on an image of the changed selected region. Also, it controls the selected region highlight display processing section 132 so that the image of the changed selected region can be identified. Further, it controls the operation of the image output processing section 134 so that image data DVd corresponding to the changed mode may be generated (ST1003). Further, if the acquired input information PS brings about a change in size or shape of the selected region, it controls the distortion correction processing section 133 and the selected region highlight display processing section 132 so that distortion correction processing and highlight display processing may be performed corresponding to the changed selected region. For example, if the selected region is set to the shape of a circle, an ellipsoid, a triangle, a pentagon, or a further polygon, a shape constituted of straight lines and curves, or a more complicated geometry, it controls the distortion correction processing section 133 so that distortion correction may be performed on an image included in the selected region having any one of those shapes. It further controls the operation of the selected region highlight display processing section 132 so as to provide a highlighted image that corresponds to the selected region having any one of those shapes. It should be noted that if the input information PS brings about no change in setting or selection (NO at ST1002), the operation goes back to ST1002 to decide whether or not input information PS newly supplied from the input section 12 brings about a change in setting or selection.

Hereinafter, the processing of the processing control section 135 acquiring the input information PS and obtaining an image of a selected region in a condition where its distortion is corrected is referred to as development processing.

Next, a state mode in which the image pickup optical section 111 is placed will be described with reference to FIGS. 9 and 10. If a field of view is represented as a three-dimensional space as shown in FIG. 9, a selected region can be represented on a sphere 52. It should be noted that an angle $\theta$ with respect to arrow OA as an optical axis represents an angle of incidence.

In this case, if the image pickup optical section 111 is constituted of a fish-eye lens having a field angle of, for example, about 180 degrees, its field of view corresponds to the hemisphere of the sphere 52. Therefore, if the image pickup optical section 111 is placed right upward, as shown in FIG. 10(A), the upper half of the sphere provides the field of view of the image pickup optical section 111. It should be noted that the field of view of the upper half of the sphere is referred to as an upper hemispherical field of view. Also, if the image pickup optical section 111 is placed right downward, as shown in FIG. 10(B), the lower half of the sphere provides the field of view of the image pickup optical section 111. It should be noted that the field of view of the lower half of the sphere is referred to as a lower hemispherical field of view. Further, if the image pickup optical section 111 is placed horizontally to pick an image from the front side, as shown in FIG. 10(C), the front half of the sphere provides the field of view of the image pickup optical section 111. It should be noted that the field of view of the front half of the sphere is referred to as a front hemispherical field of view. Also, if picking an image up from the right or left side instead of the front side, a right or left hemispherical field of view is obtained, respectively.

In a case where the image pickup optical section 111 is placed right upward, that is, the optical axis of the image pickup optical section 111 is roughly aligned with the vertical line to direct a picking-up direction upward, such a situation is assumed that, for example, the user may look upward from the ground, the floor, or the desk. In a case where the image pickup optical section 111 is placed right downward, that is, the optical axis of the image pickup optical section 111 is roughly aligned with the vertical line to direct the picking-up direction downward, such a situation is assumed that, for example, the user may look downward from the ceiling or the sky. In a case where the image pickup optical section 111 is placed horizontally, such a situation is assumed that, for example, the user may see from a wall etc. perpendicular to the ground horizontally or laterally.

Besides, such a field of view may be through of as an obliquely upward or downward half. In such a manner, a hemispherical field of view is obtained along a direction in which the image pickup optical section 111 is placed (direction in which the image pickup section 11 is placed if the image pickup optical section 111 and the image pickup element 112 are integrated with each other). It should be noted that not only in a case where a fish-eye lens is used but also in a case where a wide-angle lens or a mirror is used, the direction of the field of view changes in accordance with the direction of placement. Further, if a field of view is large, a part of its range of the field of view may be selected and this selected part of the range of the field of view may be utilized.

Next, distortion correction processing by the distortion correction processing section 133 will be described below. As a method of the distortion correction processing, a geometrical correction technique may as well be used to employ a general algorithm that converts, for example, a two-dimensional coordinate system containing distortion into a two-dimensional orthogonal coordinate system containing no distortion. In this case, a conversion equation or table may be saved in an ROM or any other memory, not shown. However, besides such distortion correction technique, any other publicly known distortion correction technique may be used.

FIG. 11 are explanatory diagrams of image height characteristics of a lens. In FIG. 11(A), an upper hemispherical field of view around point O is displayed two-dimensionally as viewed in the y-axial direction. In the figure, an arrow OPk indicates a direction of a subject, for example. Assuming a focal point of the subject placed in the direction indicated by this arrow OPk to be point Q, a distance from the point O to the focal point Q provides an image height Lh. FIG. 11(B) is a graph which illustrates the characteristics of this image height. Its horizontal axis represents an angle (angle of incidence) $\theta$ and its vertical axis represents an image height Lh. Its data may be stored in a memory as a conversion table beforehand.

Figure 12:
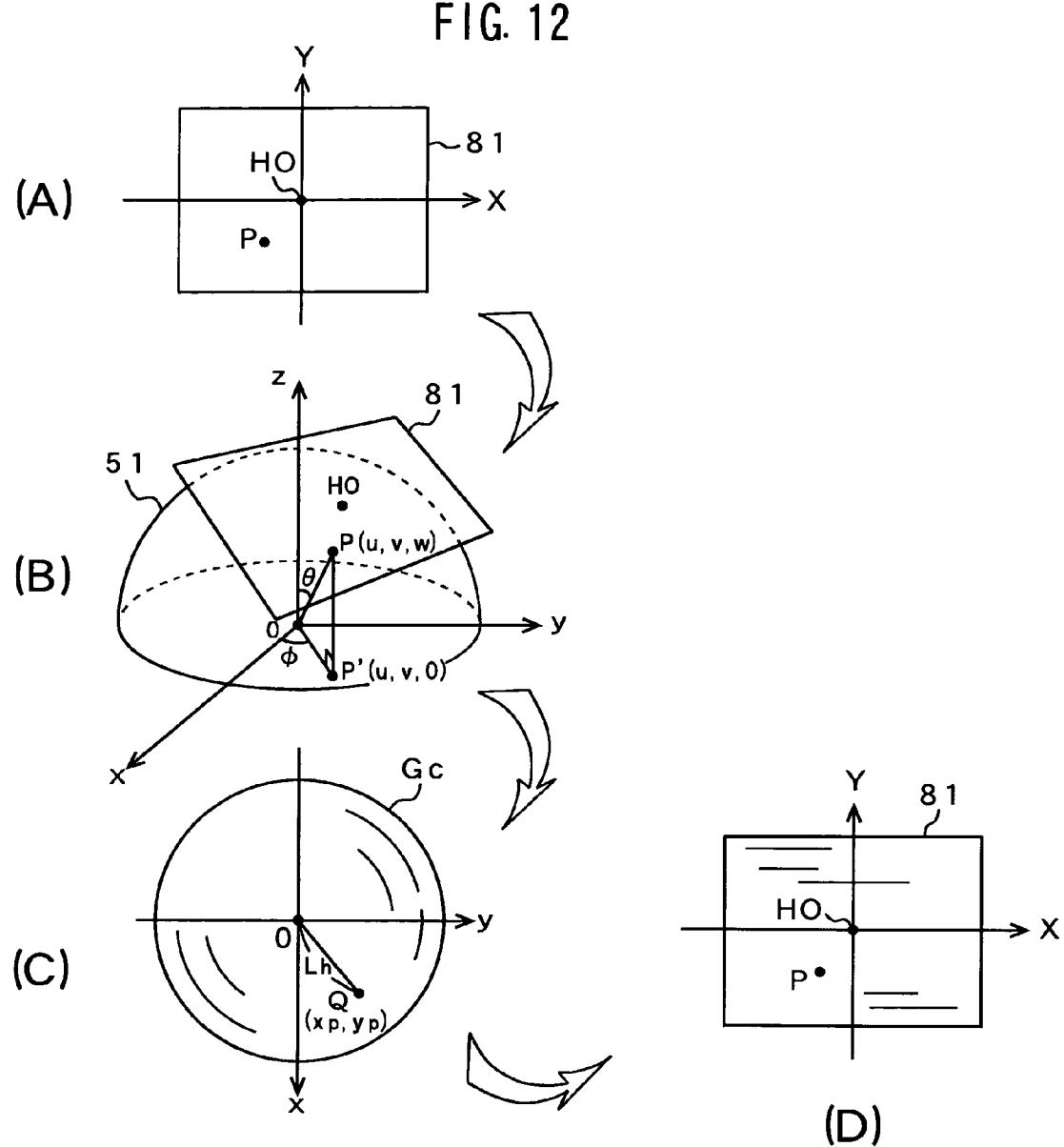
[FIG. 12] are explanatory diagrams of principles of distortion correction processing.

FIG. 12 are explanatory diagrams of the principle of the distortion correction processing. FIG. 12(A) is a display plane 81 which shows the range of an image to be displayed on the display section 14. FIG. 12(B) shows a state where the display plane 81 is set with respect to the sphere 51 in the upper hemispherical field of view. Herein, if an image in a selected region is to be displayed on the display section 14, the display plane 81 which shows the range of this display image corresponds to a selected region. FIG. 12(C) shows a state where the sphere 51 shown in FIG. 12(B) is projected onto an x-y plane, so that an area to which this sphere 51 is projected corresponds to the region of the entire image Gcp.

A point, for example, a point P on the display plane 81 which is set with respect to the sphere 51 of the upper hemispherical field of view will be described below. Assuming the position of this point P to be P (u, v, w), angle $\theta$ can be obtained by calculating $\theta = \arccos\ [w/((u^2+v^2+w^2)^{1/2})]$ because $OP=(u^2+v^2+w^2)^{1/2}$. It should be noted that a center of the display plane is assumed to be HO. Further, by obtaining beforehand the above image height characteristics of the image pickup optical section 111 and storing a conversion table of the angle $\theta$ and the image height Lh, an image height Lh with respect to the point P can be obtained by calculating the angle $\theta$.

Further, assuming an intersection point between the x-y plane and a perpendicular line dropped from the point P to the x-y plane to be point P' (u, v, 0), $OP'=OP\times\sin(\theta)$. Therefore, a focal point Q(xp, yp) takes on a position where $xp=u\times Lh/((u^2+v^2+w^2)^{1/2}\times\sin(\theta))$ and $yp=v\times Lh/((u^2+v^2+w^2)^{1/2}\times\sin(\theta))$ and thus, the focal point Q(xp, yp) can be obtained.

Further, the position of the focal point Q may be obtained from an angle $\theta$ and an image height Lh after obtaining the angle $\phi$ between the x-axis and a direction of the point P' on the x-y plane corresponding to the point P. Herein, the angle $\phi$ can be obtained by calculating $\phi=\arccos\ [u/((u^2+v^2)^{1/2})]$. Therefore, a position which is away from the point O by the image height Lh in a direction of the angle $\phi$ with respect to the x-axis provides the focal point Q.

By obtaining a pixel signal of the thus obtained focal point Q from the image pickup pixel 112, point P is drawn on the display plane 81 based on the pixel data as shown in FIG. 12D. Further, by performing the same processing on every point (pixel) on the display plane 81, it is possible to display on the display plane 81 an image whose distortion due to the image pickup optical section 111 is corrected. It should be noted that if there is no pixel signal corresponding to the focal point Q, the pixel signal of pixels around the focal point Q may be used to generate a pixel signal corresponding to the focal point Q. For example, through interpolation etc. between the pixel signals of the pixels around the focal point Q, it is possible to generate the pixel signal that corresponds to the focal point Q.

By thus performing the drawing through the use of the pixel data of the focal point Q corresponding to each of the points on the display plane 81, a distortion-corrected image can be obtained, so that the processing control section 135 generates information that can identify a focal point corresponding to a selected region, that is, an image region ARs corresponding to the selected region, as the selected region setting information JA. For example, the processing control section 135 generates information that indicates a selected region by using angles θ and φ shown in FIG. 12B as the selected region setting information JA. In this case, an image region ARs corresponding to the selected region can be identified from an image height Lh corresponding to the angle θ and the angle φ, so that the selected region highlight display processing section 132 can generate image data DVcp of an entire image Gcp in which an image region ARs corresponding to the selected region is given as a highlighted image Gs. Further, by obtaining pixel data corresponding to each of pixels based on angles θ and φ that indicate those pixels on the display plane corresponding to a selected region, the distortion correction processing section 133 can generate distortion-corrected image data DVsc of a selected region display image Gsc on which distortion correction processing is performed. Further, even if a coordinate value that indicates the range of a selected region is used as the selected region setting information JA, by performing the above-described calculation processing etc., it is possible to generate the image data DVcp of an entire image Gcp and the distortion-corrected image data DVsc of a selected region display image Gsc. Further, by using a coordinate value, even if a selected region has a complicated shape, the selected region can be shown easily.

Next, the region selection mode will be described below. As the region selection mode MS, the orthogonal coordinate mode MS1 serving as the first region selection mode and the polar coordinate mode MS2 serving as the second region selection mode are prepared, as shown in FIG. 4.

The orthogonal coordinate mode MS1 is a mode such that, for example, as shown in FIG. 10(C), if viewing from a wall etc. perpendicular to the ground horizontally or laterally as the front hemispherical field of view, an distortion-corrected image of a desired subject can be obtained easily. Specifically, if the input information PS that indicates an instruction to switch a selected region is supplied from the input section 12, the processing control section 135 performs calculation processing to move the selected region 71 in the axial direction of an orthogonal coordinate system based on the switchover instruction, thereby generating selected region setting information JA that indicates a newly set selected region.

Figure 13:
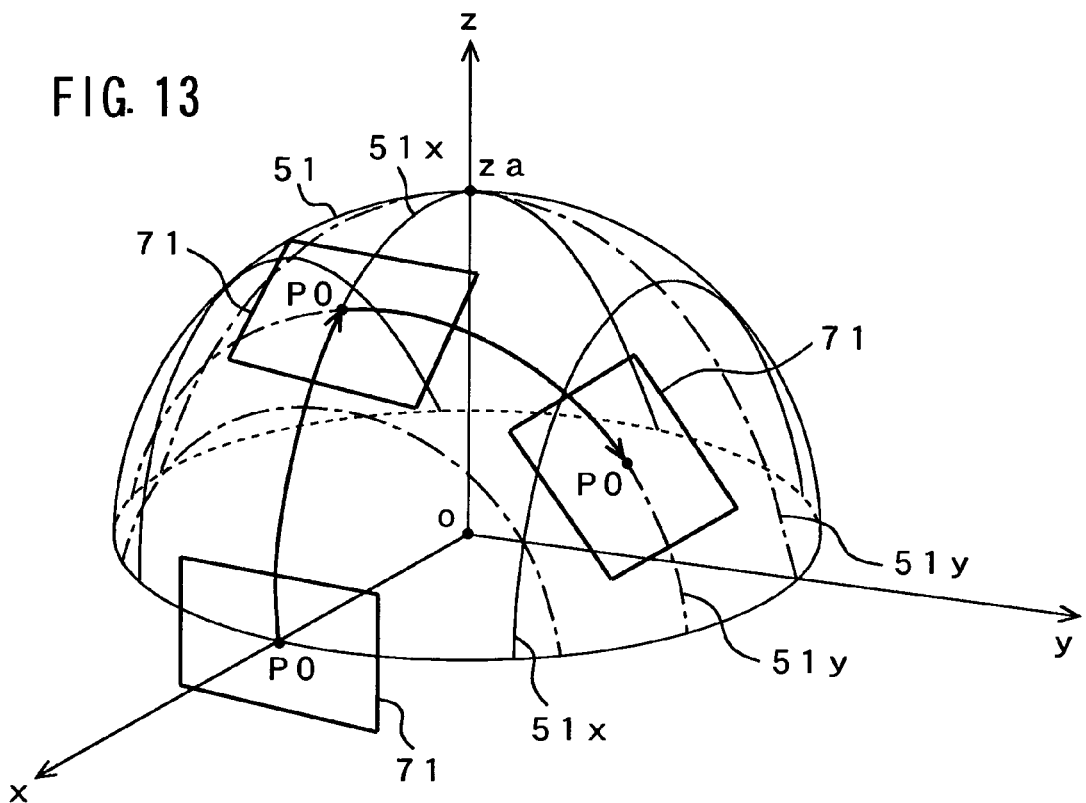
[FIG. 13] is an explanatory illustration of operations in an orthogonal coordinate mode out of region selection modes.

FIG. 13 is an explanatory illustration of operations in the orthogonal coordinate mode MS1 out of the region selection modes. In the orthogonal coordinate mode MS1, the selected region 71 is switched using an orthogonal coordinate system in accordance with a switchover instruction. The switchover instruction indicates, for example, an x-coordinate value and a y-coordinate value of the post-switchover selected region or x-directional and y-direction movement distances of the selected region, thereby switching the selected region 71 on the orthogonal coordinates. Herein, if only one of the x-coordinate and the y-coordinate is changed, the selected region 71 moves to a new position along the axial direction of the orthogonal coordinate system. Further, if the x-coordinate and the y-coordinate are changed, the selected region 71 moves to a new position obliquely with respect to the axial direction of the orthogonal coordinate system.

If the selected region 71 is sequentially set by moving it in the x-axis direction based on a switchover instruction, the trajectory of an arbitrary point (for example, center PO) in the selected region 71 follows line 51x. On the other hand, if the selected region 71 is sequentially set by moving it in the y-axis direction based on a switchover instruction, the trajectory of center PO in the selected region 71 follows line 51y. It should be noted that as the selected region 71 moves, the image region ARs also moves.

In such a manner, in the orthogonal coordinate mode Msl, the above-described selected region is switched by changing the coordinate values of the orthogonal coordinate system. Therefore, by selecting the orthogonal coordinate mode MS1 in a case where the front hemispherical field of view is provided, the selected region 71 can be easily set to a horizontally or vertically moved position in accordance with a selected region switchover instruction, so that an image displayed on the display section 14 can be easily switched to an image present in a desired direction. For example, it is easily possible to select a desired one of horizontally arranged subjects and display the same.

Next, the polar coordinate mode MS2 will be described below. The polar coordinate mode MS2 is a mode such that, for example, as shown in FIG. 10(A), if viewing upward from the ground, a floor, or a desk as the upper hemispherical field of view or, as shown in FIG. 10B, if viewing downward from the ceiling or the sky as the lower hemispherical field of view or the like, an image of a desired subject on which distortion correction is performed can be obtained easily. Specifically, if the input information PS that indicates an instruction to switch a selected region is supplied from the input section 12, the processing control section 135 performs calculation processing to move the selected region 71 in a direction in which an argument is changed of the polar coordinate system based on the switchover instruction, thereby generating selected region setting information JA that indicates a newly set selected region.

Figure 14:
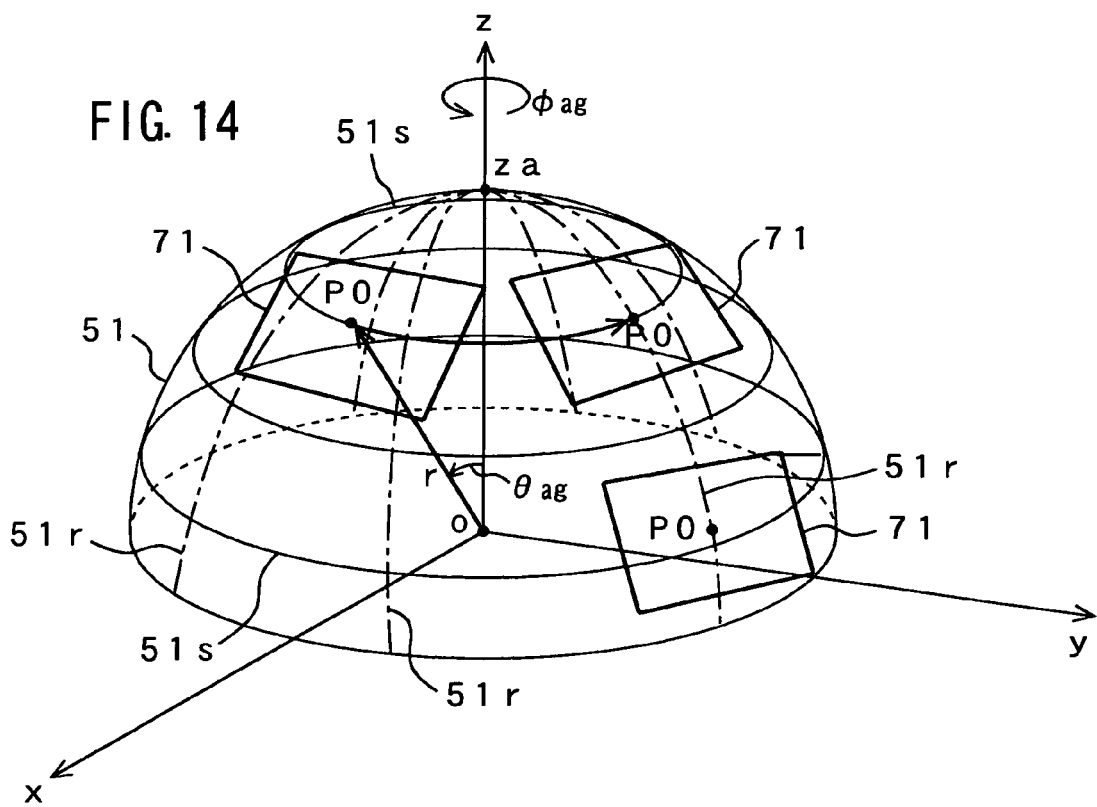
[FIG. 14] is an explanatory illustration of operations in a polar coordinate mode out of the region selection modes.

FIG. 14 is an explanatory illustration of operations in the polar coordinate mode MS2 out of the region selection modes. In the polar coordinate mode MS2, the selected region 71 is switched using a polar coordinate system in accordance with a switchover instruction. If a field of view is expressed as a three-dimensional space as shown in FIG. 14, for example, a switchover instruction indicates an argument θag and an argument φag of the post-switchover selected region and a variation angle of the argument θag or that of the argument φag so that the selected region 71 may be switched in the polar coordinates. Herein, if only any one of the argument θag and the argument φag is changed, the selected region 71 moves to a new position in a direction in which the argument θag of the polar coordinate system is changed (hereinafter referred to as "θag-changed direction) or a direction in which the argument θag is changed (hereinafter referred to as "θag-changed direction) thereof. Further, if the argument θag and the argument φag are changed, the selected region 71 moves to a new position obliquely with respect to the θag-changed direction or the φag-changed direction of the polar coordinate system.

If the selected region 71 is sequentially set by moving it in the θag-changed direction based on a switchover instruction, the trajectory of an arbitrary point (for example, center PO) in the selected region 71 follows line 51r. On the other hand, if the selected region 71 is sequentially set by moving it in the φag-changed direction based on a switchover instruction, the trajectory of center PO in the selected region 71 follows line 51s. It should be noted that as the selected region 71 moves, the image region ARs also moves.

Further, if a field of view is expressed using an image which is expressed in a two-dimensional space, a switchover instruction indicates, for example, an argument φag and a moving radius of the post-switchover selected region or a variation angle of the argument φag or that of the moving radius, thereby switching the selected region 71 in polar coordinates also in the case of expressing the field of view using a two-dimensional space.

In such a manner, in the polar coordinate mode MS2, the selected region is switched by changing the argument and/or the moving radius of the polar coordinate system. Therefore, by selecting the polar coordinate mode MS2 in a case where the upper or lower hemispherical field of view is provided, the selected region 71 can be easily set to a position reached by moving in an argument-changed direction in accordance with a selected region switchover instruction, so that an image displayed on the display section 14 can be easily switched to an image present in a desired direction. For example, it is easily possible to select a desired one of subjects arranged around the image pickup optical section 111 and display the same.

FIG. 15 shows one example of a graphical user interface (GUI) which is displayed when a user operates a selected region using the input section 12. Operation input screens Gu shown in FIGS. 15(A) and 15(B) may be displayed on the display section 14 together with the entire image Gcp and the selected region display image Gsc which have been shown in FIG. 7. Alternatively, the operation input screens Gu and the entire image Gcp etc. may be separately displayed on different display sections. Further, a display section separate from the display section 14 on which the entire image Gcp and the selected region display image Gsc are displayed may be provided at, for example, the input section 12, thus providing GUI display on this display section. The operation input screen Gu is provided with a direction button group Gua or a direction button group Gub, a "Scale up" button Guc1, and a "Scale down" button Guc2. In FIG. 15(A), as the direction button group Gua, for example, there are a central "Select" button Gua1 and the other direction buttons Gua2 such as "Up", "Down", "Right", and "Left" buttons surrounding it. Further, in FIG. 15(B), as the direction button group Gub, for example, there are a central "Select" button Gub1 and the other bearing buttons Gub2 such as "North" and "SE (South east)" buttons surrounding it.

FIG. 16 are explanatory illustrations of a case where it is instructed to switch a selected region when the orthogonal coordinate mode MS1 is selected. In this example, a case in which the both display mode MH3 is employed as the display mode MH is described. Further, in the following description, an example is used in which the user perform operations as viewing the operation input screen Gu etc. shown in FIG. 15(A).

Suppose that the user presses the "Right" button out of the direction buttons Gua2 once or a plurality of times or continuously by using the mouse or the keyboard etc. in a state shown in FIG. 16(A). It should be noted that "to press continuously" refers to a state in which a button, if pressed once, is held down without being released, that is "continuous pressing".

If the "Right" button is pressed in such a manner, in accordance with the corresponding input information PS input through the input section 12, the processing control section 135 in the image processing section 13 performs switchover processing on a selected region in a direction that corresponds to the orthogonal coordinate mode MS1, thereby generating selected region setting information JA that indicates a newly set selected region. Further, the processing control section 135 supplies the generated selected region setting information JA to the selected region highlight display processing section 132 to change a highlight display region so that a highlighted image Gs may show an image region ARs that corresponds to the newly set selected region. Moreover, the processing control section 135 supplies the generated selected region setting information JA to the distortion correction processing section 133 to provide the image of an image region ARs corresponding to the newly set selected region as an selected region display image Gsc in which distortion generated through the image pickup optical section 111 is corrected.

Further, the image output processing section 134 generates image data DVd of a display image including the selected region display image Gsc in accordance with the display mode and supplies it to the display section 14.

Thus, in the display section 14, as shown in FIG. 16(B), an image in which the selected region is moved rightward is displayed. In the entire image Gcp also, the position of the highlighted image Gs is updated. Further, if the "Right" button is pressed a plurality of number of times or continuously, the processing control section 135 sets a movement distance for the selected region in accordance with the number of times the "Right" button is operated or a period of time when it is held down, thereby updating the selected region display image Gsc. In such a manner, the processing control section 135 performs the development processing in the orthogonal coordinate system, to display the selected region display image on the display section 14.

Further, if the "Up" button is pressed by the user, in accordance with the corresponding input information PS, the processing control section 135 performs switchover processing on a selected region, to cause the display section 14 to display the highlighted image Gs of an image region ARs which moves as the selected region is switched, as a selected region display image Gsc in which distortion generated through the image pickup optical section 111 is corrected.

The respective "Select" buttons Gua1 and Gub1 in FIGS. 15(A) and 15(B) may possibly be utilized variously. For example, they can be utilized as a recording start button to record a selected region display image Gsc in the current image region ARs. Further, in a case where an image region ARs is not displayed as a highlighted image Gs, they can be utilized as a region selection operation start button to start a region selection operation so that the user can select a region in a condition where this image region ARs is displayed as a highlighted image Gs. Alternatively, they can be utilized as a switchover button of the display mode MH or any one of various other determination buttons.

Further, in a case where a reference position at the image pickup section 11 is properly set in a predetermined direction, for example, in the northern direction, if the processing control section 135 determines that the "East" button out of the direction buttons Gu2 is operated, the processing control section 135 newly sets a selected region in the "East" direction, thereby updating the selected region display image Gsc. Further, if the processing control section 135 determines that the "West" button is operated, it newly sets the selected region in the "West" direction, thereby updating the selected region display image Gsc. In such a manner, by operating the button that indicates a desired direction, an image having the selected region set to a desired new position can be displayed on the display section 14 without generating distortion.

It should be noted that GUI displays shown in FIGS. 15(A) and 15(B) are just illustrative and, of course, not limited to them.

Figure 17:
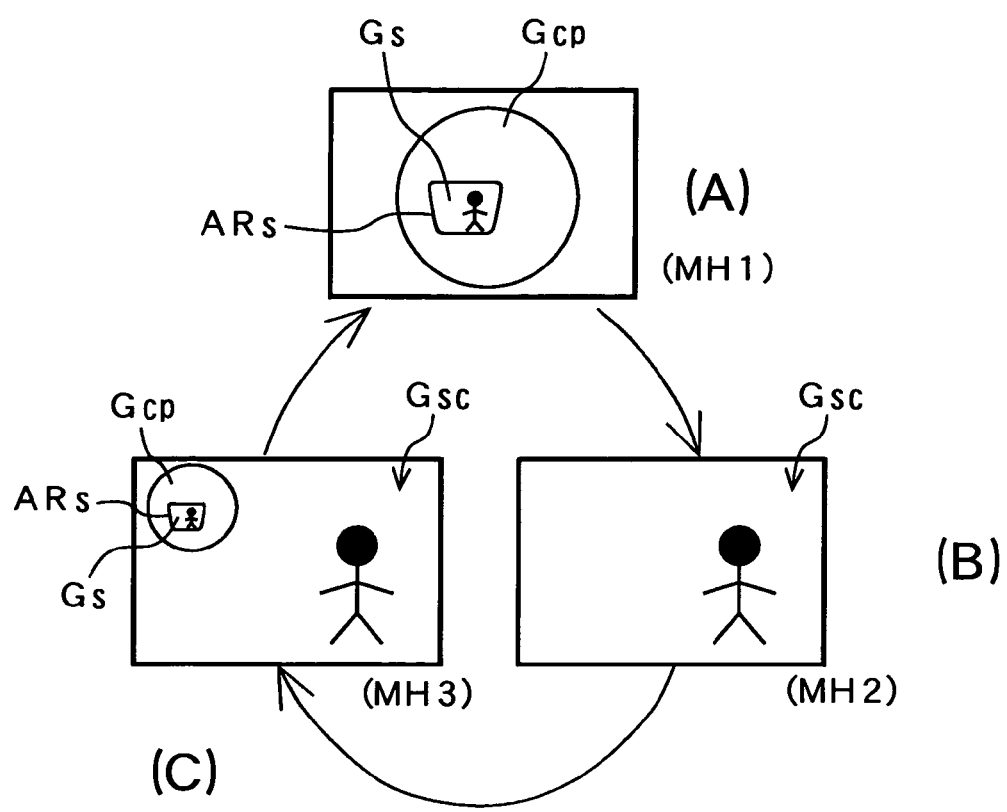
[FIG. 17] show display images which are displayed on a display section 14 when the display modes are sequentially switched when the orthogonal coordinate mode is selected.

FIG. 17 show display images which are displayed on the display section 14 when the display modes are sequentially switched if, for example, the orthogonal coordinate mode is selected. FIG. 17(A) shows a display image in a case where the entire image display mode MH1 is set, displaying only an entire image Gcp. FIG. 17(B) shows a display image in a case where the selected image display mode MH2 is set, displaying only a selected region display image Gsc. FIG. 17(C) shows a display image in a case where the both display mode MH3 is set, displaying both of an entire image Gcp and a selected region display image Gsc. Further, if those display modes are switched from each other sequentially, the entire image display mode MH1, the selected image display mode MH2, and the both display mode MH3 are switched cyclically.

FIG. 18 show display images which are displayed on the display section 14 when the polar coordinate mode MS2 is selected. Further, FIG. 18 show a case where two selected regions are provided. It should be noted that the number of the selected regions is not limited to one or two but can be set arbitrarily by the user. For example, that number may be incremented each time a "Menu" button Guc3 shown in FIG. 15(A) or 15(B) is operated or any other GUI display, not shown, may be used. In this case, the processing control section 135 performs processing to provide a plurality of selected regions in accordance with input information PS from the input section 12. Alternatively, irrespective of the input information PS from the input section 12, a plurality of predetermined selected regions may be previously provided in setting. Further, if the divided display mode MH4 is set, in accordance with the input information PS from the input section 12, the processing control section 135 may generate the selected region display images of the selected regions individually and display them on the display section 14 simultaneously.

Now, the description of the polar coordinate mode MS2 will be assumed below. For simplification of the description, such a state that a robot may go through a piping which is so small that a human being cannot enter is assumed in FIG. 18. Further, this robot is supposed to be fitted with the image pickup optical section 111 constituted of, for example, a wide-angle lens. Further, the piping is supposed to have a crack 92 formed at the upper part of its inner wall 91. A selected region display image Gsc1 is the first selected region image. That is, it is an image in which distortion correction processing is performed on the highlighted image Gs1 of an image region ARs1 that corresponds to the first selected region. Further, a selected region display image Gsc2 is an image in which distortion correction processing is performed on the highlighted image Gs2 of an image region ARs2 that corresponds to the second selected region.

In the state of FIG. 18(A), if the input information PS supplied from the input section 12 is a switchover instruction to switch a selected region in a $\phi$ag-changed direction of the polar coordinate system shown in FIG. 14, for example, the processing control section 135 performs processing to switch the selected region in the $\phi$ag-changed direction in accordance with the switchover instruction and supplies the selected region setting information JA that indicates the post-processing selected region to the selected region highlight display processing section 132 and the distortion correction processing section 133. The selected region highlight display processing section 132 displays highlighted images Gs1 and Gs2 that correspond to the post-processing selected region based on the selected region setting information JA. Based on the selected region setting information JA, the distortion correction processing section 133 corrects the images of image regions ARs1 and ARs2 that correspond to the post-processing selected region into the selected region display images Gsc1 and Gsc2 in a condition where distortion generated through the image pickup optical section 111 is corrected. Therefore, as shown in FIG. 18(B), display images after the switchover instruction is issued are the images of the selected region after the switchover instruction is issued that will be displayed as the selected region display images Gsc1 and Gsc2. Further, the highlighted images Gs1 and Gs2 properly indicate the regions of the selected region display images Gsc1 and Gsc2. In this case, the image regions ARs1 and ARs2 have been moved counterclockwise on the entire image Gcp and, if the switchover instruction is of an opposite direction, have been moved clockwise direction.

Figure 19:
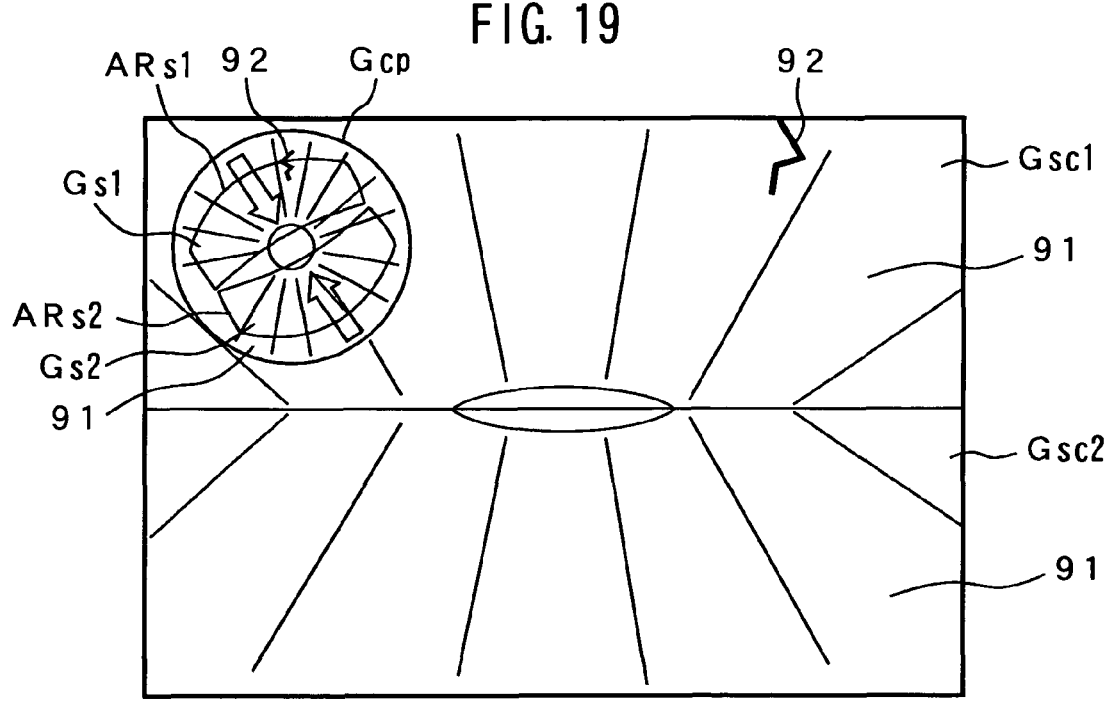
[FIG. 19] is an illustration showing a display image after a switchover instruction is issued when the polar coordinate mode is selected.

Further, in the state of FIG. 18(A), if the input information PS supplied from the input section 12 is a switchover instruction to switch a selected region in a $\theta$ag-changed direction of the polar coordinate system shown in FIG. 14, for example, the processing control section 135 performs processing to switch the selected region in the $\theta$ag-changed direction in accordance with the switchover instruction and supplies the selected region setting information JA that indicates the post-processing selected region to the selected region highlight display processing section 132 and the distortion correction processing section 133. The selected region highlight display processing section 132 displays highlighted images Gs1 and Gs2 that correspond to the post-processing selected region based on the selected region setting information JA. Based on the selected region setting information JA, the distortion correction processing section 133 corrects the images of image regions ARs1 and ARs2 that correspond to the post-processing selected region into the selected region display images Gsc1 and Gsc2 in a condition where distortion generated through the image pickup optical section 111 is corrected. Therefore, as shown in FIG. 19, display images after the switchover instruction is issued are the images of the selected region after the switchover instruction is issued that will be displayed as the selected region display images Gsc1 and Gsc2. Further, the highlighted images Gs1 and Gs2 properly indicate the regions of the selected region display images Gsc1 and Gsc2. In this case, the image regions ARs1 and ARs2 have been moved to be closer to each other radially on the entire image Gcp and, if the switchover instruction is of an opposite direction, have been moved to be more away from each other on the entire image Gcp.

It should be noted that in the polar coordinate mode MS2, for example, a selected region can be switched using the mouse, the keyboard, the touch sensor, etc., in which case the GUI may be of any form.

Figure 20:
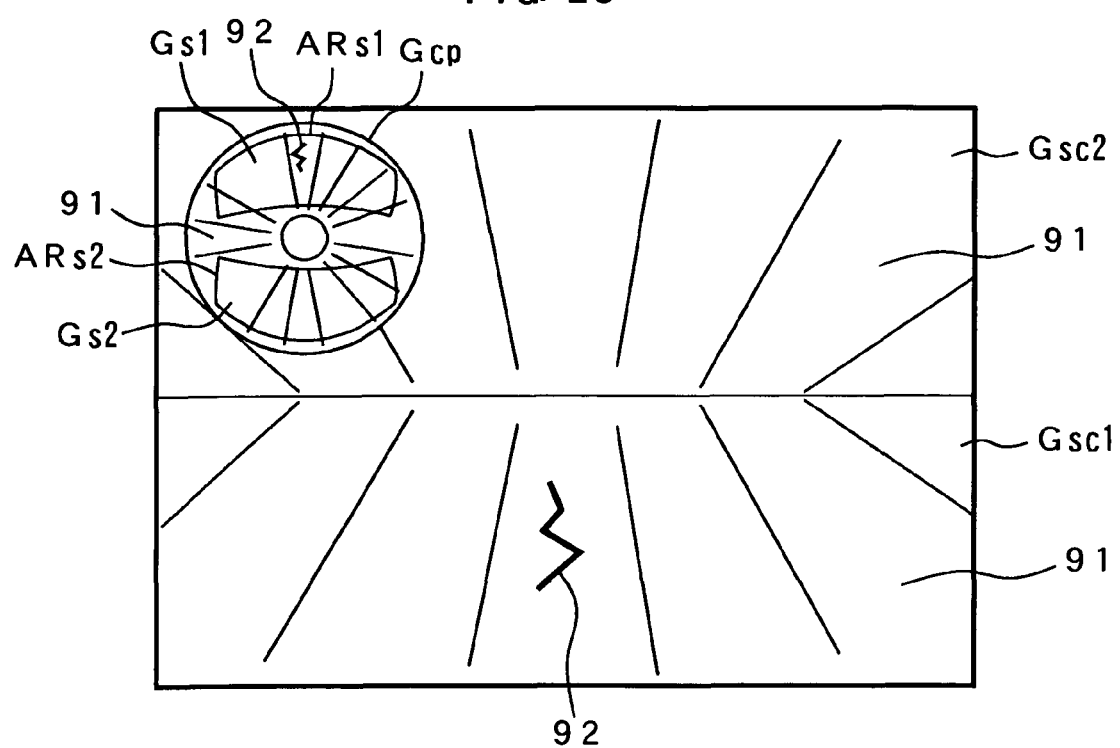
[FIG. 20] is an illustration showing a display image displayed on the display section when the polar coordinate mode is selected, and explaining a case where a display in a divided display mode is turned upside down.

In the polar coordinate mode MS2, for example, with respect to a state of the display image shown in FIG. 18(A), as shown in FIG. 20, it is possible to display the selected region display image Gsc1 at the lower part of the display section 14 in a condition where it is rotated downward by 180 degrees and the selected region display image Gsc2 at the upper part of the display section 14 in a condition where it is rotated upward by 180 degrees in accordance with the input information PS acquired from the input section 12. In such a manner, conveniently the user can view the image at an easy-to-see angle.

Of course, in the above-described orthogonal coordinate mode MS1 also, a plurality of selected regions is provided, so that the divided display mode MH4 may be applied correspondingly. Alternatively, in the orthogonal coordinate mode MS1 and the polar coordinate mode MS2, even if a plurality of selected regions are provided, the image processing section 13 generates a selected region display image of one of the selected region rather than generating a combined distortion-corrected image of one screen and output it to the display section 14. In this case, whether or not to output image data that displays the selected region display image of the one selected region on one screen or to generate the selected region display images of the plurality of selected regions and display those selected region display images on one screen is controlled by the processing control section 135 in the image processing section 13 in accordance with the input information PS from the input section 12 or predefined setting information.

In the polar coordinate mode MS2, for example, each time the "Menu" button Guc3 is operated by the user, the processing control section 135 switches the display mode MH similar to the orthogonal coordinate mode MS1. Furthermore, if a plurality of selected regions is provided, the divided display mode MH4 can be selected.

Figure 21:
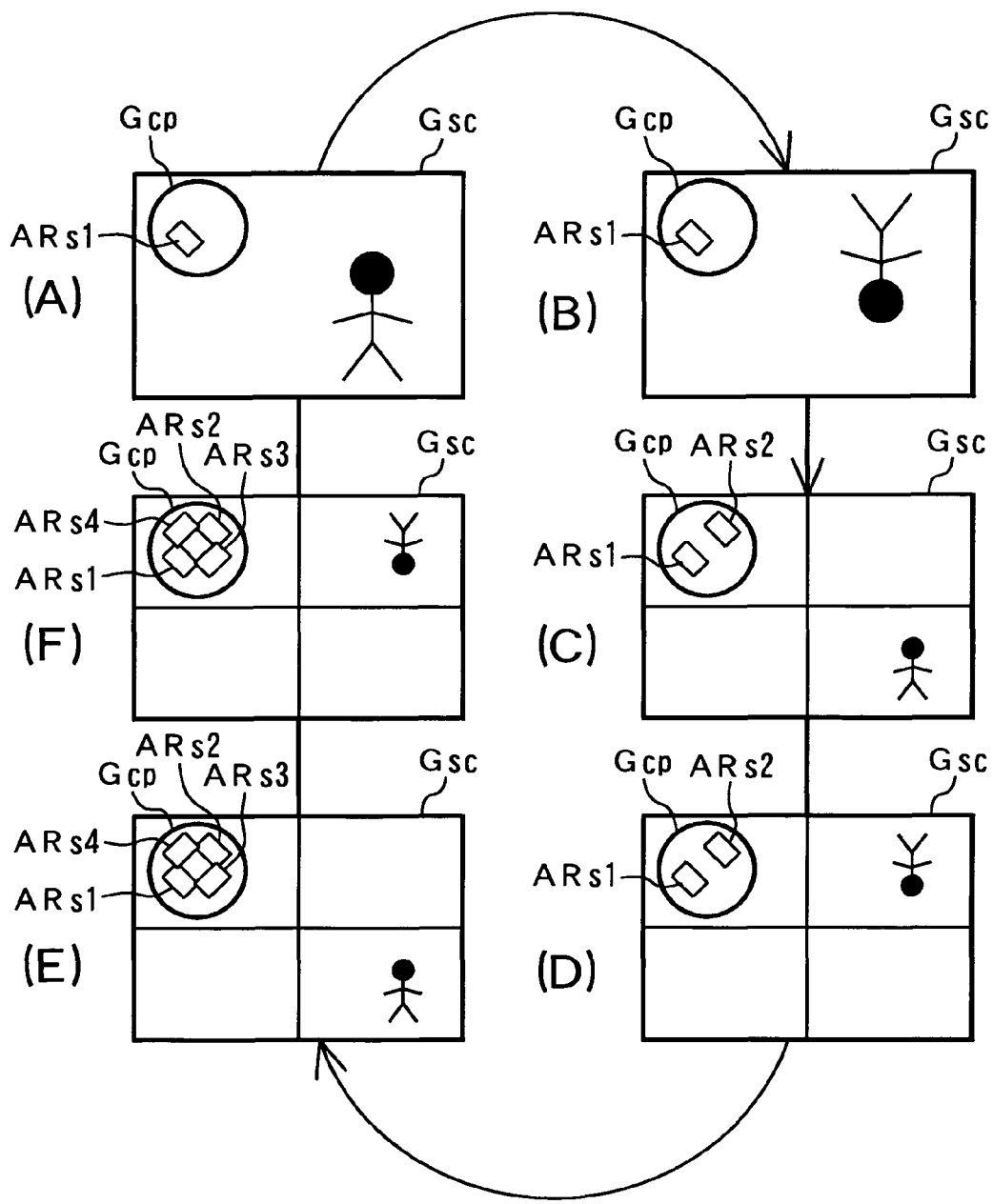
[FIG. 21] are illustrations showing transition of the display mode switchover in a case where selection of the divided display mode is enabled.

FIG. 21 is an illustration showing transition of the change of the display modes in a case where selection of the divided display mode MH4 is enabled. It is here supposed that four selected regions are provided. For example, in display, it is possible to switch a mode (FIG. 21(A)) in which one selected region corrected image is displayed in the both display mode MH3, a mode (FIG. 21(B)) in which one selected region display image is displayed in a condition where it is turned upside down in the both display mode MH3, a mode (FIG. 21C) in which two selected region corrected images are displayed in the divided display mode MH4, a mode (FIG. 21(D)) in which images in which two selected region corrected images are displayed is displayed in a condition where they are turned upside down in the divided display mode MH4, a mode (FIG. 21(E)) in which four selected region corrected images are displayed in the divided display mode MH4, and a mode (FIG. 21(F)) in which images in which four selected region corrected images are displayed are displayed in a condition where they are turned upside down in the divided display mode MH4. It should be noted that since not all of the selected region corrected images are displayed in FIG. 21, the selected region corrected image to be displayed may be switched. It should be noted that it is of course permitted to enable switchover to the entire image display mode MH1 and the selected image display mode MH2.

In such a manner, according to the present embodiment, since the orthogonal coordinate mode MS1 and the polar coordinate mode MS2 are provided as the region selection mode, for example, by switching the region selection mode in accordance with the direction of a field of view, it is possible to perform intuitive and easy-to-understand operations and to realize an image processing apparatus convenient and easy-to-use for the user.

Besides the above-described processing, the image processing section 13 can perform processing to scale up or down and rotate a selected region display image.

The processing to scale up/down a selected region display image will be described below with reference to FIG. 22. In a state shown in FIG. 22(A), the user operates a "Scale up" button Guc1 shown in FIGS. 15(A) and 15(B), for example. Then, the processing control section 135 performs processing to scale up the range of a selected region in accordance with the current input information PS and supplies the selected region setting information JA that indicates the post-processing selected region to the selected region highlight display processing section 132 and the distortion correction processing section 133. The selected region highlight display processing section 132 displays highlighted images Gs1 and Gs2 that corresponds to the post-processing selected region based on the selected region setting information JA. The distortion correction processing section 133 performs correction processing to correct the images of the image regions ARs1 and ARs2 that correspond to the post-processing selected region to the selected region display images Gsc1 and Gsc2 in which the distortion generated through the image pickup optical section 111 is corrected based on the selected region setting information JA. Herein, if the both display mode MH3 is provided as shown in FIG. 22(A), the selected region display image Gsc that corresponds to the scaled-down selected region is displayed on the entire screen except for the display region of the entire image Gcp, as shown in FIG. 22B, so that the post-scale-down display image is displayed so as to enlarge a person image GM included in the image region ARs as compared to FIG. 22A. It should be noted that since the selected region is scaled down, the image region ARs in the entire image Gcp becomes smaller.

Conversely, if the user operates a "Scale down" button Guc2, the processing control section 135 performs processing to scale down the range of a selected region in accordance with the current input information PS and supplies the selected region setting information JA that indicates the post-processing selected region to the selected region highlight display processing section 132 and the distortion correction processing section 133. Therefore, the highlighted image Gs of an image region ARs that corresponds to the post-processing selected region has its distortion corrected and is displayed as a selected region display image Gsc on the entire screen except for the display region of the entire image Gcp, so that the person image GM included in the image region ARs is displayed so as to reduce as compared to FIG. 22A. In such a manner, the scale up/down processing can be performed.

Figure 23:
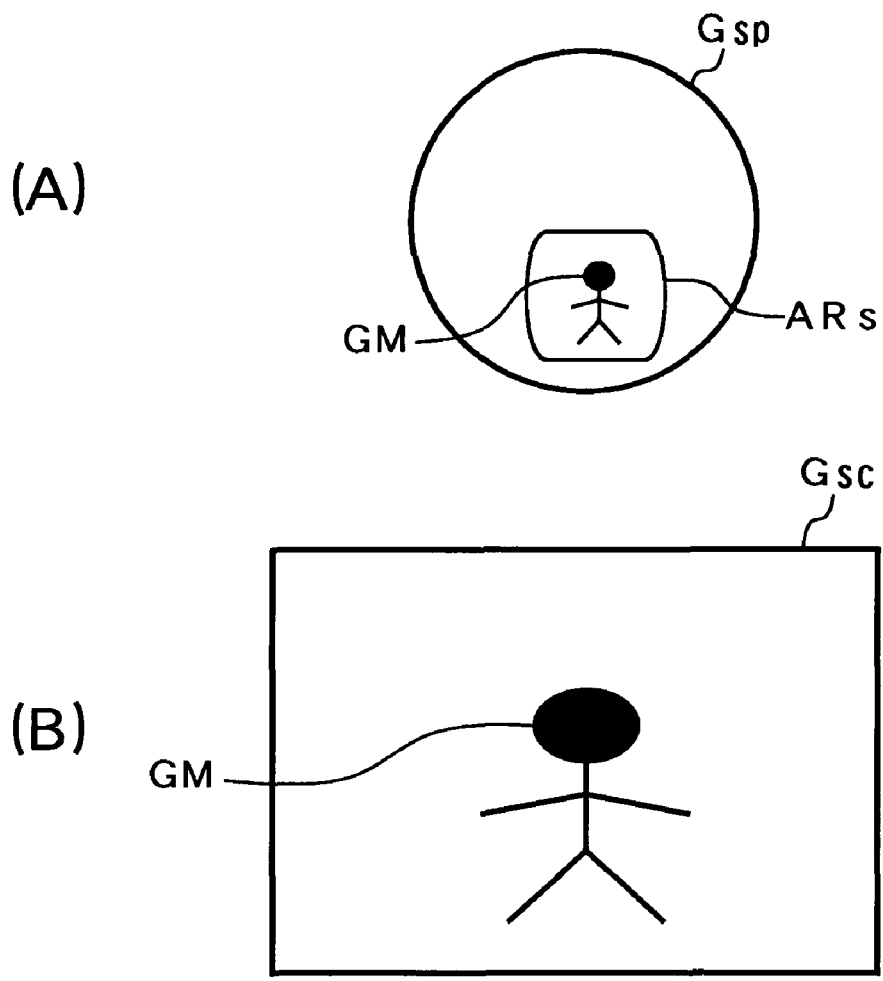
[FIG. 23] are illustrations showing a state before a rotation instruction is issued.
Figure 24:
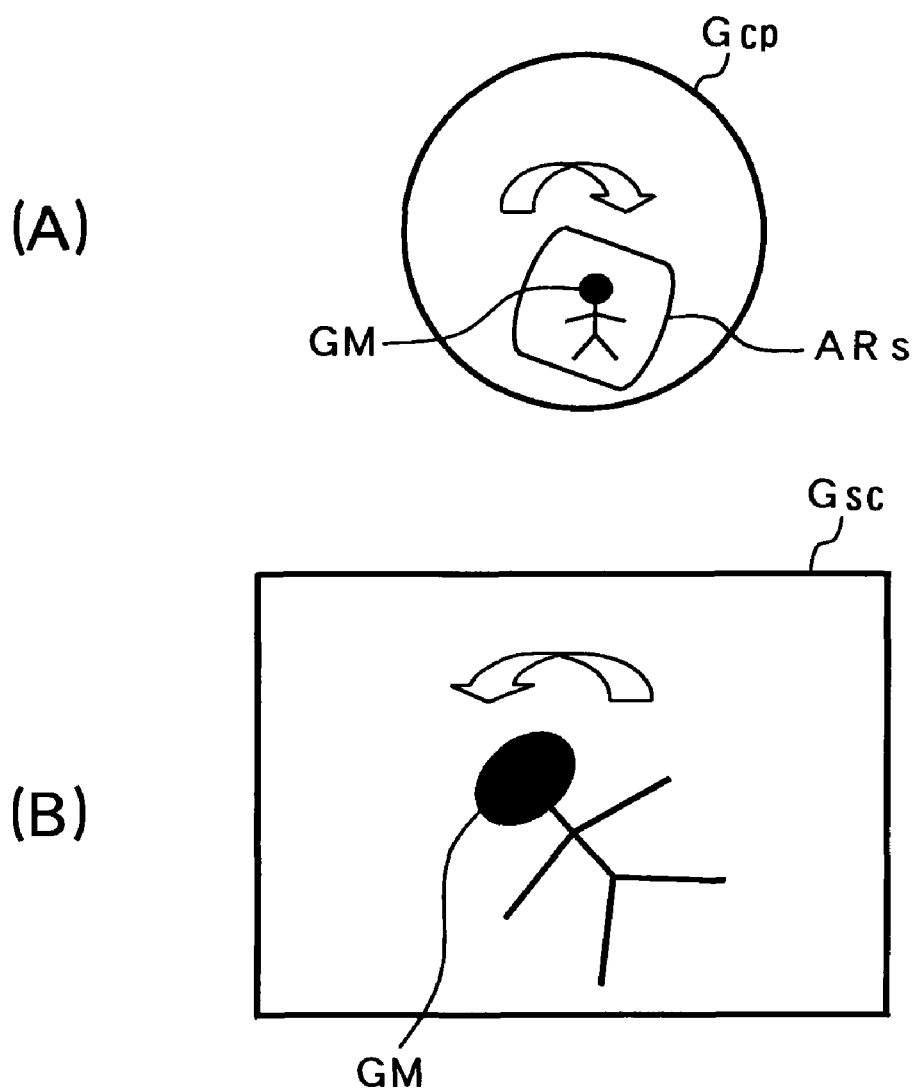
[FIG. 24] are explanatory illustrations of processing to rotate an image in a selected region.

Next, a case in which the image of a selected region rotates by the image processing section 13 and is displayed will be described below with reference to FIGS. 23 and 24. FIGS. 23(A) and 23(B) show a state before a "Rotation" operation is instructed, out of which FIG. 23(A) shows a case where a selected region is set in such a manner that, for example, the person image GM in the entire image Gcp may be included in an image region ARs. On the other hand, FIG. 23(B) shows a selected region display image Gsc, which is an image obtained by performing distortion correction processing on a highlighted image Gs of the image region ARs. If the user issues a "Rotation" operation instruction, as shown in FIG. 24(A), the processing control section 135 performs alteration processing on the selected region so that it may rotate around a roughly central point of the image region ARs in accordance with the input information PS. In this case, in the image region ARs that corresponds to the post-alteration selected region, the person image GM is rotated in a reverse direction. Therefore, by generating a selected region display image Gsc for the highlighted image Gs of the image region ARs that corresponds to the post-alteration selected region, it is possible to obtain an image in which the person image GM is rotated in a rotation direction opposite to the rotation direction of the selected region as shown in FIG. 24(B). Through such rotation processing, the user can view an observation target at an easy-to-see angle conveniently.

Figure 25:
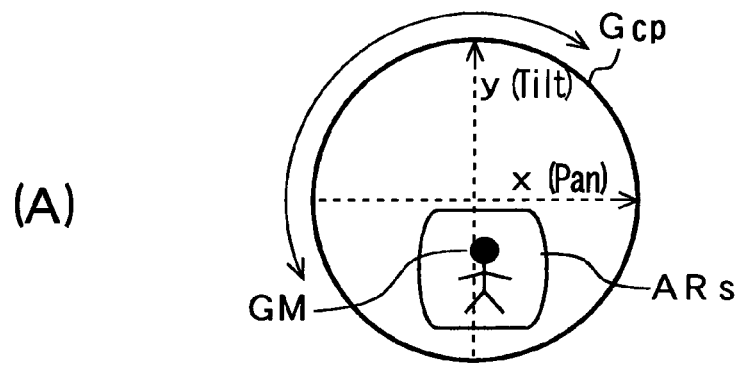
[FIG. 25] are explanatory illustrations of another piece of processing to rotate an image in a selected region.

Further, instead of rotating the selected region, the entire image Gcp may be rotated. For example, from a state in which the x-axis (pan axis) becomes a horizontal direction and the y-axis (tilt axis) becomes a vertical direction as moving axes in the orthogonal coordinate mode MS1 as shown in FIG. 25(A), the entire image Gcp is rotated, for example, counter-clockwise together with these x-axis and y-axis as well as the highlighted image Gs as shown in FIG. 25(B). In this case, there is no change caused in the selected region display image Gsc which is provided to the display section 14. It is thus possible to correct the inclination of a camera placing angle in the above-described rotation direction or intentionally rotate the entire image Gcp and display it as special effects in the entire image display mode MH1.

Figure 26:
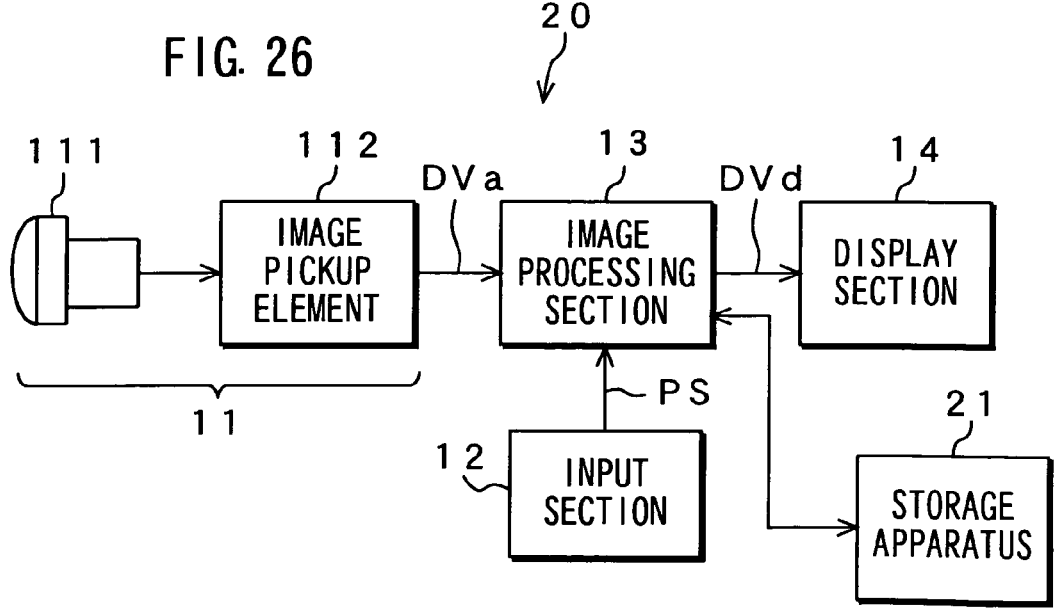
[FIG. 26] is a block diagram showing a constitution of an image processing system according to another embodiment of the present invention.

FIG. 26 is a block diagram showing the constitution of an image processing system according to another embodiment of the present invention. Hereinafter, the description of the devices, the functions, etc. similar to those of the image processing system 10 shown in FIG. 1 will be simplified or omitted to concentrate on the different respects.

The image processing system 20 has such a constitution as to add a storage apparatus 21 to the image processing system 10 shown in FIG. 1. The storage apparatus 21 is an apparatus for storing, for example, image data DVa generated by an image pickup section 11 and a variety of kinds of image data generated by an image processing section 13. As a storage device used in the storage apparatus 21, such a device may be used that can store image data such as an optical disk, a magnetic disk, a semiconductor memory, a dielectric memory, a tape-like storage medium.

If image data DVa is stored in the storage apparatus 21, for example, the image processing section 13 can read the image data DVa desired by a user from the storage apparatus 21 in accordance with input information PS from an input section 12 and display it on a display section 14. Specifically, such an aspect can be thought of that in accordance with the input information PS based on a user operation, the image processing section 13 may read the image data DVa of a past wide-field image Gc stored in the storage apparatus 21, set a selected region for a field of view represented by this read image data DVa, and display on the display section 14 a selected region display image, which is an image in which the distortion of this selected region is corrected. Alternatively, such an aspect may be considered that independently of the user, the image processing section 13 may perform distortion correction processing on an image of a predefined selected region out of past wide-field images stored in the storage apparatus 21 and display it on the display section 14.

In this case, as a specific example, the following aspect may be thought of. For example, suppose that the user selects a selected region in a wide-field image obtained in a real time from the image pickup section 11 and views an entire image Gcp and a selected region display image Gsc in a real time or stores them in the storage apparatus 21. Then, the user can also select a region different from the above region selected in a real time and view its selected region display image Gsc while viewing the stored entire image Gcp.

Alternatively, instead of storing the image data of the entire image Gcp in the storage apparatus 21, the image processing section 13 can also store only the image data of the selected region display image Gsc. In this case, the user can view that selected region display image Gsc later. Of course, it may store the image data that indicates both of the entire image Gcp and the selected region display image Gsc or the image data of each of those images.

Figure 27:
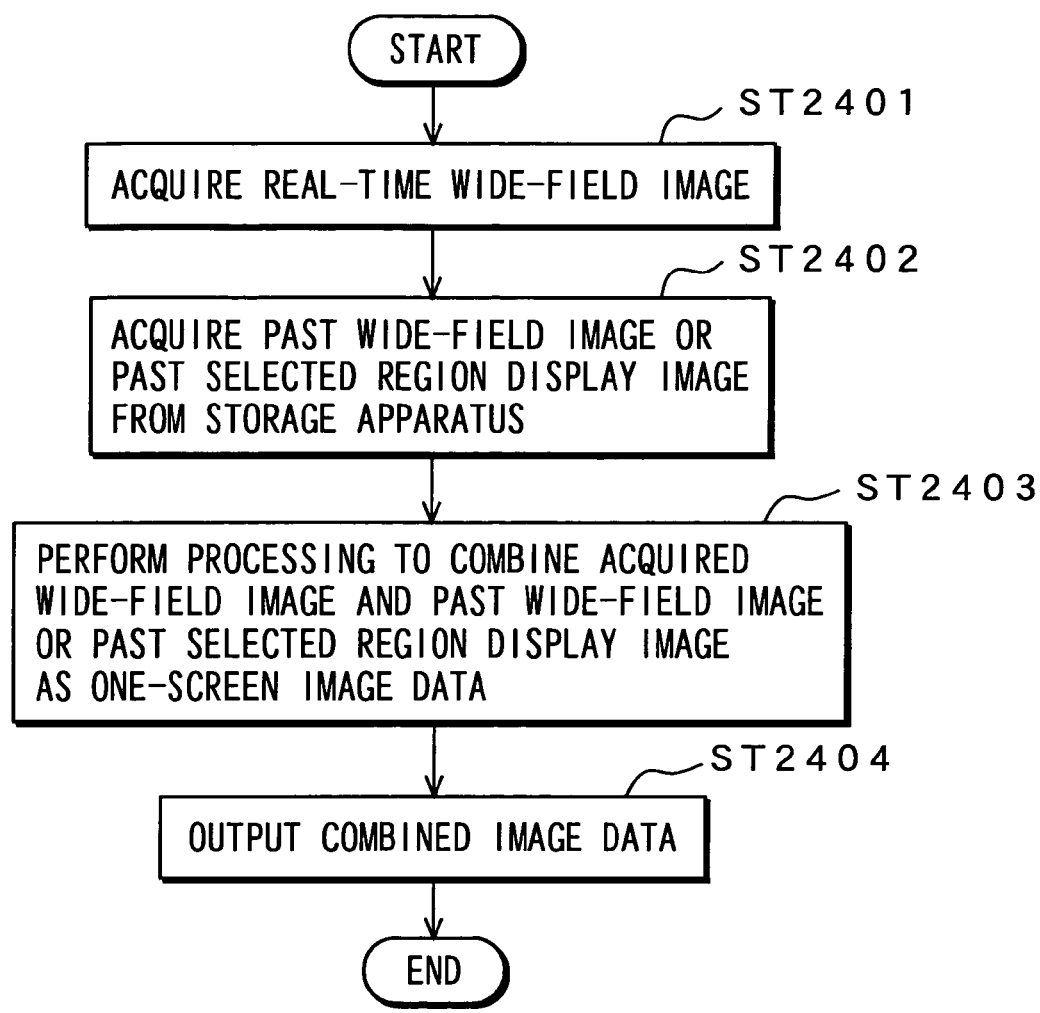
[FIG. 27] is a flowchart showing one example of processing which is performed by the image processing system shown in FIG. 26.

Alternatively, the image processing section 13 can also perform the processing of a flowchart shown in FIG. 27. The image processing section 13 acquires a real-time wide-field image from the image pickup section 11 (ST2401) and also acquires a past wide-field image or a past selected region display image stored in the storage apparatus 21 (ST2402). The image processing section 13 can perform processing to combine the thus acquired wide-field image and past wide-field image or the past selected region display image into one-screen image data (ST2403) and output the combined image data to the display section 14 (ST2404). Alternatively, the image processing section 13 may display the acquired wide-field image and the past wide-field image or the past selected region display image on the different display sections 14. It should be noted that such an aspect can be thought of that ST2401 and ST2402 may be reversed in order.

Figure 28:
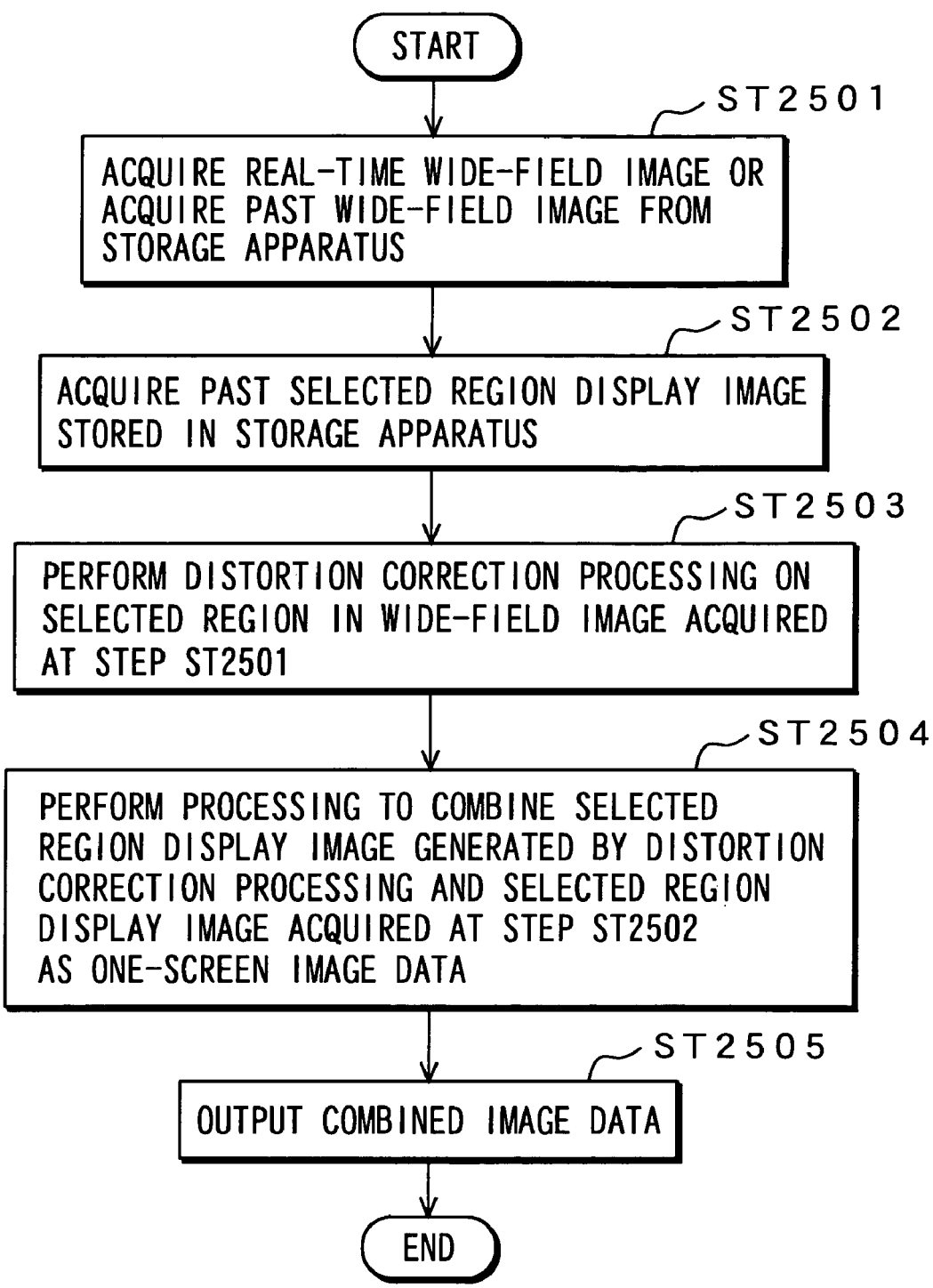
[FIG. 28] is a flowchart showing another example of the processing which is performed by the image processing system shown in FIG. 26.

Alternatively, such an aspect can be thought of that the image processing section 13 may output both of the selected region display image Gsc (which may be an image generated in a real time from a real-time wide-field image or an image generated in a real time from a past wide-field image stored in the storage apparatus) obtained through real-time distortion correction processing and the past selected region display image. Specifically, as shown in FIG. 28, the image processing section 13 acquires the wide-field image in a real time from the image pickup section 11 or the past wide-field image from the storage apparatus 21 (ST2501). Further, the image processing section 13 acquires a past selected region display image stored in the storage apparatus 21 (ST2502). The image processing section 13 performs distortion correction processing on the image of a selected region in the above-described wide-field image acquired at ST2501 (ST2503). The image processing section 13 performs processing to combine the selected region display image generated by this distortion correction processing and the selected region display image acquired at ST2502 into one-screen image data (ST2504) and outputs it as a selected region display image Gsc to the display section 14 (ST2505). It should be noted that such an aspect can be thought of that ST2501 and ST2502 may be reversed in order or ST2502 and ST2503 may be reversed in order.

In the case of processing shown in FIG. 28, further, the image processing section 13 can also output a selected region display image (hereinafter referred to as real-time selected region display image) obtained by performing distortion correction processing at ST2503 and a past selected region display image in such a manner that a human being can distinguish between them on the display section. Specifically, it can be thought of that the image processing section 13, for example, generates an image in which an identifier is fitted to at least one of the real-time selected region display image and the past selected region display image or generates a frame that encloses both of these images so that an image having a changed color of this frame may be generated.

It should be noted that if image data stored in the storage apparatus 21 is of a moving image, a certain capacity of moving image data may be stored in the storage apparatus 21 in accordance with its storage capacity so that the least recent image frames would be automatically erased sequentially.

Figure 29:
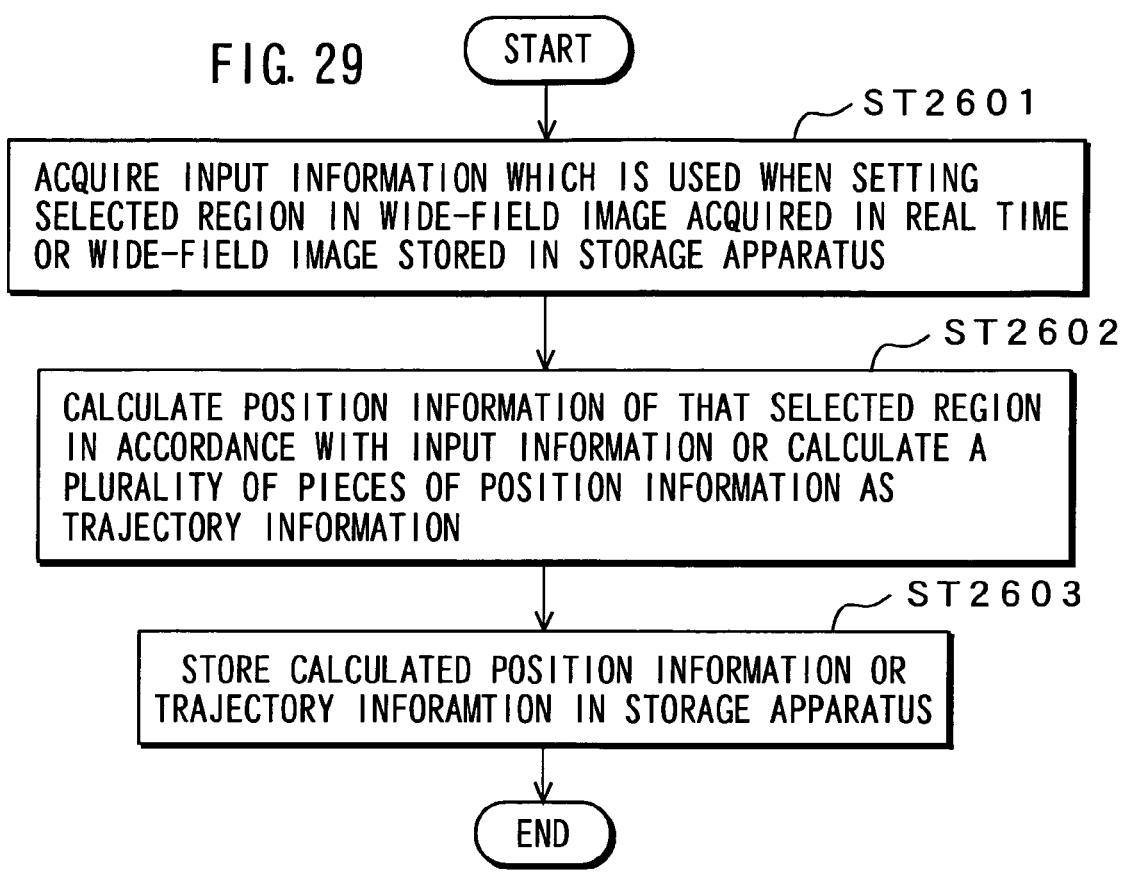
[FIG. 29] is a flowchart showing processing to store position information or trajectory information.

Further, the following aspect of using the storage apparatus 21 can be thought of. For example, the user performs operations to set a selected region in a real-time wide-field image or a wide-field image which is based on image data read from the storage apparatus 21 at an arbitrary point in time and, corresponding to the operations, the image processing section 13 then stores only position information that indicates how the selected region is set in the storage apparatus 21. Further, if a selected region is switched in the above-described region selection mode MS, the image processing section 13 may store, in the storage apparatus 21, trajectory information that makes it possible to reproduce the switchover of the selected region. FIG. 29 is a flowchart showing processing to store the position information or the trajectory information. The image processing section 13 acquires input information which is used when setting a selected region in a wide-field image acquired in a real time from the image pickup section 11 or a wide-field image which is based on image data read from the storage apparatus 21 (ST2601). The processing control section 135 in the image processing section 13 generates the position information of that selected region in accordance with the input information or, if performing switching operation on the selected region, generates the trajectory information that makes it possible to reproduce the switchover of the selected region (ST2602). The processing control section 135 in the image processing section 13 stores the generated position information or the trajectory information in the storage apparatus 21 (ST2603).

Such an aspect is effective in a case where an image of a predetermined range or an image due to a trajectory in a range in, for example, a certain place is required. For example, in a case where if the image pickup section 11 is mounted on a fixed-point security camera, it can be thought of that an image of a predetermined range or an image of a trajectory in a range in a wide-field image is required. In this case, by setting a selected region corresponding to a predetermined range in a wide-field image or the trajectory of the predetermined range, the user can always monitor a selected region display image of that range or its trajectory on the display section 14 as a display image. In such an aspect, for example, in a case where the storage apparatus 21 stores the selected region display image of the "Trajectory" of the predetermined range, the continuous movement of the selected region from its starting point to its ending point automatically may be repeated periodically. Further, an image for each period may be stored in the storage apparatus 21. It should be noted that, of course, the present aspect is not limited to the security purposes.

Just to make sure, the above-described predetermined range image might as well be a still image or a moving image. The image of the trajectory of the certain range might also as well be a still image at a position along this trajectory and can be stored as a moving image covering from the starting point to the ending point of the trajectory. In this case, the image processing section 13 may possibly perform processing to output a post-distortion-correction image as a still image.

Figure 30:
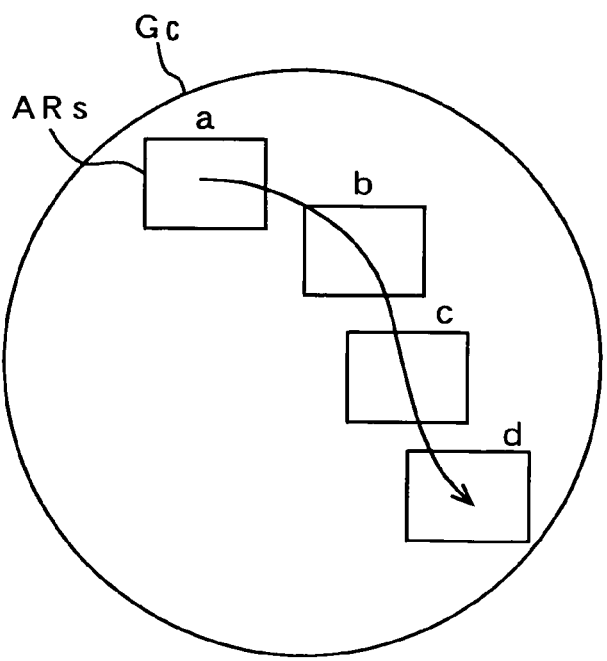
[FIG. 30] is an explanatory diagram of a trajectory of a predetermined range on a displayed image along the flow shown in FIG. 29.

FIG. 30 is an explanatory diagram of a method of setting such a trajectory of a predetermined range, as described above, as an aspect of using the storage apparatus 21.

The user sets a selected region to a wide-field image to switch the position of the selected region. Specifically, this is realized by repeating processing such that it is determined which one of the direction button Gua2 and the bearing position Gub2 shown in FIGS. 15(A) and 15(B), for example, is operated and the selected region is moved in the direction indicated by the operated button; in the internal processing of the image processing system 20, as shown by ST2602 and ST2603 of FIG. 29, the image processing section 13 stores the position information of the current selected region in the storage apparatus 21 in accordance with the input information that indicates the operations of the "Select" buttons Gua1 and Gub1. For example, if the "Select" button Gua1 or Gub1 is operated when an image region ARs corresponding to a selected region is located at position a on a wide-field image Gc, it stores the position information of the selected region at this point of time. Further, if the "Select" button Gua1 or Gub1 is operated when the selected region is switched and an image region ARs corresponding to the post-switchover selected region is located at position b on the wide-field image Gc, it stores the position information of the selected region at this point of time. Similarly, it stores the position information of the selected region at a point of time when the image region ARs corresponding to the selected region is located at positions c and d on the wide-field image Gc.

Alternatively, even if the user does not operate the direction button Gua2 or the bearing button Gub2, a trajectory may have been set using a program beforehand or generated though automatic recognition by use of the above-described various sensors. In this case, the trajectory may be such that a selected region would be set so as to set an image region ARs to discrete points such as positions a, b, c, and d shown in FIG. 30 or that a selected region might be set continually from points a through d. Alternatively, if the user has set the discrete points of positions a, b, c, and d, the image processing section 13 may have such a program installed in it as to set a selected region so that an image region ARs may be set to a position for interpolating the points of positions a, b, c, and d.

Alternatively, a plurality of pieces of trajectory information may be provided beforehand so that the user can select any one of them.

Figure 31:
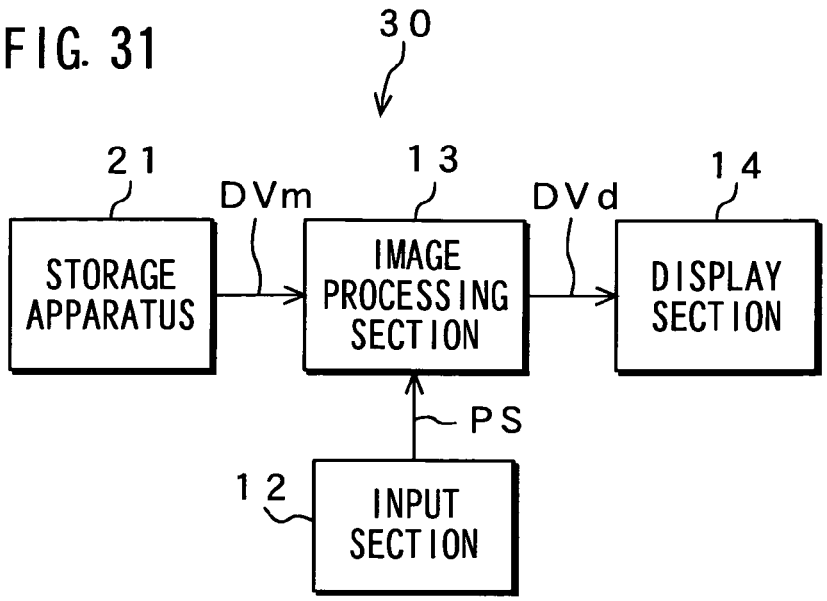
[FIG. 31] is a block diagram showing a constitution of an image processing system according to further embodiment of the present invention.

FIG. 31 is a block diagram showing a constitution of an image processing system according to further embodiment of the present invention. This image processing system 30 is provided with a storage apparatus 21, not the above-described image pickup section 11. In the storage apparatus 21, the wide-field images are stored beforehand as described above, for example. Such a constitution enables an image processing section 13 to read the image data DVm of the wide-field images and obtain a selected region display image from that wide-field image by performing development processing.

Besides, in the image processing system 30, the image processing section 13 can obtain a selected region display image through development processing from a wide-field image which is based on image data stored in the storage apparatus 21 beforehand and then store those wide-field image and selected region display image in the storage apparatus 21 in a condition where they are correlated with each other. Alternatively, the image processing section 13 can also store a wide-field image which is based on image data stored beforehand and information indicating a selected region on which development processing is to be performed from that wide-field image in the storage apparatus 21 in a condition where they are correlated with each other.

The present invention is not limited to the above-described embodiments but can be modified variously.

It is also possible to alternately display an entire image Gcp and a selected region display image Gsc to be displayed on the display section 14 on the display section 14 every predetermined lapse of time. In this case, in response to any input operation of the user, an entire image Gcp and a selected region display image Gsc may both be displayed.

In FIGS. 1 and 26, an image pickup element 112 in the image pickup section 11, an input section 12, an image processing section 13, the display section 14, the storage apparatus 21, etc. may be connected to each other through the Internet, a local area network (LAN) or other network such as a dedicated line.

The image processing systems according to the above-described embodiments can be applied in various fields such as, for example, a security system, a teleconference system, a system for inspecting, managing, and testing machinery and facilities, a road traffic system, a system that uses a moving camera (for example, camera for photographing from a moving vehicle, aircraft, or any other movable bodies), a nursing-care system, a medical system, etc.

it is also possible to realize an image processing system that combines the embodiments shown in FIGS. 26 and 31 respectively. That is, such a system can be realized as to include the storage apparatus at each of its front stage and rear stage.

Next, still further embodiment of the present invention will be described below. In the present embodiment, a processing control section 135 in an image processing section 13 can switch a region selection mode MS in accordance with an installation direction (installation angle) in which an image pickup section 11 is installed. The following will describe a constitution and an operation of an image processing system 40 in this case.

Figure 32:
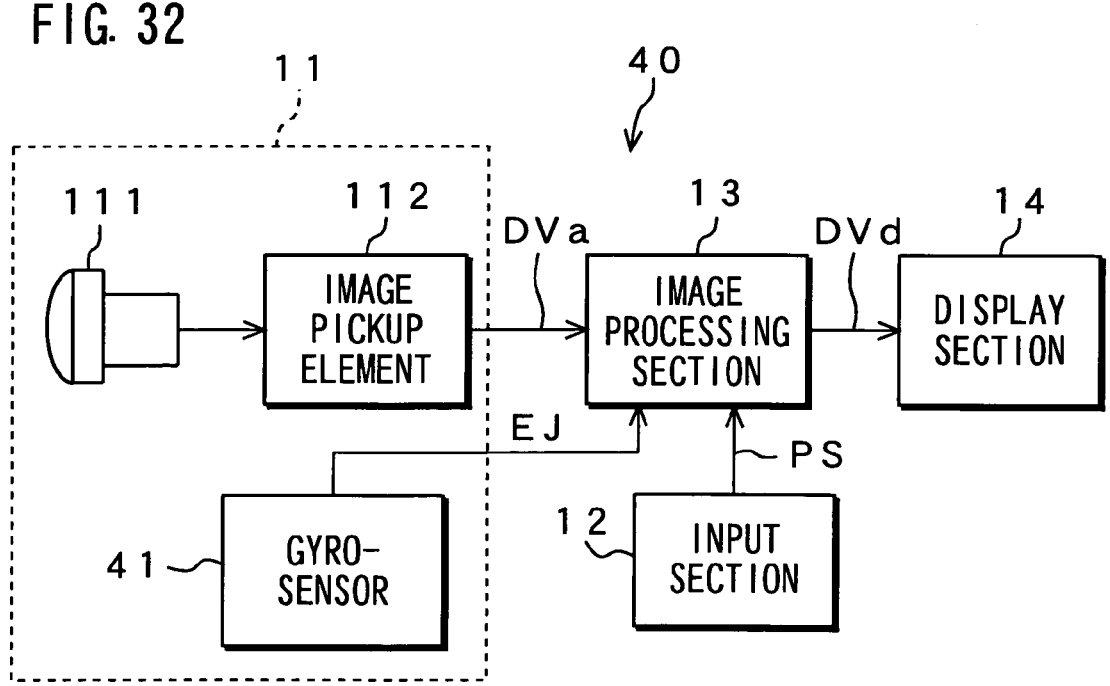
[FIG. 32] is a block diagram showing a constitution of an image processing system according to still further embodiment of the present invention.

FIG. 32 is a block diagram showing a constitution of the image processing system according to the still further embodiment of the present invention. As shown in FIG. 32, in the present embodiment, in addition to the components of the image processing system 10 shown in FIG. 1, the image processing system 40 has a direction detection sensor, for example, a gyro-sensor 41 that detects a direction in which an optical image is made incident upon a image pickup optical section 111.

The gyro-sensor 41, which is fixed to the image pickup optical section 111, detects a direction in which an optical image is made incident upon the image pickup optical section 111, and supplies a sensor signal ES indicative of a result of the direction detection to the processing control section 135 in the image processing section 13. It should be noted that the following description is based on the assumption that the image pickup optical section 111, the image pickup element 112, and the gyro-sensor 41 are integrated into the image pickup section 11.

FIG. 33 are conceptual illustrations of a manner to switch a region selection mode MS in accordance with a direction in which an image pickup section 11 is placed in the present embodiment.

As shown in FIG. 33, states in which the image pickup section 11 is placed may be roughly divided into three cases:, as shown in the above FIG. 10, a case where it is placed on the ground, a floor, a desk, etc. to pick up a desired subject MH (upper hemispherical field of view in FIG. 33(A)), a case where it is placed on a wall etc. perpendicular to the ground to pick up the subject MH (front hemispherical field of view in FIG. 33(B)), and a case where it is fixed on or hung from a ceiling to pick up the subject MH (lower hemispherical field of view in FIG. 33(C)).

Therefore, the processing control section 135 in the image processing section 13 automatically sets or switches the region selection mode MS in accordance with an angle in a vertical direction on the image pickup section 11 which is determined on the basis of the sensor signal from the direction detection sensor.

Specifically, if the image pickup section 11 is in the upper or lower hemispherical field of view, the region selection mode Ms is switched to a polar coordinate mode MS2, and if it is in the front hemispherical field of view, the region selection mode MS is switched to an orthogonal coordinate mode MS1. By thus switching the mode, if the image pickup section 11 is in the upper or lower hemispherical field of view, it is possible to easily and evenly observe the surroundings of a subject at the center of a wide-field image Gc more than the subject itself. Further, if the image pickup section 11 is in the front hemispherical field of view, by setting the orthogonal coordinate mode MS1, it is possible to easily observe the up-and-down direction and the right-and-left direction also of the subject with observing this subject in detail at the center of the wide-field image Gc.

It should be noted that in the present embodiment, a state in which the image pickup section 11 is placed in the upper hemispherical field of view and the region selection mode MS is switched to the polar coordinate mode MS2, as shown in FIG. 33(A), is referred to as $S_0$, a state in which the image pickup section 11 is placed in the front hemispherical field of view and the region selection mode MS is switched to the orthogonal coordinate mode MS1, as shown in FIG. 33(B), is referred to as $S_1$, and a state in which the image pickup section 11 is placed in the lower hemispherical field of view and the region selection mode MS is switched to the polar coordinate mode MS2, as shown in FIG. 33(C), is referred to as $S_2$.

FIG. 34 are explanatory illustrations of a method of setting threshold values for switching the states $S_0$, $S_1$, and $S_2$. As shown in FIG. 34, in the present embodiment, for example, supposing a state where the image pickup section 11 is in the upper hemispherical field of view to be a reference position ($\psi$=0 degree), first, two threshold values ($\psi_1$, $\psi_2$) are used to thereby determine any one of the above-described three states $S_0$, $S_1$, and $S_2$ in accordance with whether or not the installation angle of the image pickup section 11 exceeds the threshold value $\psi_1$ or $\psi_2$ and, based on the result of the decision, set the region selection mode MS. Further, if the installation angle of the image pickup section 11 is changed after the region selection mode MS has been set, a threshold value other than the above-described threshold values of $\psi_1$ and $\psi_2$ is used to give a hysteresis when those states are switched from each other.

Specifically, as shown in FIG. 34(A), values in a ±10-degree range of, for example, the threshold value $\psi_1$ are set as new threshold values $\psi_3$ and $\psi_4$ besides threshold values $\psi_1$ and $\psi_2$ and values in a ±10-degree range of, for example, the threshold value $\psi_2$ are set as new threshold values $\psi_5$ and $\psi_6$. As shown in FIG. 34(B), the threshold value $\psi_3$ is a threshold value when the state is switched from state $S_0$ to state $S_1$, and the threshold value $\psi_4$ is a threshold value when the state is switched from state $S_1$ to state $S_0$. Further, threshold value $\psi_5$ is a threshold value when the state is switched from state $S_1$ to state $S_2$, and threshold value $\psi_6$ is a threshold value when the state is switched from state $S_2$ to state $S_1$. The magnitude relation of those threshold values including threshold values $\psi_1$ and $\psi_2$ become as $\psi_4 < \psi_1 < \psi_3 < \psi_6 < \psi_2 < \psi_5$ as shown in FIG. 34(B). It should be noted that although, for example, the threshold value $\psi_1$ is 45 degrees and the threshold value $\psi_2$ is 135 degrees, they are not limited to those values. Further, although the above-described threshold values $\psi_3$, $\psi_4$, $\psi_5$, and $\psi_6$ are not limited to those in the above-described ±10-degree ranges, they may be in a ±5-degree range, ±15-degree range, etc. and, further, may be set so that differences between the threshold value $\psi_1$ and the threshold values $\psi_3$ and $\psi_4$ have different absolute values or that differences between the threshold value $\psi_2$ and the threshold values $\psi_5$ and $\psi_6$ have different absolute values.

Figure 35:
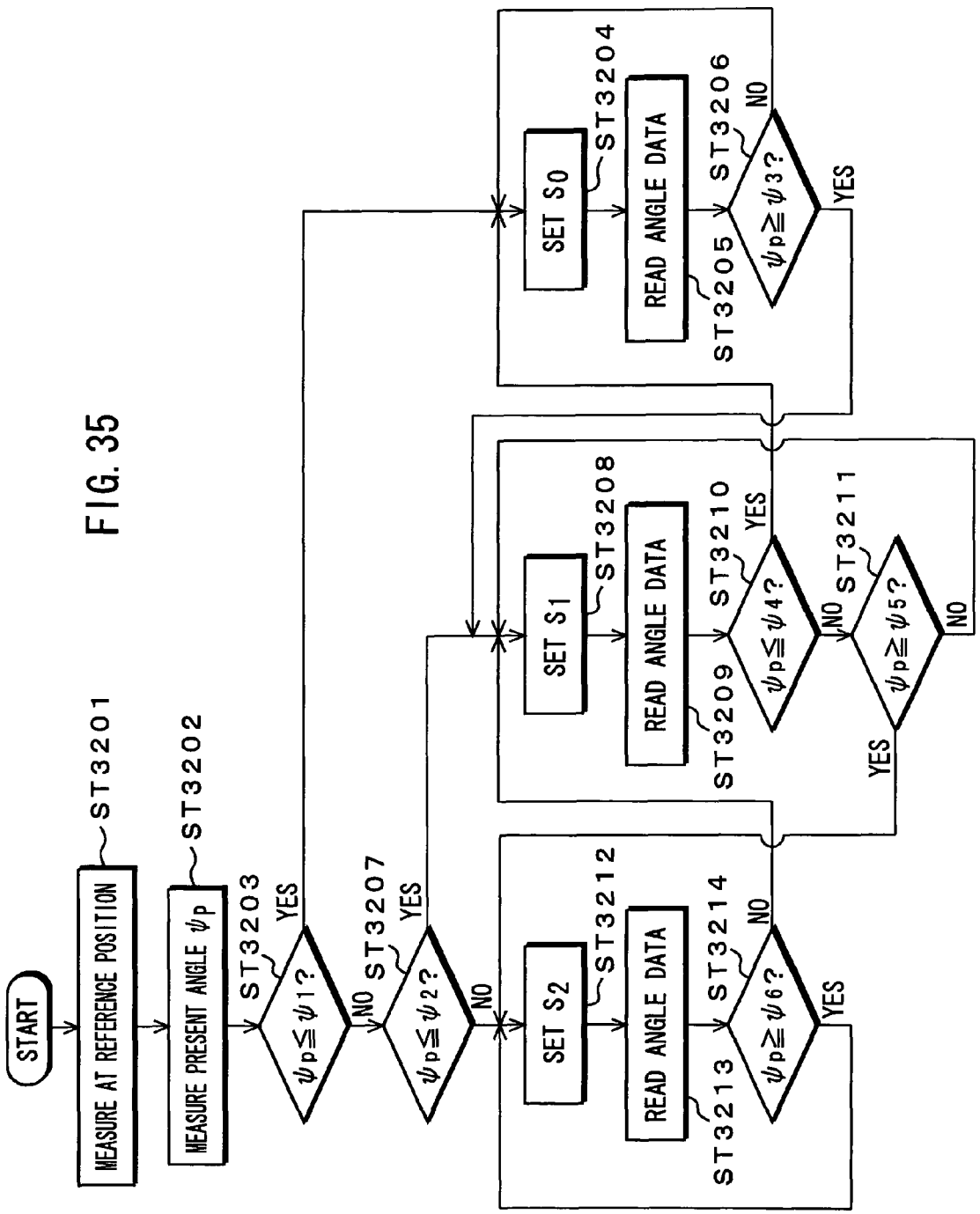
[FIG. 35] is a flowchart showing a flow of operations in a case where the image processing system 40 of FIG. 32 switches states $S_0$, $S_1$, and $S_2$ from each other.

Next, operations to switch the above-described states $S_0$, $S_1$, and $S_2$ from each other in the present embodiment will be described below. FIG. 35 is a flowchart showing the operations in a case where the image processing system 40 switches states $S_0$, $S_1$, and $S_2$ from each other.

As shown in FIG. 35, first, the image pickup section 11 is located to the above-described reference position ($\psi$=0 degree). The processing control section 135 in the image processing section 13 acquires a result of measurement by the gyro-sensor 41 at this point of time (ST3201). Next, the image pickup section 11 is located to a desired position. The processing control section 135 acquires a result of measurement by the gyro-sensor 41 at this point of time and determines a present angle $\psi_P$ from this measurement result and that acquired at ST3201 (ST3202).

Subsequently, the processing control section 135 determines whether or not the present angle $\psi_P$ is equal to or less than the threshold value $\psi_1$ (ST3203). If $\psi_P \leq \psi_1$ (YES), the processing control section 135 determines that the above-described state $S_0$ is set and sets the region selection mode MS to the polar coordinate mode MS2 in the upper hemispherical field of view (ST3204).

If $\psi_P > \psi_1$ (NO) at the above step of ST3203, the processing control section 135 further determines whether or not the present angle $\psi_P$ is equal to or less than threshold value $\psi_2$ (ST3207). If $\psi_P \leq \psi_2$ (YES), the processing control section 135 determines that the above-described state $S_1$ is set and sets the region selection mode MS to the orthogonal coordinate mode MS1 in the front hemispherical field of view (ST3208).

If $\psi_P > \psi_2$ (NO) at the above step of ST3207, the processing control section 135 determines that the above-described state $S_2$ is set and sets the region selection mode MS to the polar coordinate mode MS2 in the lower hemispherical field of view (ST3212).

After setting the region selection mode MS to the polar coordinate mode MS2 at ST3204, the processing control section 135 reads the present angle $\psi_P$ again from the gyrosensor 41 (ST3205) and determines whether or not the present angle $\psi_P$ is equal to or more than the threshold value $\phi_3$ (ST3206). If $\psi_P \geq \psi_3$ (YES), the processing control section 135 determines that the image pickup section 11 has been changed to the above-described state $S_1$ and sets the region selection mode MS to the orthogonal coordinate mode MS1 (ST3208). If $\psi_P < \psi_3$ (NO), the processing control section 135 maintains the state of the polar coordinate mode MS2 (ST3204).

After setting the region selection mode MS to the orthogonal coordinate mode MS1 at ST3208, the processing control section 135 reads the present angle $\psi_P$ again from the gyrosensor 41 (ST3209) and determines whether or not the present angle $\psi_P$ is equal to or less than the threshold value $\psi_4$ (ST3210). If $\psi_P \geq \psi_4$ (YES), the processing control section 135 determines that the image pickup section 11 has been changed to the above-described state $S_0$ and sets the region selection mode MS to the polar coordinate mode MS2 (ST3204).

If $\psi_P > \psi_4$ (NO) at ST3210, the processing control section 135 further determines whether or not the above-described present angle $\psi_P$ is equal to or more than the threshold value $\psi_5$ (ST3211). If $\psi_P \geq \psi_5$ (YES), the processing control section 135 determines that the image pickup section 11 has been changed to the above-described state $S_2$ and sets the region selection mode MS to the polar coordinate mode MS2 (ST3212). If $\psi_P < \psi_5$ (NO), the processing control section 135 maintains the state of the orthogonal coordinate mode MS1 (ST3208).

After setting the region selection mode MS to the polar coordinate mode MS2 at ST3212, the processing control section 135 reads the present angle $\psi_P$ again from the gyrosensor 41 (ST3213) and determines whether or not the present angle $\psi_P$ is equal to or less than the threshold value $\psi_6$ (ST3214). If $\psi_P < \psi_6$ (NO), the processing control section 135 determines that the image pickup section 11 has been changed to the above-described state $S_1$ and sets the region selection mode MS to the orthogonal coordinate mode MS1 (ST3208).

If $\psi_P \geq \psi_6$ (YES) at ST3214, the processing control section 135 maintains the state of the polar coordinate mode MS2 (ST3212).

In such a manner, by repeating the above processing, the processing control section 135 automatically switches the region selection mode MS in accordance with the installation angle of the image pickup section 11.

Herein, the following will describe a method for calculating coordinates in a case of setting to the polar coordinate mode MS2 in states $S_0$ and $S_2$ or to the orthogonal coordinate mode MS1 in state $S_1$, and displaying a selected region display image Gsc in each of the modes. FIGS. 36, 37, 38, and 39 are drawings concerning this coordinate calculation method.

First, as shown in FIG. 36(A), in the above-described polar coordinate mode MS2 (upper hemispherical field of view), it is assumed that the angle of Pan (rotation around a z-axis) and the angle of Tilt (rotation around an x-axis or a y-axis) of a display plane 81 are H (x-axial direction is 0 degree) and V (x-axial direction is o degree), respectively.

Next, in the orthogonal coordinate mode MS1, the direction of the field of view tilts by 90 degrees against that in the polar coordinate mode MS2, so that coordinate axes shown in FIG. 36(A) are exchanged to convert the above-described Pan value and Tilt value.

Specifically, as shown in FIG. 36(B), respective axes in FIG. 36(A), i.e., the x-axis, the y-axis, and the z-axis are respectively exchanged with the y-axis, the z-axis and rotation angles of the x-axis and a Pan angle (H) and a Tilt angle (V) in FIG. 36(A) are respectively a Pan angle (h) and a Tilt angle (v). In this case, a direction vector [D] that indicates a set direction of a selected region, which is a region that corresponds to an image to be displayed on the display section 14, is obtained in a matrix shown in FIG. 37 by rotating an x-axial unit vector in each coordinate system. With this, a sin value and a cos value of each of the above-described post-rotation Pan angle (h) and Tilt angle (v) in the orthogonal coordinate mode MS1 are obtained as follows:

$$\sin(v) = -\cos(H)\cos(V)$$

$$\cos(v) = (1 - \sin(v)^2)^{1/2}$$

$$\sin(h) = \cos(H)\cos(V)/\cos(v)$$

$$\cos(h) = -\sin(V)/\cos(v)$$

It should be noted that h=H and v=V in the polar coordinate mode MS2.

On the other hand, if an output of fixed pixels such as video graphics array (VGA) display is used as the display section 14, the coordinates of a display plane [a] that match this output will be represented as follows:

$$[a] = [a00=(0, 0), a01=(r, 0), \ldots a10=(0, q), a11=(r, q), a12=(2r, q), amn=(nr, mq), \ldots aMN=(Nr, Mq)]$$

Assuming this display plane [a] to be a three-dimensional plane [P0] in which point sequences perpendicular to the x-axis are parallel to the y-axis, the z-axis and a center thereof passes on the x-axis, and an x-coordinate is R (R=fish-eye radius, for example) as shown in FIG. 38(B), the above-described plane [a] is three-dimensioned, as shown in FIG. 38(C) as follows:

$$[a] = [(x0, y0), (x1, y0), \ldots (xN, yM)] \rightarrow [A] = [(x0, y0, 1), (x1, y0, 1), \ldots (xN, yM, 1)]$$

This matrix [A] is multiplied by a matrix [K] shown in FIG. 38(C) to provide a matrix [P0] (=[K][A]).

Subsequently, by using such parameters as shown in FIG. 39A that can be set on the above-described operation input screen Gu of FIGS. 15(A) and 15(B), this plane [P0] is expanded and moved onto a sphere as shown in FIG. 39(B). In this case, assuming this post-movement plane to be a plane [P2], a point on the plane [P2] corresponding to a point Pj on the plane [P0] is a point Pj2(x2, y2, z2). Each point on this plane [P2] can be obtained by a calculation equation of FIG. 39(D) by using the matrices of [P0], [P2], [X], [Y], [Z], and [M] shown in FIG. 39(C).

That is, [P2]=[Z] [Y] [X] [M] [P0] in the orthogonal coordinate mode MS1 and [P2]=[Z] [Y] [M] [P0] in the polar coordinate mode MS2. Based on the thus calculated plane [P2] coordinate values, coordinate values (x2, y2, x2) that corresponds to the point Pj2 is used.

Then, in FIG. 39(B), by performing processing similar to the above-described distortion correction processing principle explained using FIG. 12 based on the point Pj2(x2, y2, z2) on the above-described plane [P2], a focal point Qj2 that corresponds to the point Pj2(x2, y2, z2) can be obtained.

Further, by performing the similar processing on each point on the plane [P2], it is possible to obtain the position of each pixel on the image pickup element 112 that make up a selected region display image Gsc obtained after the distortion correction processing is performed in the orthogonal coordinate mode MS1 and the polar coordinate mode MS2 and then use the pixel data of the position of pixel thus obtained, thereby enabling the selected region display image Gsc in which no distortion is generated to display.

According to the image processing system 40 of the present embodiment, through the above-described constitutions and operations, the installation angle of the image pickup section 11 can be detected with the gyro-sensor 41 to appropriately switch the region selection mode Ms corresponding to this installation angle, thereby improving the user convenience.

Further, since the region selection mode MS is switched on a condition where a hysteresis is held, even when fluctuations in the installation angle are generated near the above-described threshold values $\psi_1$ and $\psi_2$, the region selection mode MS is prevented from being frequently switched based on the fluctuations, thus avoiding disturbing the user.

It should be noted that the direction detection sensor may be any other sensor, for example, a gravity sensor in place of the above-described gyro-sensor 41, to detect the installation angle of the image pickup section 11.

Further, although the present embodiment has switched the region selection mode MS in accordance with the installation angle of the image pickup section 11, the region selection mode MS may be switched in accordance with, for example, whether or not the image pickup section 11 has come into contact with an object.

Figure 40:
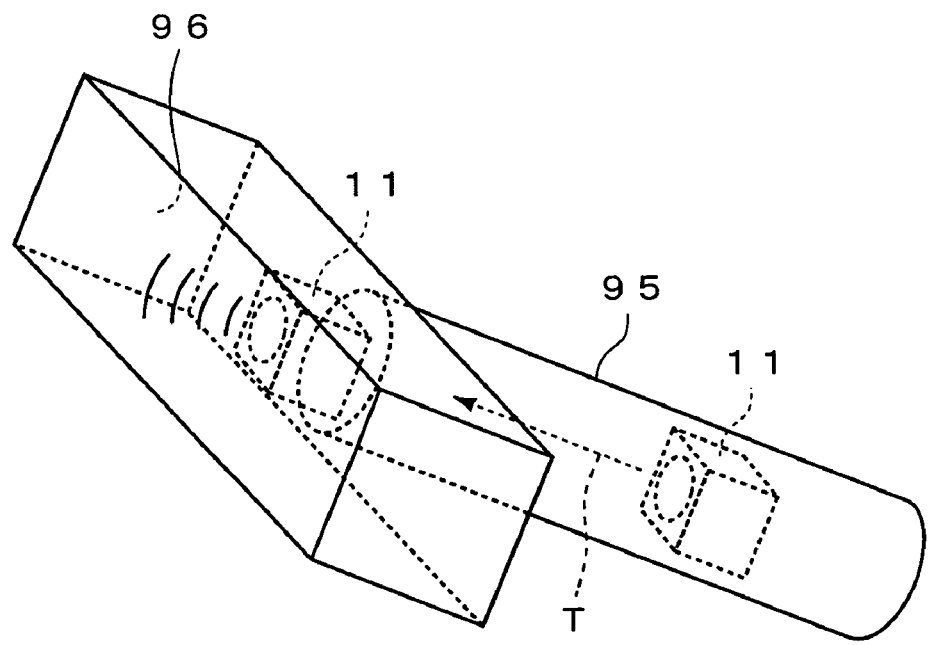
[FIG. 40] is a conceptual illustration of a method for switching the display mode in accordance with contact.

FIG. 40 is a conceptual illustration of a method for switching the display mode in accordance with contact. For example, in a case where the image pickup section 11 moves through a piping 95 in the direction of an arrow T, the processing control section 135 is set to, for example, the polar coordinate mode MS2 in the piping 95, thereby picking up the surroundings of the piping 95. Further, if it comes into contact with a wall surface 96 at an end of the piping 95, the processing control section 135 may be switched to the orthogonal coordinate mode MS1 to pick up this wall surface. In this case, the image processing system may be equipped with a defection sensor for detecting contact and apply the result of the detection to the processing control section 135 in the image processing section 13. The detection sensor may be a mechanical sensor or an optical sensor.

Further, automatic switchover between the orthogonal coordinate mode MS1 and the polar coordinate mode MS2 can be performed without using the direction detection sensor or any other detection sensor. Next, a case will be described below in which the orthogonal coordinate mode Ms1 and the polar coordinate mode MS2 is switched from each other without using a sensor.

Figure 41:
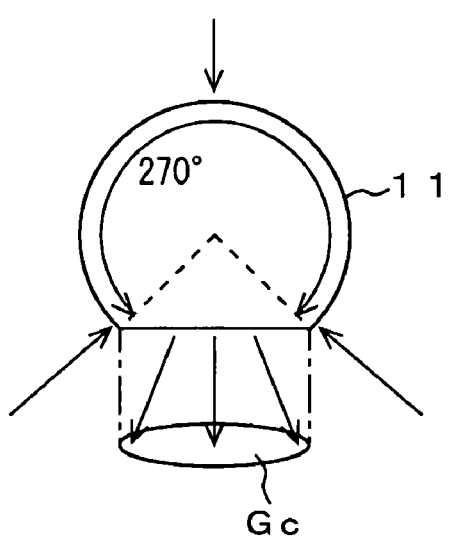
[FIG. 41] is a diagram showing a case where the image pickup optical section has obtained a field of view of 270 degrees.

Herein, to facilitate the understanding of the automatic switchover, the following will be described with the field of view of the image pickup section 11 being assumed to be, for example, 270 degrees. FIG. 41 shows a case where the image pickup optical section 111 has obtained a field of view of 270 degrees by using an ultra wide-angle lens. Light made incident upon the image pickup optical section 111 goes toward the image pickup element 112, to form a wide-field image Gc with a field of view of 270 degrees on a sensor surface of the image pickup element 112.

Figure 42:
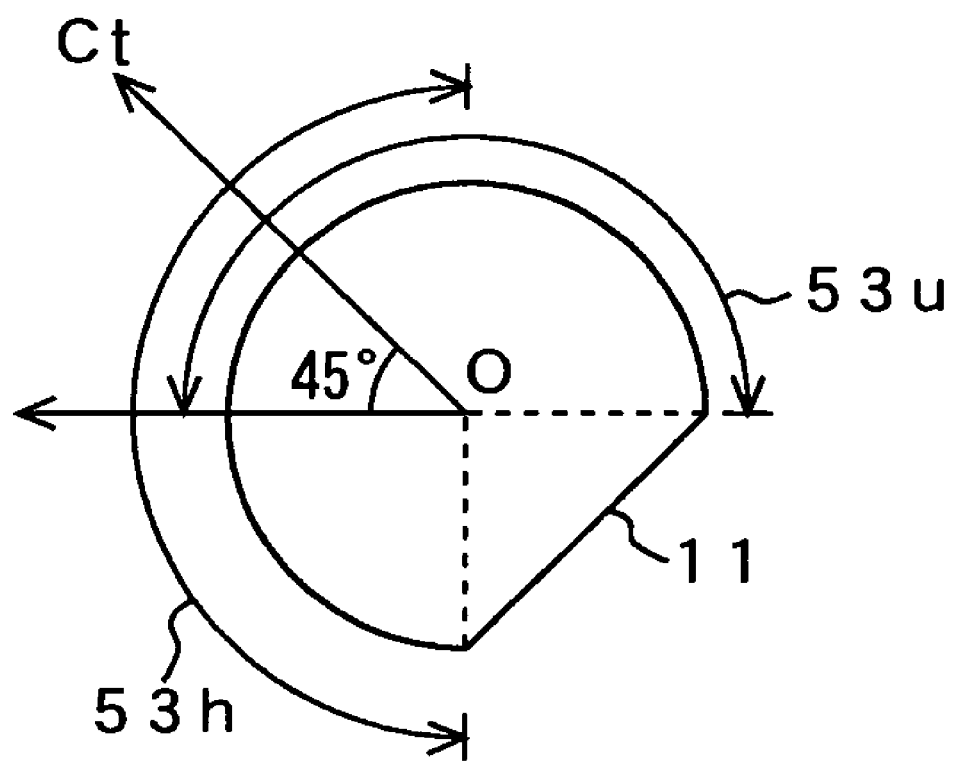
[FIG. 42] is a diagram showing a state where an image pickup direction is set to 45 degrees upward with respect to the horizontal direction.

Further, as shown in FIG. 42, if the image pickup section 11 having a field of view of 270 degrees is placed so that a direction of an arrow OCt that is a center direction of the field of view may be 45 degrees upward with respect to the horizontal direction, such a situation is given in which a front hemispherical field of view 53h and an upper hemispherical field of view 53u are obtained.

FIG. 43 show an example where the image pickup section 11 having a field of view of 270 degrees is placed. For example, the image pickup section 11 is mounted to the bow of a boat in such a manner that the center direction of the field of view may be 45 degrees upward with respect to the horizontal direction. Further, seats FS are set behind the image pickup section 11. In a case where the image pickup section 11 is mounted in such a manner, if a forward landscape is displayed on the display section 14 in the orthogonal coordinate mode MS1 suited for the case of the front hemispherical field of view, it is possible to easily set a selected region to a landscape in a desired direction, thereby displaying a distortion-free image of the landscape in the desired direction on the display section 14. Further, if a passenger sitting on any of the rear seats FS is displayed on the display section 14 in the polar coordinate mode MS2 suited for the case of the upper or lower hemispherical field of view, it is possible to easily set a selected region to a passenger in a desired direction, thereby displaying a distortion-free image of the passenger in the desired direction on the display section 14. Accordingly, the image processing section 13 automatically switches the region selection mode MS in accordance with a direction in which a selected region is set, thereby enabling an image in which a distortion due to the image pickup optical section 111 is corrected to display on the display section 14.

Herein, in a case where a selected region is set by specifying the direction of the selected region, the range of an angle indicative of the range of the selected region, or the like by the input information PS etc., the direction of the selected region can be determined on the basis of the input information etc. that specifies the selected region. Further, since the selected region and the image region ARs correspond to each other, the direction in which the selected region is set can be determined from the image position of the image region ARs on which distortion correction processing is performed.

FIG. 44 show a case of automatically switching the region selection mode MS in accordance with the direction in which a selected region is set. If the image pickup section 11 is placed as shown in FIG. 43, the wide-field image Gc having a field of view of 270 degrees becomes the one shown in FIG. 44. It should be noted that if the image pickup section 11 is mounted in such a manner that a center of the wide-field image Gc may be in an optical axial direction of the image pickup optical section 111 and the center direction of the field of view may be 45 degrees upward with respect to the horizontal direction, the horizontal front side position becomes, for example, such a point Pf on the image as to have a field of view of 90 degrees.

In FIG. 44(A), if a region AS1 is given so as to include a front side image and a selected region is set in such a direction that, for example, the center position of an image region ARs (not shown) may be included in the region AS1, the orthogonal coordinate mode MS1 is set. Further, if a region AS2 is given so as to include a rear side image and a selected region is set in such a direction that, for example, the center position of the image region ARs may be included in the region AS2, the polar coordinate mode MS2 is set. It should be noted that if the center position of the image region ARs is not included in the region AS1 or AS2, the set region selection mode MS is held.

Further, as shown in FIG. 44(B), a region of the wide-field image Gc may be subdivided in a matrix beforehand to assign the region selection mode MS to be set to each of the subdivided regions, then set the region selection mode MS in accordance with any one of the regions in which, for example, the center position of the image region ARs is included. For example, to each region ASm1 including a front image, the orthogonal coordinate mode MS1 is assigned beforehand as the region selection mode MS to be set. Further, to each region ASm2 including a rear image, the polar coordinate mode MS2 is assigned beforehand as the region selection mode MS to be set. Herein, if the center position of the image region ARs corresponding to a selected region corresponds to the region ASm1, the orthogonal coordinate mode MS1 is set. On the other hand, if the center position of the image region ARs corresponds to the region ASm2, the polar coordinate mode MS2 is set.

In such a manner, it is possible to automatically set the region selection mode MS to an optimal mode in accordance with an image of any field of view displayed on the display section 14, thereby enabling the image of a subject placed in a desired direction to display on the display section 14 easily.

Further, since no sensor is used, it can be applied to any one of the image processing systems 10, 20, and 30. It can also be applied to the image processing system 40 using a sensor. In this case, by automatically adjusting the positions or the region sizes of the regions AS1, AS2, ASm1, and ASm2 corresponding to the inclination of the image pickup section 11 based on the sensor signal ES from the gyro-sensor 41, even if the image pickup section 11 is not mounted so as to be 45 degrees upward with respect to the horizontal direction, it is possible to perform switch processing on the region selection mode MS with the same characteristics as those in a case where the image pickup section 11 is mounted so as to be 45 degrees upward with respect to the horizontal direction. Further, if the positions or the region sizes of the regions AS1, AS2, ASm1, and ASm2 corresponding to the inclination of the image pickup section 11 can be set, it is also possible to arbitrarily set the switchover characteristics of the region selection mode MS.

It should be noted that in the case of switching the region selection mode MS automatically, by providing GUI display corresponding to each of the region selection modes, it is possible to easily decide which of modes the region selection mode MS is set to. FIG. 45 show GUI displays and directions in which an image region ARs moves in the case of switching the region selection mode MS automatically. If the orthogonal coordinate mode MS1 is set, as shown in FIG. 45(A), for example, the "Up", "Down", "Right", and "Left" buttons are given as the direction button Gua2. It should be noted that FIG. 45(B) illustrates a direction in which an image region ARs moves in the entire image Gcp when the direction button Gua2 is operated. If the polar coordinate mode MS2 is set, as shown in FIG. 45(C), for example, the "Center", "Outer", "Right rotation", and "Left rotation" buttons are given as the direction button Gud2. It should be noted that FIG. 45(D) illustrates a direction in which an image region ARs moves in the entire image Gcp when the direction button Gud2 is operated.

In such a manner, by providing GUI display corresponding to the region selection modes, the user can easily decide which of modes the region selection mode is set to. Further, when displaying on the display section 14 the image of a subject placed in a desired direction, the user can easily select the direction buttons.

Figure 46:
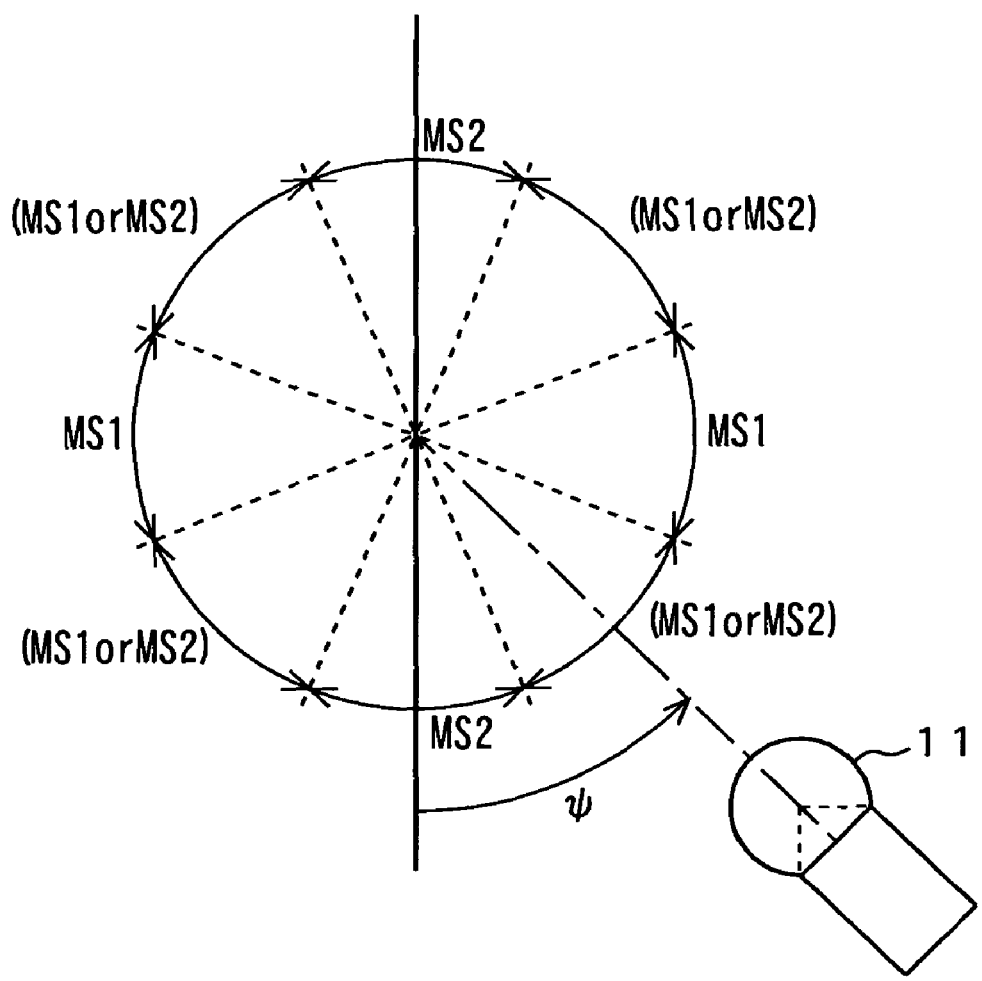
[FIG. 46] is an explanatory illustration of switchover operation among the region selection modes including a combined mode.

Moreover, the image pickup section 11 may stop the automatic switchover operations depending on a tilt angle with respect to the vertical (or horizontal) direction and then either the orthogonal coordinate mode MS1 or the polar coordinate mode MS2 is set. As shown in FIG. 46, if an angle $\psi$ is in a range of "337.5 degrees$\leq \psi <$22.5 degrees" or "157.5 degrees$\leq \psi <$202.5 degrees", the polar coordinate mode MS2 is set irrespective of the position of the image region ARs. If the angle $\psi$ is in a range of "67.5 degrees$\leq \psi <$112.5 degrees" or "247.5 degrees$\leq \psi <$292.5 degrees", the orthogonal coordinate mode MS1 is set irrespective of the position of the image region ARs. If the angle $\psi$ is in a range of "22.5 degrees$\leq \psi <$67.5 degrees", "112.5 degrees$\leq \psi <$157.5 degrees", "202.5 degrees$\leq \psi <$247.5 degrees", or "292.5 degrees$\leq \psi <$337.5 degrees", the orthogonal coordinate mode MS1 or the polar coordinate mode MS2 is automatically set as a combined mode in accordance with the position of the image region ARs as described above.

Figure 47:
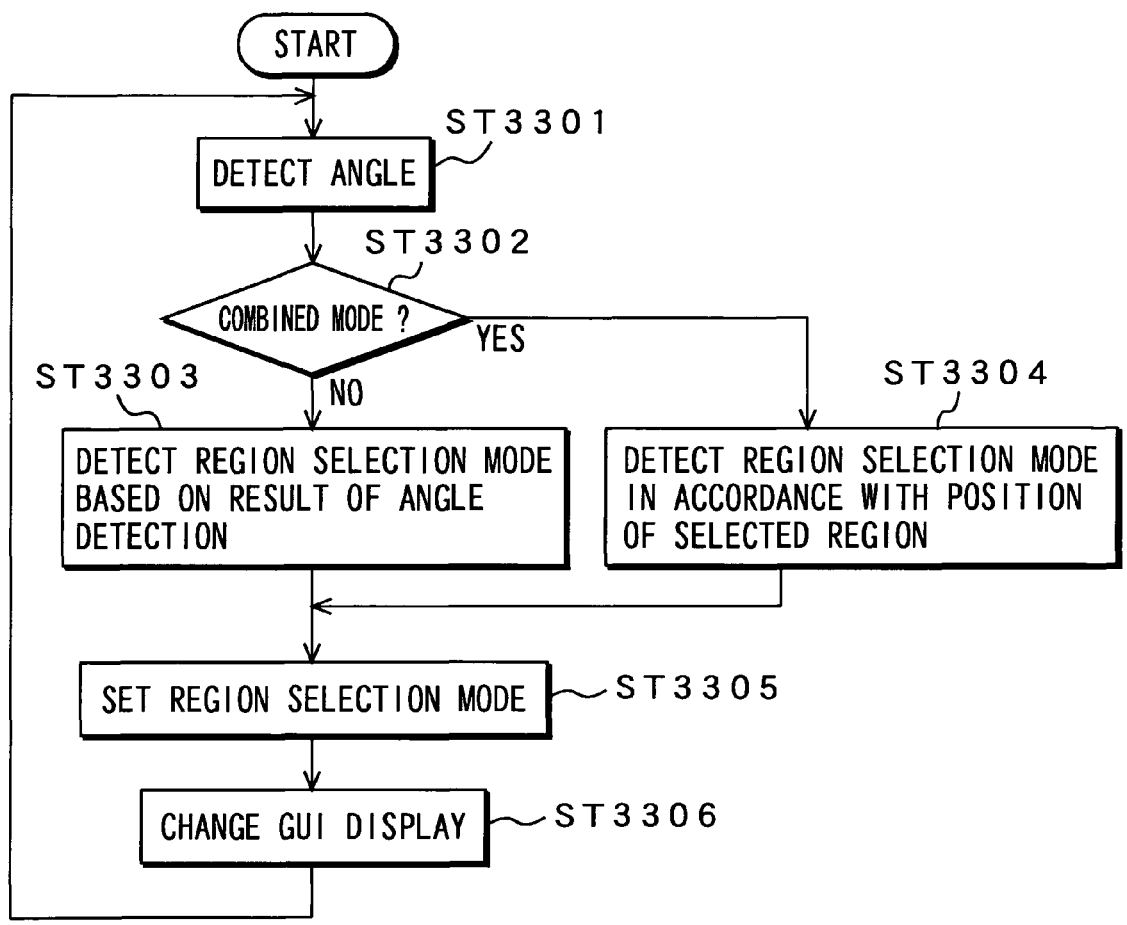
[FIG. 47] is a flowchart showing switchover operation among the region selection modes including the combined mode.

FIG. 47 is a flowchart showing switchover operations among the region selection modes including the combined mode. The processing control section 135 performs angle detection to detect a tilt angle $\psi$ of the image pickup section 11 (ST3301). Next, the processing control section 135 determines whether or not the combined mode is set based on the detected tilt angle $\psi$ (ST3302). If the combined mode is not set (NO), the processing control section 135 detects which one of the orthogonal coordinate mode MS1 or the polar coordinate mode MS2 the region selection mode should be set on the basis of the result of detection of the angle $\psi$ (ST3303). If the combined mode is set (YES at ST3302), the processing control section 135 detects which one of the orthogonal coordinate mode MS1 or the polar coordinate mode MS2 the region selection mode should be set on the basis of the position of a selected region (ST3304).

If having completed detection of the region selection mode at ST3303 or ST3304, the processing control section 135 sets the region selection mode to the coordinate mode in which it is detected (ST3305). Next, the processing control section 135 provides GUI display corresponding to the region selection mode which is set at ST3305 and the process returns to ST3301 (ST3306). By thus switching the region selection modes, it is possible to provide an interface which can be used by the user easily.

Figure 48:
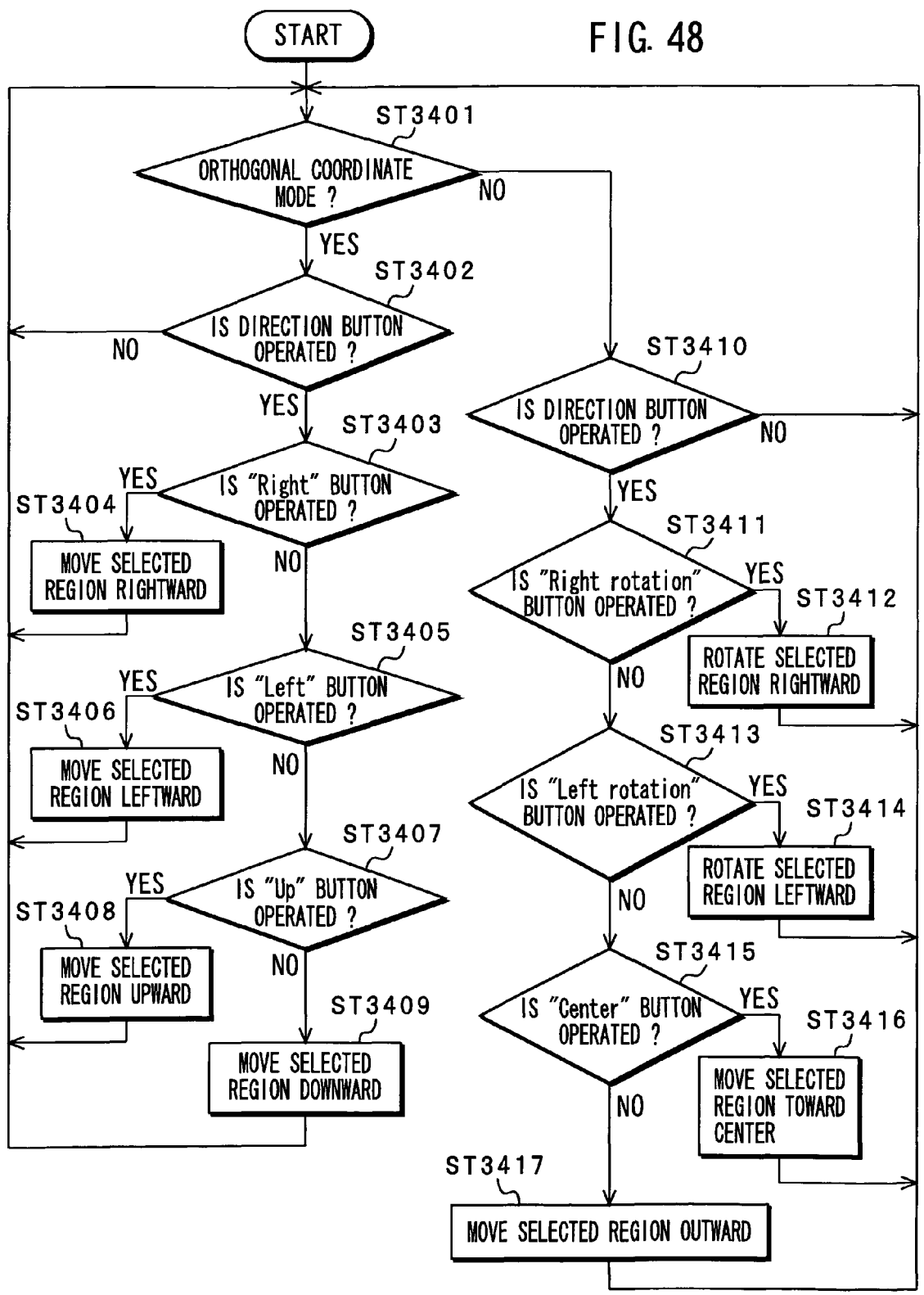
[FIG. 48] is a flowchart showing operations when a direction button is operated.

FIG. 48 is a flowchart showing operations when the direction button is operated. The processing control section 135 determines whether or not the region selection mode MS is set to the orthogonal coordinate mode MS1 (ST3401).

Herein, if the orthogonal coordinate mode MS1 is set (YES), the processing control section 135 determines whether or not the direction button is operated, based on the input information PS (ST3402). If having determined that no direction button is operated (NO), the process returns to ST3401 while if having determined that the direction button is operated (YES), it is determined whether or not the "Right" button is operated (ST3403).

If having determined that the "Right" button is operated (YES), the processing control section 135 performs processing such that a selected region is switched to a rightward position and the process returns to ST3401 (ST3404). If having determined that the "Right" button is not operated (NO at ST3403), the processing control section 135 determines whether or not the "Left" button is operated (ST3405).

If having determined that the "Left" button is operated (YES), the processing control section 135 performs processing such that the selected region is switched to a leftward position and the process returns to ST3401 (ST3406). If having determined that the "Left" button is not operated (NO at ST3405), the processing control section 135 determines whether or not the "Up" button is operated (ST3407).

If having determined that the "Up" button is operated (YES), the processing control section 135 performs processing such that the selected region is switched to an upward position and the process returns to ST3401 (ST3408). If having determined that the "UP" button is not operated (NO at ST3407), the processing control section 135 determines that the "Down" button is operated and so performs processing such that the selected region is switched to a downward position and the process returns to ST3401 (ST3409).

If having determined that the polar coordinate mode MS2 is set (NO at ST3401), the processing control section 135 determines whether or not the direction button is operated, based on the input information PS (ST3410). If having determined that no direction button is operated (NO), the process returns to ST3401 and, if having determined that the direction button is operated (YES), it is determined whether or not the "Right rotation" button is operated (ST3411).

If having determined that the "Right rotation" button is operated (YES), the processing control section 135 performs processing to rotate the selected region rightward and the process returns to ST3401 (ST3412). If having determined that the "Right rotation" button is not operated (NO at ST3411), the processing control section 135 determines whether or not the "Left rotation" button is operated (ST3413).

If having determined that the "Left rotation" button is operated (YES), the processing control section 135 performs processing to rotate the selected region leftward and the process returns to ST3401 (ST3414). If having determined that the "Left rotation" button is not operated (NO at ST3413), the processing control section 135 determines whether or not the "Center" button is operated (ST3415).

If having determined that the "Center" button is operated (YES), the processing control section 135 performs processing such that the selected region is switched to a central position and the process returns to ST3401 (ST3416). If having determined that the "Center" button is not operated (NO at ST3415), the processing control section 135 determines that the "Outer" button is operated and so performs processing such that the selected region is switched to a outward position that is a direction opposite to the central direction and the process returns to ST3401 (ST3417).

Through such processing, it is possible to switch the selected region to a desired direction easily. That is, it is possible to display the image of a subject placed in a desired direction on the screen of the display section 14 in a condition where distortion due to the image pickup optical section 111 is corrected.

However, the image processing system of the present embodiment has the above-described plurality of modes as the display mode MH, so that if, for example, the selected image display mode MH2 is set, it is impossible to decide which of direction of a field of view a selected region is set. Therefore, to confirm how to set a selected region, it is necessary to perform any operations to change the display mode MH to the entire image display mode MH1 or the both display mode MH3. Accordingly, if a selected region is switched or the region selection mode MS is switched, the display mode is changed so that an entire image Gcp may be displayed at least for a predetermined lapse of time, thereby making it easy for the user to confirm the selected region even without changing the display mode. It should be noted that a constitution of the image processing system in the present embodiment is the same as that of the above-described image processing system 40 shown in FIG. 32 and so its explanation is omitted.

Figure 49:
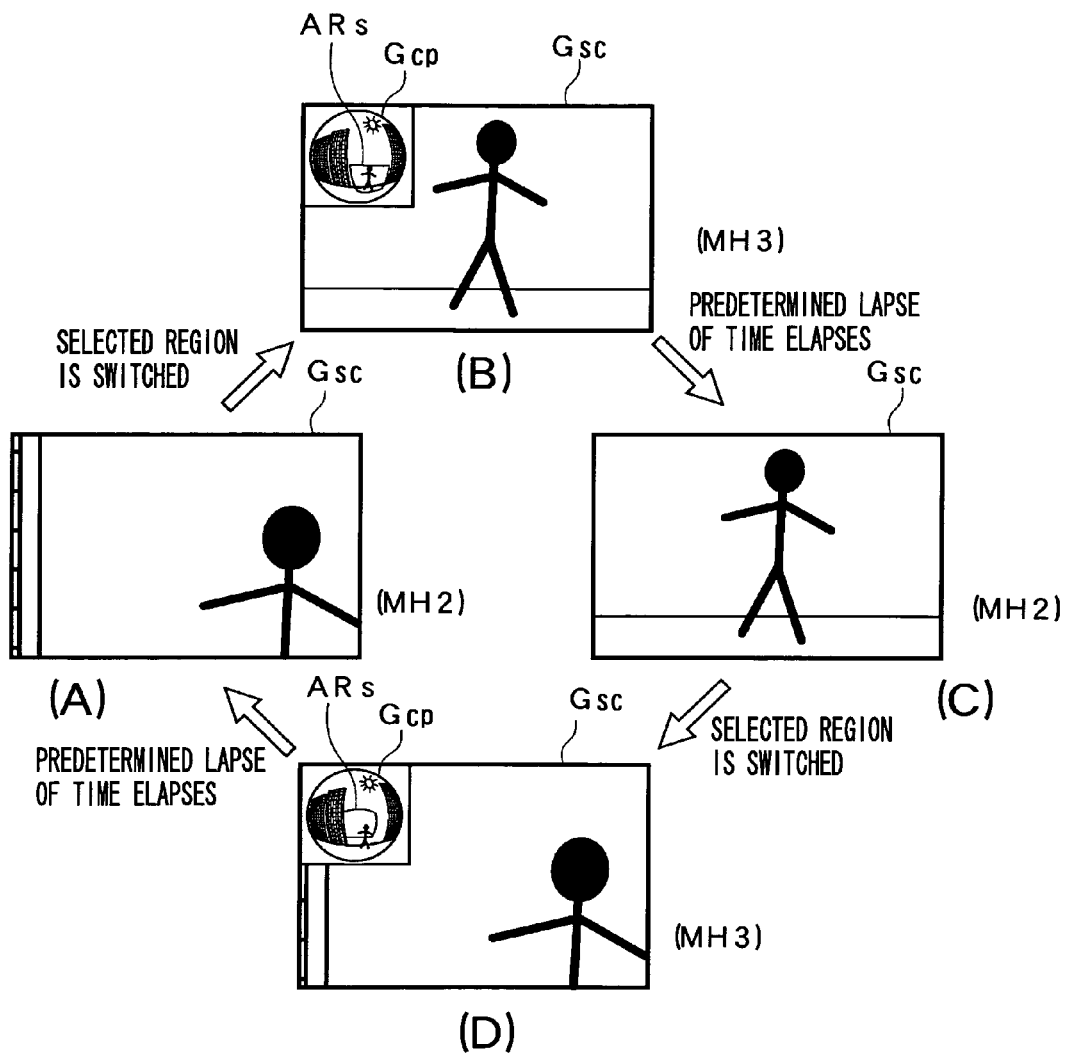
[FIG. 49] are illustrations showing a manner to change the display mode MH in response to switchover of the selected region in additional embodiment of the present invention.
Figure 50:
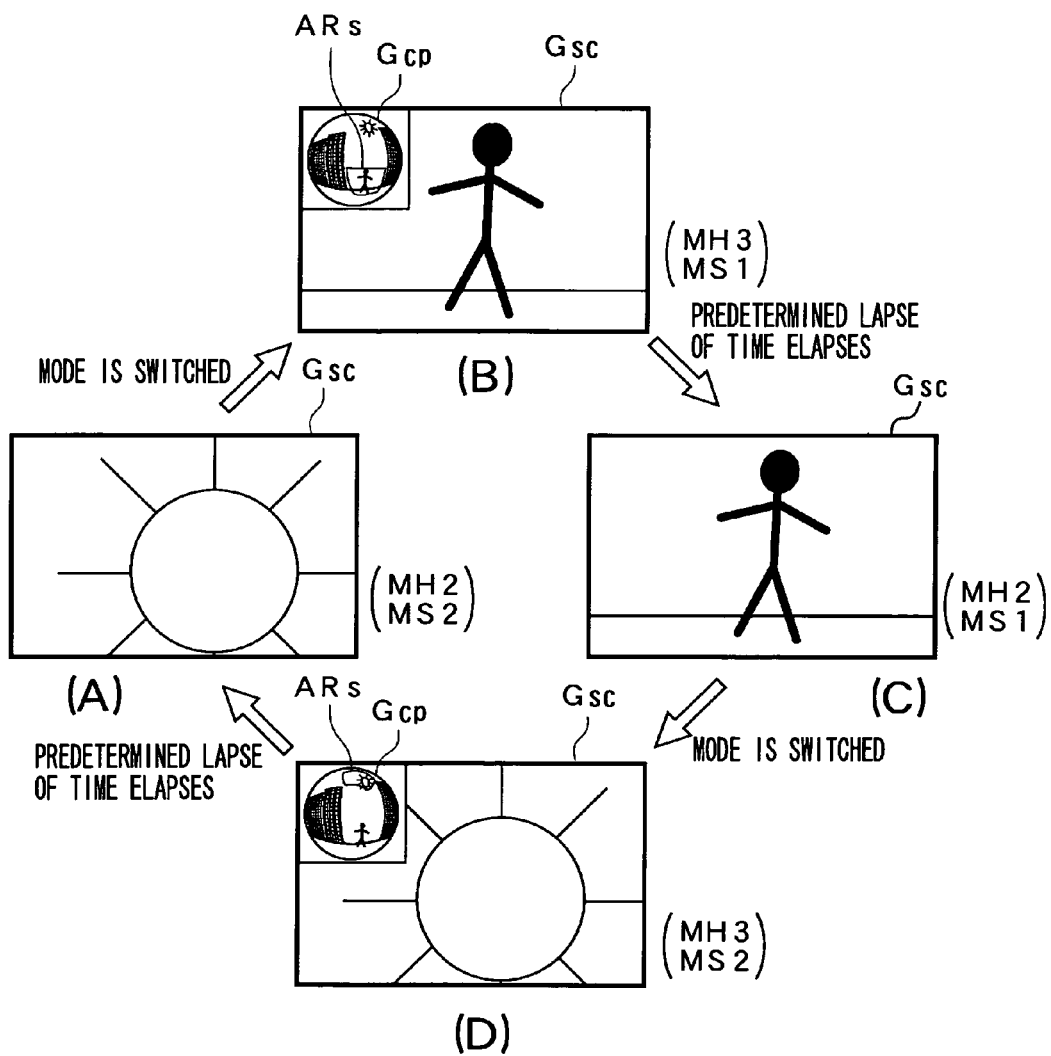
[FIG. 50] are illustrations showing a manner to change the display mode MH in response to switchover of the region selection mode MS in further additional embodiment of the present invention.

FIGS. 49 and 50 show the operations of displaying an entire image Gcp, out of which FIG. 49 show a manner to change the display mode MH in response to the switchover of a selected region and FIG. 50 show a manner to change the display mode MH in response to the switchover of the region selection mode MS.

If the display mode is switched to a display mode in which the entire image Gcp is not displayed or if it is instructed to switch a selected region or switch the region selection mode MS in a condition where a display mode in which the entire image Gcp is not displayed is set, the image processing section 13 in the image processing system automatically alters to the display mode in which the entire image Gcp is displayed for the predetermined lapse of time irrespective of the display mode which is set.

FIG. 49(A) shows a case where an image is displayed in the selected image display mode MH2. If the selected region is switched in response to a selected region switchover instruction, processing to combine the entire image Gcp with an image displayed corresponding to the set display mode is performed and a post-combination image is displayed as a new display image. For example, the display mode MH is changed to the both display mode MH3 to display the entire image Gcp also as shown in FIG. 49(B). Then, after the predetermined lapse of time elapses, the combination processing of the entire image Gcp ends and the entire image Gcp is erased from the display screen. For example, the display mode MH returns to the selected image display mode MH2 and the entire image Gcp is erased as shown in FIG. 49(C). Further, if the selected region returns to its original position in response to a selected region switchover instruction, the display mode MH alters to the both display mode MH3 for the predetermined lapse of time and displays are performed as shown in FIGS. 49(C), 49(D), and 49(A) in this order.

FIG. 50(A) shows a case where an image is displayed in the selected image display mode MH2 and the region selection mode is set to the polar coordinate mode MS2. Herein, if the region selection mode MS is switched to the orthogonal coordinate mode MS1, processing to combines the entire image Gcp with an image displayed corresponding to the set display mode and a post-combination image is displayed as a new display image. For example, the display mode MH is changed to the both display mode MH3 and the entire image Gcp is also displayed as shown in FIG. 50(B). Then, after the predetermined lapse of time elapses, the combination processing of the entire image Gcp ends and the entire image Gcp is erased from the display screen. For example, the display mode MH returns to the selected image display mode MH2 and the entire image Gcp is erased as shown in FIG. 50C.

Further, also if the region selection mode MS is switched from the orthogonal coordinate mode MS1 to the polar coordinate mode MS2, the display mode MH alters to the both display mode MH3 for the predetermined lapse of time and displays are performed as shown in FIGS. 50(C), 50(D), and 50(A) in this order. It should be noted that the predetermined lapse of time may be, but not limited to three seconds, five seconds, etc., for example.

Furthermore, the image processing section 13 can display the entire image Gcp not only when the region selection mode MS is switched but also when it is instructed to switch a selected region and, after the predetermined lapse of time elapses, change it to such a mode in which only a selected region display image Gsc is displayed.

Further, the image processing section 13 may change the display mode for the predetermined period of time not only when the selected region switching is generated in response to a selected region switchover instruction or the region selection mode MS is switched but also when the image of the image region ARs corresponding to the selected region is changed in response to a change in a picked-up direction. For example, if the picked-up direction by the image pickup section 11 changes, the image of a wide-field image Gc changes, so that the selected region display image Gsc also changes even if the position of the image region ARs on the sensor surface of the image pickup element 112 is not changed. That is, a state such that the selected region is changed occurs. Accordingly, for example, if having determined that an image pickup region is changed on the basis of the sensor signal ES from the gyro-sensor 41, the display mode alters for a predetermined period of time to display the entire image Gcp. It is thus possible for a user to easily decide how it should be instructed to switch the selected region in order to display on the display section 14 the image of a subject placed in a desired direction.

Figure 51:
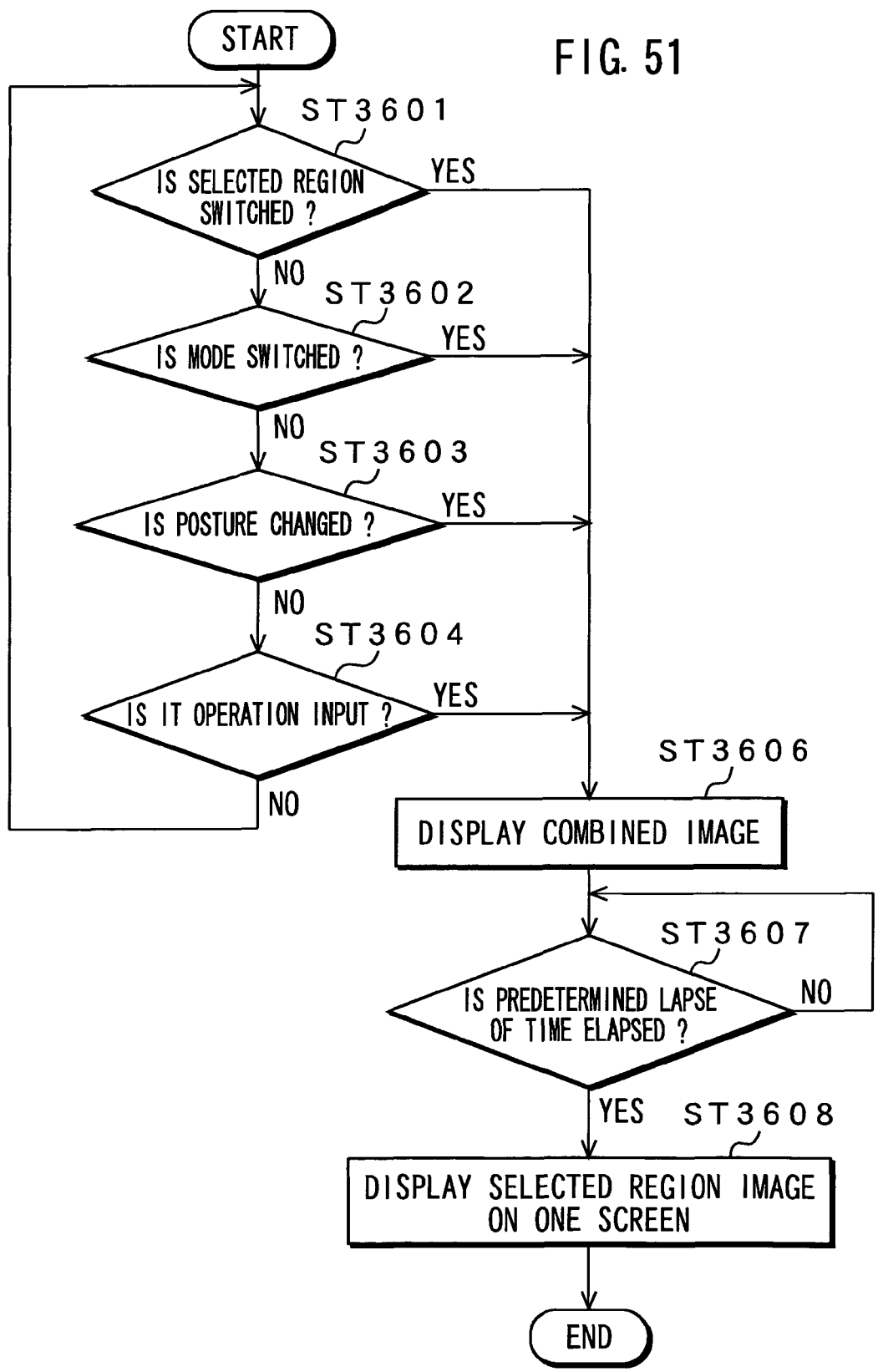
[FIG. 51] is a flowchart showing a flow of operations of the image processing system in a case of performing display mode switchover processing.

FIG. 51 is a flowchart showing the flow of operations of the image processing system in the case of changing the display mode shown in FIGS. 49 or 50. The processing control section 135 in the image processing section 13 determines whether or not a selected region is switched (moved) (ST3601). That is, it is determined whether or not the input information PS that indicates a user's operation on the above-described direction button Gua2 or Gud2 or the bearing button Gub2 for the purpose of selected region switchover instruction is supplied from the input section 12 or whether or not selected region switching is generated when a selected region is switched automatically on the basis of the above-described trajectory information. Herein, if the selected region is switched (YES), display control information JH is supplied to the image output processing section 134 so that the image output processing section 134 may display a combined image of the entire image Gcp and the selected region display image Gsc on the display section 14 (ST3606). Then, the processing control section 135 determines whether or not a predetermined lapse of time has elapsed since the output of this combined image (ST3607) and, if the predetermined lapse of time has elapsed (YES), supplies the display control information JH to the image output processing section 134, to change the display from the combined image to the selected region display image Gsc from which the entire image Gcp is erased (ST3608). That is, in a condition where the image output processing section 134 is controlled by the processing control section 135, as shown in FIGS. 49 and 50, after the predetermined lapse of time has elapsed, the display mode MH is changed from the both display mode MH3 to the selected image display mode MH2.

If having determined that the selected region is not switched (NO) in the determination whether or not the selected region is switched by the processing control section 135 in the image processing section 13, the processing control section 135 determines whether or not the above-described display mode MH or region selection mode MS is switched, that is, whether or not the input information PS that indicates a user's operation on the above-described "Select" button Gua1 or Gub1 or the "Menu" button Guc3 for the purpose of mode switchover is supplied from the input section 12 (ST3602). Herein, if the mode is switched (YES), the above-described steps of ST3606 and the subsequent are performed. On the other hand, if having determined that the mode is not switched (NO), the image processing section 13 determines whether or not the posture (installation angle) of the image pickup section 11 is changed (ST3603). That is, the processing control section 135 determines a difference between, for example, the result of detection by the gyro-sensor 41 shown in FIG. 32 and a predetermined initial value based on the sensor signal ES that indicates a tilt angle detected by the gyro-sensor 41. If the installation angle of the image pickup section 11 is changed (YES), the image processing section 13 performs the processing of the above-described steps of ST3606 and the subsequent.

Further, if having determined at ST3606 that the installation angle of the image pickup section 11 is not changed (NO), the processing control section 135 determines whether or not any user operation has been performed on the input section 12 and, if having determined that any user operation has been performed (YES), performs the processing of the above-described steps of ST3606 and the subsequent and, if having determined that no user operation has been performed (NO), repeats the processing of the above-described steps of ST3601 and the subsequent. It should be noted that if this user operation involves the switchover of the above-described display mode MH or region selection mode MS or the switchover of a selected region, its processing will be the same as that of the above-described step of ST3601 or ST3602, so that any other user's operations other than those are subject to be determined at ST3604.

Figure 52:
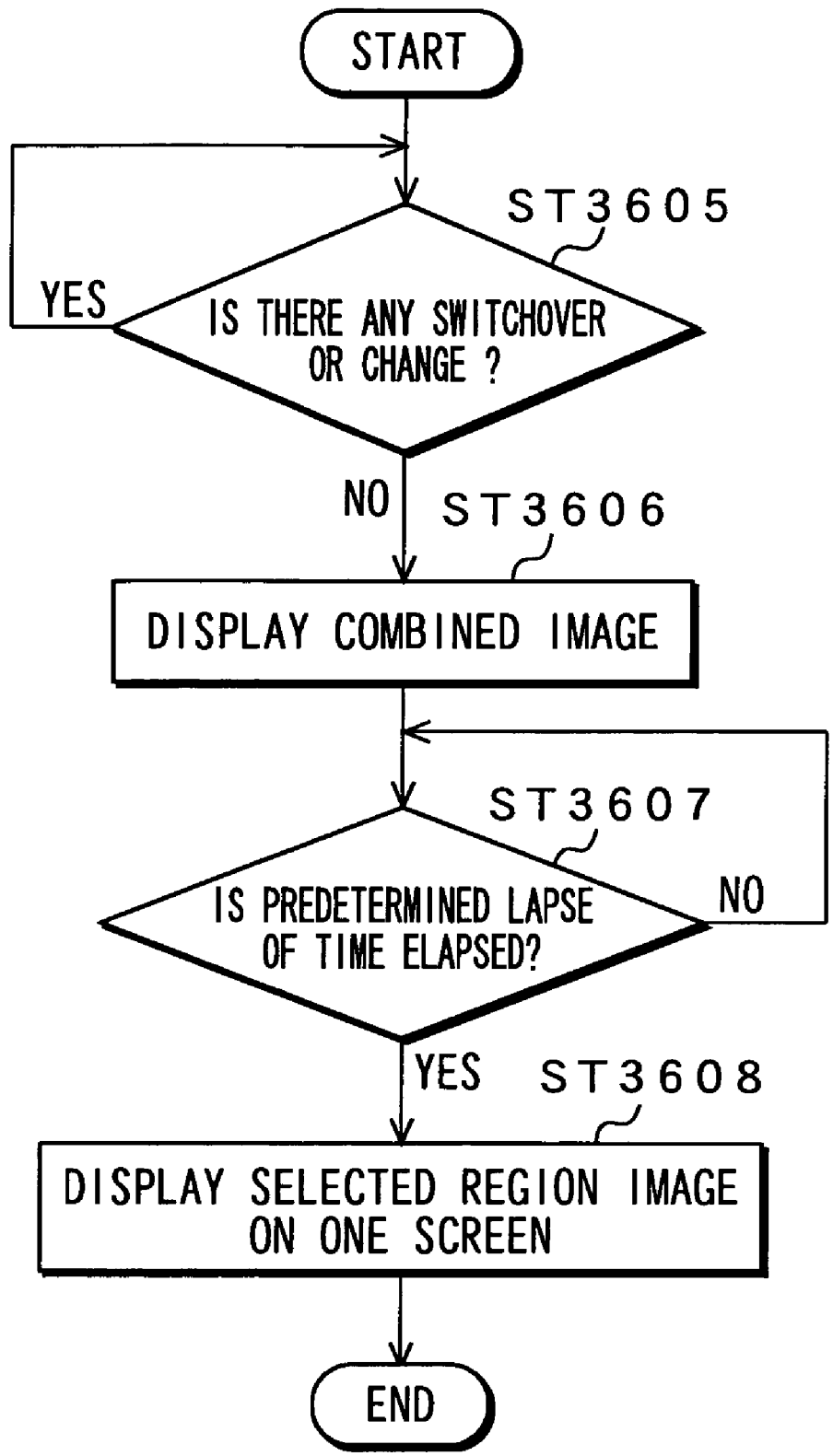
[FIG. 52] is a flowchart showing another flow of the operations of the image processing system in the case of performing display mode switchover processing.

It should be noted that although in FIG. 51, if it is determined that a selected region is not switched, it has been determined whether or not the mode is switched, whether or not the posture is changed, and whether or not an operation is input in this order, it is possible to display an entire image Gcp for the predetermined lapse of time also by determination as to whether or not there is any of the selected region switchover, the mode switchover, the posture change, and an operation input at ST3605 shown in FIG. 52 and, if any one of them is determined to be positive, performing the processing of the steps of ST3606 and the subsequent.

Through the above processing, if a selected region is switched, the display mode MH or the region selection mode MS is switched, the posture of the image pickup section 11 is changed, or an operation is input from the user, such display is provided that the entire image Gcp may be displayed at least for a predetermined lapse of time. Therefore, if the selected region or the mode is switched, the user can easily confirm how the selected region is set against the highlighted image Gs of the image region ARs in the entire image Gcp and also, after confirmation, observe the selected region display image Gsc without being blocked by the entire image Gcp.

It should be noted that, conversely an entire image Gcp has first displayed in the both display mode MH3 and then, after a predetermined lapse of time has elapsed, it is switched to the selected image display mode MH2 in which the entire image Gcp is not displayed, the image processing section 13 may first output only the selected region display image Gsc in the selected image display mode MH2 if the above-described display mode MH or region selection mode MS is switched, and, after the predetermine lapse of time elapses, generate image data DVd so that a combined image may be displayed in the both display mode MH3 in which the entire image Gcp is combined. It is thus possible to confirm the selected region display image Gsc, with no blind areas, displayed on the display section 14 and, after the predetermined lapse of time, observe the newly displayed selected region display image Gsc, and confirm the currently selected region.

FIG. 53 is an illustration showing another state of the display mode switchover processing. When displaying the above-described combined image, the image processing section 13 may provide one-screen display as for example, the above-described combined image in which the selected region display image Gsc is scaled down so that it may not overlap with the entire image Gcp. Further, it may output the entire image Gcp by combining it onto the selected region display image Gsc translucently. In either case, the image processing section 13 may perform such processing that the user can observe the selected region display image Gsc with no blind areas in a condition where the entire image Gcp is displayed.

Furthermore, the image processing section 13 may change the above-described predetermined lapse of time dynamically rather than fixing it to a constant value. For example, if the region selection mode MS is switched, the position of a selected region may change greatly, so that in such a case, the above-described predetermined lapse of time may be made longer as compared with the above-described predetermined lapse of time in a case where there is any switchover of the selected region in the same region selection mode MS or any change in the posture etc. of the image pickup section 11, so that the user can surely confirm the selected region. Further, for example, if the number of the sub-divided regions increases in the divided display mode MH4, it may take long time to confirm the plurality of selected regions, so that if the user has performed such an operation as to increase the number of sub-divided regions (the number of highlighted images Gs in the entire image Gcp), the predetermined lapse of time may be prolonged as compared to that in the case of switchover to any other mode or a change in posture so that the user can surely confirms the selected region.

Industrial Applicability

The present invention is provided with a first region selection mode in which a region is selected which displays a partial region of a field of view represented by image data by using an orthogonal coordinate system and a second region selection mode in which a region is selected which displays the partial region of the field of view represented by the image data by using a polar coordinate system, to correct distortion contained in the image data corresponding to the region selected in the first or second region selection mode which is set. Therefore, it is preferably suited for a case where a desired region is set as a selected region from a picked-up wide-field angle image to confirm the image of this selected region or the like.

The invention claimed is:

1. An image processing apparatus that processes image data containing a distortion of an image pickup optical section, which is obtained by picking up an optical image from a subject through the image pickup optical section giving the distortion, the image processing apparatus comprising:
 a region selection mode setting section that selectively sets a first region selection mode in which, from a field of view represented by the image data a selected region is selected which indicates a partial region of the field of view by using an orthogonal coordinate system and a second region selection mode in which, from the field of view represented by the image data, the selected region is selected which indicates the partial region of the field of view by using a polar coordinate system; and
 a data output section that outputs distortion-corrected data obtained by correcting the distortion in the image data that corresponds to the selected region selected in the first or second region selection mode which is set by the region selection mode setting section, wherein the region selection mode setting section switches from the first region setting mode to the second region setting mode according to whether or not the angle exceeds a first threshold value and switches from the second region selection mode to the first region selection mode according to whether or not the angle exceeds a second threshold value that is different from the first threshold value.

2. The image processing apparatus according to claim 1, further comprising a distortion correction section that corrects the distortion in the image data that corresponds to the selected region.

3. The image processing apparatus according to claim 2, wherein the distortion correction section corrects the distortion in only the image data that corresponds to the selected region.

4. The image processing apparatus according to claim 1, further comprising a control section that switches the selected region by changing coordinate values of the orthogonal coordinate system in a case where the selected region is switched in the first region selection mode or switches the selected region by changing an argument and/or a moving radius of the polar coordinate system in a case where the selected region is switched in the second region selection mode.

5. The image processing apparatus according to claim 1, further comprising an image pickup section that contains the image pickup optical section and an image pickup element which generates image data of an optical image that is made incident through the image pickup optical section.

6. The image processing apparatus according to claim 5, wherein the image pickup optical section is constituted by using a fish-eye lens.

7. The image processing apparatus according to claim 5, further comprising a direction detection sensor that detects a direction in which an optical image is made incident upon the image pickup optical section, wherein the region selection mode setting section selects either one of the first region selection mode and the second region selection mode based on a sensor signal from the direction detection sensor.

8. The image processing apparatus according to claim 7, wherein the region selection mode setting section selects either one of the first region selection mode and the second region selection mode in accordance with an angle with respect to a vertical direction that is determined on the basis of the sensor signal from the direction detection sensor.

9. The image processing apparatus according to claim 1, further comprising a detection sensor that detects contact with an object,
 wherein the region selection mode setting section selects either one of the first region selection mode and the second region selection mode according to whether or not the contact with the object is detected on the basis of the sensor signal from the detection sensor.

10. The image processing apparatus according to claim 1, wherein the region selection mode setting section selects either one of the first region selection mode and the second region selection mode in accordance with a position at which the selected region is selected.

11. The image processing apparatus according to claim 1, further comprising an input section that generates input information including a selection instruction to select the selected region,
 wherein the region selection mode setting section selects the selected region based on the selection instruction included in the input information.

12. The image processing apparatus according to claim 1, further comprising a storage apparatus that stores the image data containing the distortion due to the image pickup optical section,
 wherein the image data read from the storage apparatus is processed.

13. The image processing apparatus according to claim 1, further comprising a display section that provides graphical user interface display,
 wherein the region selection mode setting section switches the graphical user interface display between the first region selection mode and the second region selection mode.

14. An image processing method for processing image data containing a distortion of an image pickup optical section, which is obtained by picking up an optical image from a subject through the image pickup optical section giving the distortion, the method comprising:

a region selection mode setting step of selectively setting a first region selection mode in which, from a field of view represented by the image data, a selected region is selected which indicates a partial region of the field of view by using an orthogonal coordinate system and a second region selection mode in which, from the field of view represented by the image data, the selected region is selected which indicates the partial region of the field of view by using a polar coordinate system; and a data output step of outputting distortion-corrected data obtained by correcting the distortion in the image data that corresponds to the selected region selected in the first or second region selection mode which is set in the region selection mode setting step, wherein the region selection mode setting section switches from the first region setting mode to the second region setting mode according to whether or not the angle exceeds a first threshold value and switches from the second region selection mode to the first region selection mode according to whether or not the angle exceeds a second threshold value that is different from the first threshold value.

15. A program stored in an electronic memory and automatically executed by a processor that causes a computer to perform image processing to process image data containing a distortion of an image pickup optical section, which is obtained by picking up an optical image from a subject through the image pickup optical section giving the distortion, the program comprising:

a region selection mode setting step of selectively setting a first region selection mode in which, from a field of view represented by the image data, a selected region is selected which indicates a partial region of the field of view by using an orthogonal coordinate system and a second region selection mode in which, from the field of view represented by the image data, the selected region is selected which indicates the partial region of the field of view by using a polar coordinate system; and a data output step of outputting distortion-corrected data obtained by correcting the distortion in the image data that corresponds to the selected region selected in the first or second region selection mode which is set in the region selection mode setting step, wherein the region selection mode setting section switches from the first region setting mode to the second region setting mode according to whether or not the angle exceeds a first threshold value and switches from the second region selection mode to the first region selection mode according to whether or not the angle exceeds a second threshold value that is different from the first threshold value.

16. A non-transitory recording medium that records a program that is automatically executed by a processor and when executed performs image processing to process image data containing a distortion of an image pickup optical section, which is obtained by picking up an optical image from a subject through the image pickup optical section giving the distortion, the program comprising:

a region selection mode setting step of selectively setting a first region selection mode in which, from a field of view represented by the image data, a selected region is selected which indicates a partial region of the field of view by using an orthogonal coordinate system and a second region selection mode in which, from the field of view represented by the image data, the selected region is selected which indicates the partial region of the field of view by using a polar coordinate system; and a data output step of outputting distortion-corrected data obtained by correcting the distortion in the image data that corresponds to the selected region selected in the first or second region selection mode which is set in the region selection mode setting step, wherein the region selection mode setting section switches from the first region setting mode to the second region setting mode according to whether or not the angle exceeds a first threshold value and switches from the second region selection mode to the first region selection mode according to whether or not the angle exceeds a second threshold value that is different from the first threshold value.

\* \* \* \* \*